United States Patent
Saranow et al.

(10) Patent No.: US 9,177,339 B2
(45) Date of Patent: Nov. 3, 2015

(54) SYSTEM AND METHOD FOR COLOR PREPARATION AND MANAGEMENT

(71) Applicant: SureTint Technologies, LLC

(72) Inventors: Mitchell H. Saranow, Winnetka, IL (US); Mark Baran, La Grange, IL (US); Michael Wright, Lisle, IL (US); Joe Rygiel, South Barrington, IL (US); Danny S. Creed, Chicago, IL (US)

(73) Assignee: Sure Tint Technologies, LLC, Elgin, IL (US)

( * ) Notice: Subject to any disclaimer, the term of this patent is extended or adjusted under 35 U.S.C. 154(b) by 259 days.

(21) Appl. No.: 13/672,584

(22) Filed: Nov. 8, 2012

(65) Prior Publication Data

US 2013/0123973 A1    May 16, 2013

Related U.S. Application Data

(63) Continuation-in-part of application No. 13/081,147, filed on Apr. 6, 2011, and a continuation-in-part of application No. 13/371,928, filed on Feb. 13, 2012, and a continuation-in-part of application No.

(Continued)

(51) Int. Cl.
| | |
|---|---|
| *B65B 1/04* | (2006.01) |
| *G06Q 30/06* | (2012.01) |
| *A45D 19/00* | (2006.01) |
| *A45D 44/00* | (2006.01) |

(52) U.S. Cl.
CPC ............ *G06Q 30/0621* (2013.01); *A45D 19/00* (2013.01); *A45D 44/005* (2013.01)

(58) Field of Classification Search
USPC ........ 141/18, 94, 95, 100, 104, 105, 198, 83; 222/58, 132, 145.1
See application file for complete search history.

(56) References Cited

U.S. PATENT DOCUMENTS

| | | | |
|---|---|---|---|
| 3,122,272 A | 2/1964 | Marsh | |
| 3,416,517 A | 12/1968 | Z et al. | |
| 3,878,907 A * | 4/1975 | Morick | ............ 177/70 |
| 4,046,287 A | 9/1977 | Hoekstra et al. | |
| 4,469,146 A | 9/1984 | Campbell et al. | |
| 4,637,527 A | 1/1987 | Arrigoni | |
| 4,656,600 A * | 4/1987 | Swann | ............ 702/173 |
| 4,705,083 A | 11/1987 | Rossetti | |
| 4,792,236 A | 12/1988 | Heinis et al. | |
| 4,871,262 A | 10/1989 | Krauss et al. | |

(Continued)

FOREIGN PATENT DOCUMENTS

| | | |
|---|---|---|
| EP | 1093842 | 4/2001 |
| JP | 2002-015056 | 1/2002 |

(Continued)

*Primary Examiner* — Jason K Niesz
(74) *Attorney, Agent, or Firm* — Steptoe & Johnson LLP

(57) ABSTRACT

In one embodiment there is provided a method for preparing a hair dye mixture. The method includes a scale and control system in communication with each other. The control system provides for a memory and a display, wherein the memory contains a formula that defines instructions for blending a hair dye mixture. The method displays the instructions on the display. The stylist may then view the display of instructions and add colorant(s) and dye blending material(s) to a receptacle on the scale, in accordance with the instructions, using current product packaging, such that specialized packaging requirements are not required.

11 Claims, 46 Drawing Sheets

Related U.S. Application Data

12/986,448, filed on Jan. 7, 2011, now Pat. No. 8,567,455, and a continuation-in-part of application No. 13/278,374, filed on Oct. 21, 2011, now Pat. No. 8,897,915, which is a continuation-in-part of application No. 13/086,140, filed on Apr. 13, 2011, now Pat. No. 8,393,358, application No. 13/672,584, which is a continuation-in-part of application No. 13/267,171, filed on Oct. 6, 2011, now Pat. No. 8,336,582, which is a continuation-in-part of application No. 13/086,140, application No. 13/672,584, which is a continuation-in-part of application No. 13/086,140, which is a continuation-in-part of application No. 12/986,448, which is a continuation-in-part of application No. 12/849,427, filed on Aug. 3, 2010, now Pat. No. 8,393,363, which is a continuation-in-part of application No. 12/396,050, filed on Mar. 2, 2009, now Pat. No. 7,963,303.

(60) Provisional application No. 61/557,611, filed on Nov. 9, 2011, provisional application No. 61/446,123, filed on Feb. 24, 2011, provisional application No. 61/442,553, filed on Feb. 14, 2011, provisional application No. 61/033,053, filed on Mar. 3, 2008, provisional application No. 61/115,960, filed on Nov. 19, 2008.

(56) References Cited

U.S. PATENT DOCUMENTS

| | | | |
|---|---|---|---|
| 4,967,938 A | 11/1990 | Hellenberg | |
| 5,078,302 A | 1/1992 | Hellenberg | |
| 5,119,973 A | 6/1992 | Miller et al. | |
| 5,163,010 A * | 11/1992 | Klein et al. | 700/239 |
| 5,193,720 A | 3/1993 | Mayberry | |
| 5,268,849 A | 12/1993 | Howlett et al. | |
| 5,328,057 A | 7/1994 | Hellenberg et al. | |
| 5,365,722 A | 11/1994 | Edwards | |
| 5,368,196 A | 11/1994 | Hellenberg et al. | |
| 5,402,834 A * | 4/1995 | Levin et al. | 141/83 |
| 5,474,211 A | 12/1995 | Hellenberg | |
| 5,493,840 A | 2/1996 | Cane | |
| 5,511,695 A | 4/1996 | Chia et al. | |
| 5,558,251 A | 9/1996 | Neri | |
| 5,632,314 A | 5/1997 | Koppe | |
| 5,697,527 A | 12/1997 | Altieri, Jr. et al. | |
| 5,711,458 A | 1/1998 | Langeveld et al. | |
| 5,784,854 A | 7/1998 | Mazzalveri | |
| 5,855,626 A | 1/1999 | Wiegner et al. | |
| 5,862,947 A | 1/1999 | Wiegner et al. | |
| 5,938,080 A | 8/1999 | Haaser et al. | |
| 5,992,691 A | 11/1999 | Post et al. | |
| 6,003,731 A | 12/1999 | Post et al. | |
| 6,089,408 A | 7/2000 | Fox | |
| 6,164,499 A | 12/2000 | Chia | |
| 6,180,892 B1 * | 1/2001 | Li | 177/116 |
| 6,191,371 B1 * | 2/2001 | Olberg et al. | 177/25.14 |
| 6,360,961 B1 | 3/2002 | Marazzi | |
| 6,490,492 B1 * | 12/2002 | Fertig et al. | 700/90 |
| 6,935,386 B2 | 8/2005 | Miller et al. | |
| 6,991,004 B2 | 1/2006 | Kaufhold et al. | |
| 7,121,430 B2 | 10/2006 | Mink et al. | |
| 7,147,012 B2 | 12/2006 | Kaufhold et al. | |
| 7,185,789 B2 | 3/2007 | Mink et al. | |
| 7,557,311 B2 | 7/2009 | Umemoto | |
| 7,654,416 B2 | 2/2010 | Buining et al. | |
| 7,690,405 B2 | 4/2010 | Miller et al. | |
| 2003/0065450 A1 * | 4/2003 | Leprince | 702/19 |
| 2005/0092772 A1 | 5/2005 | Miller et al. | |
| 2005/0165705 A1 * | 7/2005 | Lauper et al. | 705/500 |
| 2005/0194403 A1 | 9/2005 | Mink et al. | |
| 2005/0252934 A1 | 11/2005 | Miller et al. | |
| 2005/0264794 A1 * | 12/2005 | Inzinna et al. | 356/45 |
| 2006/0033907 A1 * | 2/2006 | Inzinna, Jr. | 356/45 |
| 2006/0181707 A1 | 8/2006 | Gibson et al. | |
| 2006/0231578 A1 | 10/2006 | Mink et al. | |
| 2007/0044863 A1 | 3/2007 | Engels et al. | |
| 2007/0084520 A1 | 4/2007 | Driessen et al. | |
| 2007/0199159 A1 | 8/2007 | Schmenger et al. | |
| 2008/0178399 A1 | 7/2008 | Vena et al. | |
| 2010/0318220 A1 | 12/2010 | Saranow et al. | |

FOREIGN PATENT DOCUMENTS

| | | |
|---|---|---|
| KR | 10-2000-0059262 | 10/2000 |
| WO | WO 02-083282 | 10/2002 |
| WO | WO 03-090914 A2 | 11/2003 |

* cited by examiner

FIG. 28I

```
Create New Formula                Comments   Admin        [icon]   Log Out
For: Amy Shapiro                                                    Sheri 2814    Service:  2816    2818
      Edit    Highlight                   John Frieda Ingredient:                    Parts:
                                                         Dispense    2534
  1  8G Medium Golden Blonde  2812a  ☐☐ Show    10       Formula
                                     ☐☐ Chart 2  7G Dark Golden Blonde    2812c  ☐☐ Show    5        Save        2828
                                     ☐☐ Chart           Formula 3  Enter 3rd Ingredient            ☐☐ Show
                                     ☐☐ Chart
      Developer:                    Parts:                Convert     2538
                                                         Formula
  1  30 Vol                   2812b              30

2  Enter 2nd Developer                                 ◁ Back    Cancel
                                                         2824       2826
```

```
Modify Formula                    Comments   Admin        [icon]   Log Out
For: Amy Shapiro                                                    Sheri Service:
      Edit    Highlight                   John Frieda Ingredient:                    Parts:
                                                         Dispense
  1  8G Medium Golden Blonde         ☐☐ Show    10       Formula
                                     ☐☐ Chart 2  7G Dark Golden Blonde           ☐☐ Show    5        Save
                                     ☐☐ Chart           Formula 3  Enter 3rd Ingredient            ☐☐ Show
                                     ☐☐ Chart
      Developer:                    Parts:                Convert
                                                         Formula
  1  30 Vol                                      30

2  Enter 2nd Developer                                 ◁ Back
```

Dispense
Target amount EXCEEDED. New batch size will be = 247.0 g

| | | Batch Size: *3024* | |
|---|---|---|---|
| | John Frieda  |  Highlights | 247.0 g | Dispense |
| 1 | 8G Medium Golden Blonde | 58.0 g | 55.5g ✓ |
| 2 | 7G Dark Golden Blonde | 27.0 g | |
| 1 | Developer: 30 Vol | 165.0 g | |

*3024*

55.5/50.0

50.0

Cancel Batch — *3052*
Reformulate Batch — *3054*

Edit Formula
For: Amy Shapiro

Batch Size:

[Edit]  [Clear ALL]   John Frieda | Highlights   225.0 g

Ingredient:

⊗ 1 | 8G Medium Golden Blonde | ☐☐ Show Chart | 50.0 g

⊗ 2 | 7G Dark Golden Blonde | ☐☐ Show Chart | 25.0 g

3 | Add Ingredient | ☐☐ Show Chart | g

Developer:

⊗ 1 | 30 Vol | 150.0 g

Log Out Sheri
Comments

Weigh-Out
For: Salon | Place bowl on scale.

Log Out
Sheri

| Batch: | | Colorist: | |
|---|---|---|---|
| 1 | Ames, Theresa Lowlight | Susan Peterson | |
| 2 | Friedman, Barb Refresh | Jodi Yi | |

Place bowl with left-over batch on scale.

Cancel

Weigh-Out
For: Salon | Choose batch to Weigh-Out.

Log Out
Sheri

| Batch: | | Colorist: | Weigh Out | Amount: |
|---|---|---|---|---|
| 1 | Ames, Theresa Lowlight | Susan Peterson | | 3142 |
| 2 | Friedman, Barb Refresh | Jodi Yi | | 3142 |

+More Weigh-outs    Close

SYSTEM AND METHOD FOR COLOR PREPARATION AND MANAGEMENT

CROSS REFERENCE TO RELATED APPLICATIONS

The present application claims priority to U.S. Provisional Application Ser. No. 61/557,611, filed Nov. 9, 2011, which is hereby incorporated by reference. The present application is also a continuation in part of U.S. application Ser. No. 13/081,147, filed Apr. 6, 2011, which claims priority to U.S. Provisional Application Ser. No. 61/446,123, filed Feb. 24, 2011, all of which are hereby incorporated by reference. The present application is also a continuation in part of U.S. application Ser. No. 13/371,928, filed Feb. 13, 2011, which claims priority to U.S. Provisional Application Ser. No. 61/442,553, filed Feb. 14, 2011, and is a continuation in part application of U.S. application Ser. No. 12/986,448, filed Jan. 7, 2011, all of which are hereby incorporated by reference. The present application is also a continuation in part of U.S. application Ser. No. 13/278,374, filed Oct. 21, 2011, which is a continuation in part of U.S. application Ser. No. 13/086,140, filed Apr. 13, 2011, all of which are hereby incorporated by reference. The present application is also a continuation in part of U.S. application Ser. No. 13/267,171, filed Oct. 6, 2011, which is a continuation in part of U.S. application Ser. No. 13/086,140, filed Apr. 13, 2011, all of which are hereby incorporated by reference. The present application is also a continuation in part of U.S. application Ser. No. 13/086,140, filed Apr. 13, 2011, which claims priority to U.S. Provisional Application Ser. No. 61/442,553, filed Feb. 14, 2011, all of which are hereby incorporated by reference. U.S. application Ser. No. 13/086,140 is a continuation in part application of U.S. application Ser. No. 12/986,448, filed Jan. 7, 2011, which is a continuation in part of U.S. application Ser. No. 12/849,427, filed Aug. 3, 2010, which is a continuation in part application of U.S. application Ser. No. 12/396,050, filed Mar. 2, 2009, which claims priority to both U.S. Provisional Application Ser. No. 61/033,053, filed Mar. 3, 2008, and U.S. Provisional Application Ser. No. 61/115,960, filed Nov. 19, 2008, all of which are hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The present disclosure relates to a method and system that combines components to produce desired hair dye or other desired formulations.

BACKGROUND

The present disclosure can be used in various fields and have various applications. In one such field, namely, cosmetics and hair dye preparations, the current field packages hair dyes in small containers, including but not limited to, various sizes of tubes and bottles. They further provide salons with recipe chart(s) that show how much of ingredient "A" is to be mixed with how much of ingredients "B" and "C" and "D" to produce the desired end color. To produce the desired color, the colorist must first locate the required ingredients. This can be a challenge unto itself at a busy salon with multiple colorists. In addition, with as many as 60 or more ingredients in each manufacturer's colorant lines, using the correct materials in the right amounts is very important. After selecting the color to be used, the next step is to squeeze or pour the approximate amounts of each ingredient into a mixing bowl. Various coarse measurement techniques are currently used, so there is very little control over the end product. This current method employed by most salons lacks precision and control and does not ensure correct results. Stock color recipes are listed on a color chart provided by the colorant manufacturer. Color formulations are often adjusted to suit a particular customer's needs. These custom colors are typically recorded on 3×5 cards or other manually prepared means and filed away for future reference. The drawbacks to this approach include: inaccurate volumetric measurements (" . . . add ½ capful . . . " "squeeze tube to line . . . "); end results that are highly dependent on operator skill level or chance; no controls are available to monitor outcomes; and reliance on handwritten customer records that have no backups; as well as the whole process being devoid of meaningful information and control. Overall, this creates a cluttered, improper, and disorganized process totally devoid of accurate measurement.

Fully-automatic, computer-controlled dispensers designed for hair coloring materials were introduced in the 1990's to address the weaknesses of the current hand-mixing process. Most of these models sold for $10,000 to $20,000, making these dispensers unaffordable for virtually all salons. These dispensers automatically measured the correct amount of each ingredient with great precision and a software database stored the stock color recipes as well as specially created blends, and since the formulation and customer information were stored electronically, locating the required information was easy. Files could also be backed up so valuable customer history data was more secure and easily shared with other locations.

However, these earlier automatic dispensers had one very serious drawback; they required specially-designed internal storage bags for the various color components. These containers typically were designed to hold one or two liters and were specially constructed to eliminate the possibility of air infiltration, which could oxidize and ruin the dye. Unfortunately, the required bulk packaging further required manufacturers to incur very sizeable, multi-million dollar capital costs to add additional manufacturer's filling lines and to produce the special containers. Additionally, major drawbacks of the automatic dispensers included their high cost, extreme complexity, high maintenance requirements, and cost for hair color producers to adopt due to specialized packaging requirements (e.g., the requirement that hair color producers incur high cost capital investments to meet the automatic dispensers' unique packaging requirements). Therefore, the project was deemed uneconomical and did not go forward. This failure created a need for a much simpler, more cost-effective approach which eliminates the drawbacks of earlier designs.

When a person needs to blend or mix a number of components, the need to eliminate waste, create a cost-effective approach to aid the user, and provide a process that produces the desired mixture is highly desired. There is a need to provide a monitored approach, coupled with accurate measurement means to eliminate the potential for error and improve overall accuracy, while producing accurate measurements and information to control the whole process.

SUMMARY

One or more of the embodiments in the present disclosure aim to bring control to an otherwise un-controlled process at a substantial reduced cost (about $2500-$3500). One or more of the current embodiments solves problems that have existed but have never been solved since the development of professional hair coloring salons. The new monitored approach disclosed herein includes a computer-driven system with precision scale, a computer-based recipe management system, and optional storage to manage and protect blending ingredients, and will, if necessary, lock to minimize theft, as well as a color management system for the combination of components to produce a desired mixture, along with the management of the components, information, and businesses dealing with the same. Every color management system has a blending station with the company's proprietary color blending management software. The blending station includes a keyboard, LCD screen (which may be a touch screen) and a scale in communication with the computer to provide feedback on exactly how much of each ingredient has actually been added to the batch. The computer-driven system may also contain storage drawers or other receptacles to organize and store the individual blending components. Each receptacle may have an LED or other indicator to simplify product selection, which is controlled by the computer-driven system. Each receptacle may also have electronically controlled locking mechanisms, which are also driven by the system to reduce theft. In addition, the color management system can be enhanced with an optional bar code reader to verify the ingredients against the color recipe and to facilitate inventory control.

In one embodiment, there is provided a color management system for preparation of mixtures, such as, but not limited to, hair dye mixtures, personal care product mixtures, and the like. The color management system includes a computer-driven system having at least a memory, input controls, and a display. The memory has the capacity to store at least one mixture formula for the mixing of one or more components, such as, but not limited to, colorants, dyes, and/or blending materials. The color management system also includes a scale communicating with the computer system to monitor a weight on the scale and provides information on changes thereto. In addition, the computer system, upon receiving an input for a creation of a mixture, displays a formulation of the mixture indicating the component(s) and amount(s) needed to create the desired mixture.

In another embodiment, a method is provided for preparing a hair dye mixture. The method includes having a scale and control system in communication with each other. The control system provides for a memory and a display, wherein the memory contains a formula defining instructions for blending a hair dye mixture. The method displays the instructions on the display. The user may then view the display of instructions and then adds to a receptacle on the scale, colorant(s) and dye blending material(s) in accordance with the instructions by using hair color manufacturers' standardized packaging, such that non-standardized or specialized packaging of colorants and/or dye blending materials are not required.

In another aspect, there is provided a computer system that monitors changes in the weight on the scale and adjusts (i.e., recalculates) the formulation when a weight of a component added to the mixture is different (larger or smaller) than a recommended formulated amount and the computer system receives an input to adjust the formulas to the newly-determined reconfigured weight of the component. The computer system may also monitor changes in the weight on the scale and displays a difference between a recommended formulated amount of a component and an amount of the component added and measured by the scale. The differences displayed may also be measured down to a zeroed amount left to indicate how much additional of each other component is needed to be added to reach the recommended formulation. The computer system may also be linked to the salon's management software to exchange information on customers and formulas associated with particular customers. The computer system may store in the memory any changes in the formulation of the mixture. The computer system may also store in the memory any changes in the formulation of the mixture and send the changes in the formulation of the mixture to the salon's management software.

Yet in other aspects, the color management system may adjust the formulation of a mixture upon receiving an input on a total amount of mixture required or a strength of the mixture. Yet further aspects provide for receiving an input that the mixture is a custom color, the custom color software acts to display a listing of components and blending materials, activates indicator(s) for particular selected component(s), monitors a separate amount and a total amount of the components placed in the bowl or other container, and stores a formulated mixture upon receiving an input that the mixture is accepted and completed.

In still another embodiment, the operator enters a customer name into the computer which displays the customer's history, which may include the formulas stored and previously used for the customer. If this is a new customer, a history file is created and the operator selects desired components from a pallet chart, recipe book, or customer history file; enters the required amount of finished components and finally the activator strength is selected. The operator is instructed to place an empty batch bowl on the scale and the system then prompts the operator for the first component, and an LED or other indicator adjacent to the corresponding receptacles is illuminated and/or the receptacles automatically are unlocked and/or opened. The operator adds the amount indicated on the display panel, while the scale monitors exactly how much has been added and provides feedback to the operator as to when to stop adding, leading to an extremely accurate dispense. After returning the bottle, tube, or other container to the designated storage receptacle, the operator presses "next," which closes and locks the storage receptacle, and the next LED or other indicator is activated and the corresponding next receptacle is unlocked and/or opened to provide access to the next ingredient. Bar code readers can also be used to control the ingredient solution and control process. Afterwards, a batch record is placed in the customer's history file.

In yet another embodiment, a method for preparing a hair dye mixture uses a scale in communication with a control system, wherein the control system includes a processor, a memory, and a display. The memory contains software configured to receive a formula defining instructions for blending a hair dye mixture using one or more hair dye blending materials and amounts recommended for producing a pre-defined batch size of the hair dye mixture. The method includes: displaying ingredient dispensing instructions on the display for producing the hair dye mixture; monitoring a weight on the scale as hair dye blending materials are added to a receptacle on the scale in accordance with said instructions; calculating information associated with the hair dye mixture when a weight of a colorant or dye blending material being added to the scale is different than the amount recommended in the formula for the pre-defined batch size; and displaying the calculated information associated with the hair dye mixture on the display.

In one embodiment, the calculated information associated with the hair dye mixture includes a first graphic indicator on the display, wherein the first graphic indicator informs a user of the dispensed weight of the first ingredient based on the weight measured by the scale by dynamically graphically filling the first graphic indicator with a progress graphic corresponding to the dispensed formula weight of the first ingredient. In some embodiments, the first and second graphic indicators are the same shape with the same dimensions, while in other embodiments, the first and second graphic indicators have different virtual volumes. In one embodiment, measurement lines or hash marks are displayed on the first and second graphic indicators to inform the user of the virtual volume of the first graphic indicator and the second graphic indicator. In another embodiment, the virtual volume of the first graphic indicator is different from the virtual volume of the second graphic indicator.

Continuing, in still another embodiment, the method for preparing a hair dye mixture uses a scale in communication with a control system, the control system including a memory and a display. The memory containing a formula defining ratios between a plurality of hair dye ingredients corresponding to a first color system. The method includes: receiving input from a user to convert a first color system mixture to a second color system mixture, wherein conversion instructions are stored on the memory; converting the first color system formula to the second color system formula corresponding based on the conversion instructions thereby enabling the user to create the first color system formula with ingredients from the second color system; displaying the instructions for producing the hair dye mixture on the display, including recommended amounts of the hair dye blending materials to be added to the scale; monitoring a weight on the scale as hair dye blending materials are added to a receptacle on the scale in accordance with said instructions; and indicating on the display the recommended amounts of the hair dye blending materials in comparison to the amounts that have been added to the scale.

In one embodiment, the method further comprises validating the hair dye blending materials being adding to the receptacle by comparing a hair color manufacturers' component packaging being used against the hair dye blending materials in the formula to ensure and validate accurate production of the hair dye mixture. Continuing, the conversion instructions may be editable by the user. In some embodiments, the first color system is a first brand and the second color system is a second brand made by the same manufacturer. In other embodiments, the first color system is a first brand and the second color system is a second brand made by different manufacturers. In yet other embodiments, the method further comprises indicating to the user that the first color system formula has been converted to the second color system.

Referring now to another method for preparing a hair dye mixture, the method uses a scale in communication with a control system, the control system including a memory and a display. The memory containing a formula for blending a hair dye mixture using one or more hair dye blending materials and dispensing amounts recommended for producing a pre-defined batch size of the hair dye mixture using pre-defined hair characteristics. The method includes: receiving user input that includes one or more selected hair characteristics, wherein the one or more selected hair characteristics are used to determine batch sizes and associated dispense amounts; indicating on the display the recommended amounts of the hair dye blending materials in comparison to the amounts that have been added to the scale; monitoring a weight on the scale as hair dye blending materials are added in accordance with the formula; calculating the dispense amounts of the hair dye mixture for an adjusted batch size when the one or more selected hair characteristics generate a different batch size than the pre-defined batch size; and displaying the calculated dispense amounts on the display for the adjusted batch size.

The one or more selected hair characteristics may include hair texture, hair length, amount of hair regrowth, amount of gray, natural hair color, current hair color, non-chemically damaged hair, chemically damaged hair, or physically damaged hair. The one or more hair characteristics selectable by the user depend on whether the user is a novice, intermediate, advanced, or expert stylist. In some embodiments, the method further comprises analyzing, by a processor, a picture of the client, wherein the processor selects one or more hair characteristics based on the picture analysis. In some embodiments, the one or more hair characteristics selected by the processor override the one or more hair characteristics selected by the user.

In still another embodiment, a method for preparing a hair dye mixture also uses a scale in communication with a control system. The control system includes a memory and a display, the memory containing a formula for blending a hair dye mixture using one or more hair dye blending materials and dispensing amounts recommended for producing a pre-defined batch size of the hair dye mixture. The method includes: displaying ingredient dispensing instructions on the display for producing the hair dye mixture; monitoring a weight on the scale as hair dye blending materials are added in accordance with the formula; calculating dispense amounts for ingredients of the hair dye mixture for an adjusted batch size when a weight of a hair dye blending material being added to the scale is different than the amount recommended in the formula for the pre-defined batch size; and displaying the calculated dispense amount on the display for the adjusted batch size.

BRIEF DESCRIPTION OF THE DRAWINGS

A fuller understanding of the foregoing may be had by reference to the accompanying drawings, wherein:

FIGS. 28A-I show various screenshots of screens associated with a "Create New Formula" GUI module according to one embodiment.

FIG. 28J shows a screenshot of a screen associated with a "Modify Formula" GUI module according to one embodiment.

FIGS. 29A-B show various screenshots of screens associated with a "Create New Formula" GUI module according to one embodiment.

FIGS. 30A-J show various screenshots of screens associated with a "Dispense Formula" GUI module according to one embodiment.

FIGS. 31A-E show various screenshots of screens associated with a "Weigh-Out" GUI module according to one embodiment.

DETAILED DESCRIPTION OF THE EMBODIMENTS

Figure 1A:
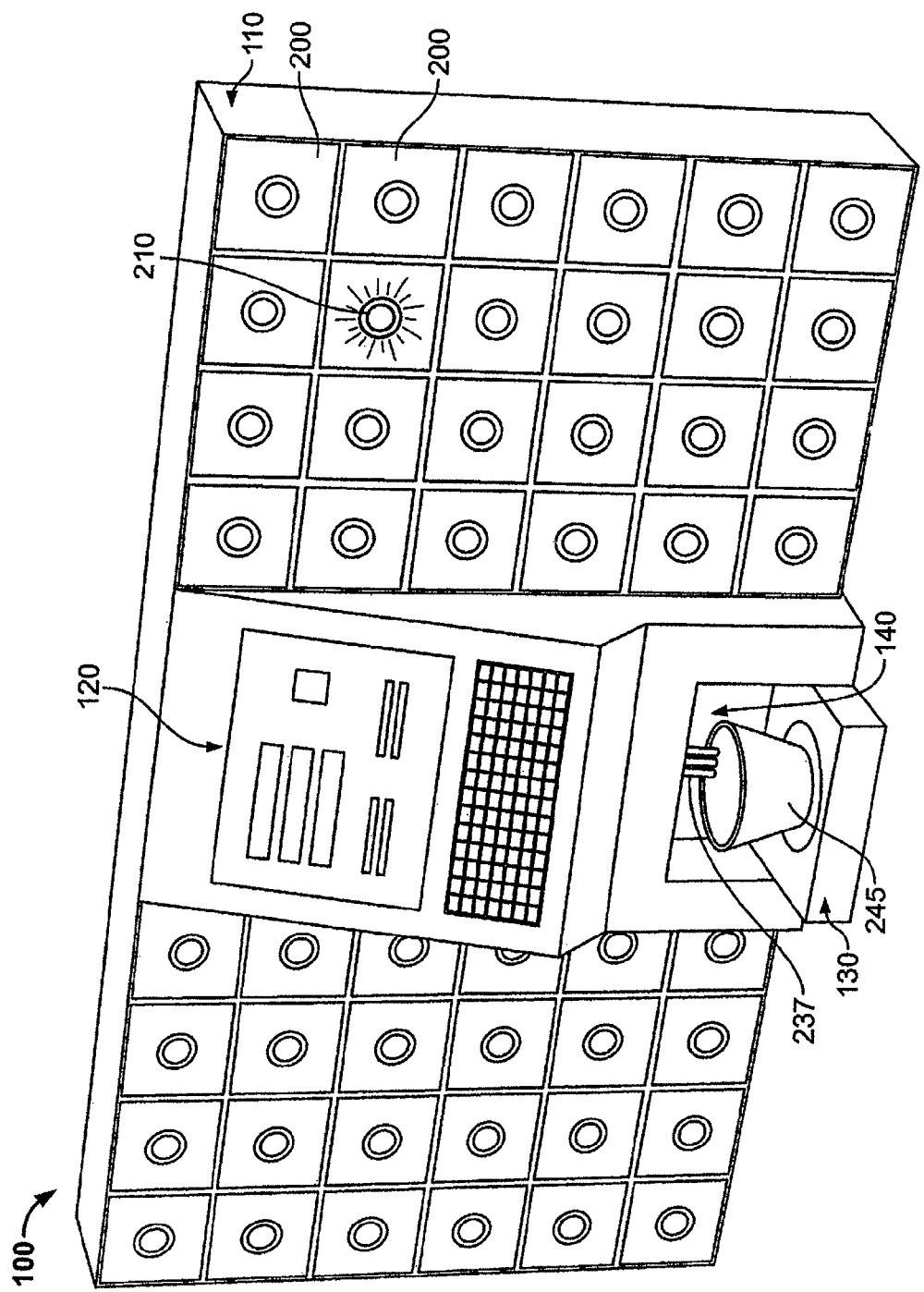
FIG. 1A is a perspective view of one embodiment of a system designed to control a process for mixing components, which includes a mixing station and optional storage receptacles.

While the present disclosure is susceptible to embodiments in many different forms, there are shown in the drawings and will be described herein, in detail, the preferred embodiments of the present disclosure. It should be understood, however, that the present disclosure is to be considered an exemplification of the principles of the present disclosure and is not intended to limit the spirit or scope of the present disclosure, claims and/or embodiments illustrated.

In a first embodiment of the present disclosure, there is shown and described a system designed to control a process for mixing components and which brings control to an otherwise un-controlled process. The components can be various ingredients to a mixture, such as, dyes used for blending hair dye mixtures, components used for blending personal beauty products, foods, and the like. The methods disclosed herein may be for preparing a hair dye, nail polish, lip gloss, shampoo, conditioner, soap, lotion, wax, fragrance, cream, body wash mixture, and the like. By definition throughout, the method may be performed as a manual process, semi-manual, or automatic process.

In a manual process, the stylist manually adds the components of the mixtures to a bowl by following instructions provided. The stylist will thus retrieve the individual components from receptacles and squeeze the contents into the bowl or other container on the scale. In a semi-manual process, the stylist is still retrieving the components from the receptacles. However, the addition of the component contents into the bowl may be with the aid of mechanical help such as an extruder, mechanical squeezer, and the like. In a limited aspect, an automatic process may also be covered by the method if the automatic machine retrieved standardized packaging components (as defined below) from storage or the receptacles. This can be conceived if a machine arm with pinchers is automatically controlled to retrieve the packaging components from storage areas and then returned the components after use.

Continuing to refer to the method, it is further defined to include a scale and control system in communication with each other. The control system provides for a memory and a display, wherein the memory contains a formula defining instructions for blending a hair dye mixture. As noted, the method displays the instructions on the display. The stylist may then view the display of instructions and then adds to the bowl or receptacle on the scale colorant(s) and dye blending material(s) in accordance with the formula or other instructions while using hair color manufacturers' standardized packaging, such that non-standardized or specialized packaging of colorants and/or dye blending materials are not required.

As defined throughout this application, the term manufacturers' standardized packaging is a significant concept and is defined herein as the structural configuration of the packaging components that contain the colorant(s) and dye blending material(s) (e.g., the shape, size, configuration, design, formation, and the like of the tubes, bottles, bags, cartridges, receptacles, or other generally used containers), which are generally available to many professional salons through normal distribution channels, and which typically have a long history of use. The manufacturers' standardized packaging may also be described as the pre-existing, presently used, commonly used, widely used, and/or prevalent structural configuration of the packaging components that contain the colorant(s) and dye blending material(s), as well as any other ingredients. In some embodiments, the manufacturers' standardized packaging is configured to be air-tight so as to prevent the oxidization of material included inside the packaging. However, the hair dye preparation system disclosed herein also may be employed with materials that are not subject to oxidation, and thus, do not require air-tight packaging.

As stated above, the hair dye preparation system disclosed herein preferably uses the pre-existing packaging, which is used currently by one or more color manufacturers, and which has not been specially designed to use with color preparation systems of any kind. In this manner, the hair dye preparation system typically uses packaging components that are generally employed by a significant percentage of color manufacturers throughout the world, or any particular area of the world, region, or other territory. Preferably, but not necessarily, the hair dye preparation system does not use packaging components that require new and/or customized designs, special features, or special manufacturing methods or facilities.

The standardized packaging is contrasted with non-standardized or specialized packaging, which is defined as custom packaging of raw material designed for specific applications or specific machines used in the hair-dye industry and which require specific sizes, quantities, or characteristics of containers and raw materials, and not generally available to the industry, but rather to only one or a few industry participants. For example, an automatic hair dye mixing and dispensing machine will require specialized packaging of the raw materials in order to fit and be compatible with the automatic dispensing machine. The fact that the currently disclosed embodiments of the color management system is compatible with the manufacturers' standardized packaging of the colorant(s) and dye blending material(s) enables this system to avoid the required use of expensive specialized packaging or other specialized requirements.

In some embodiments, the contents of the manufacturers' standardized packaging of the colorant(s) and dye blending material(s) are extracted by pouring or compression, either manually using methods such as compression or pressure, or by using various types of devices. The devices may be manual, automatic, or otherwise (e.g., spooning), which cause the removal of the colorant(s) and dye blending material(s) from a container and onto a scale (either immediately or ultimately).

Figure 1B:
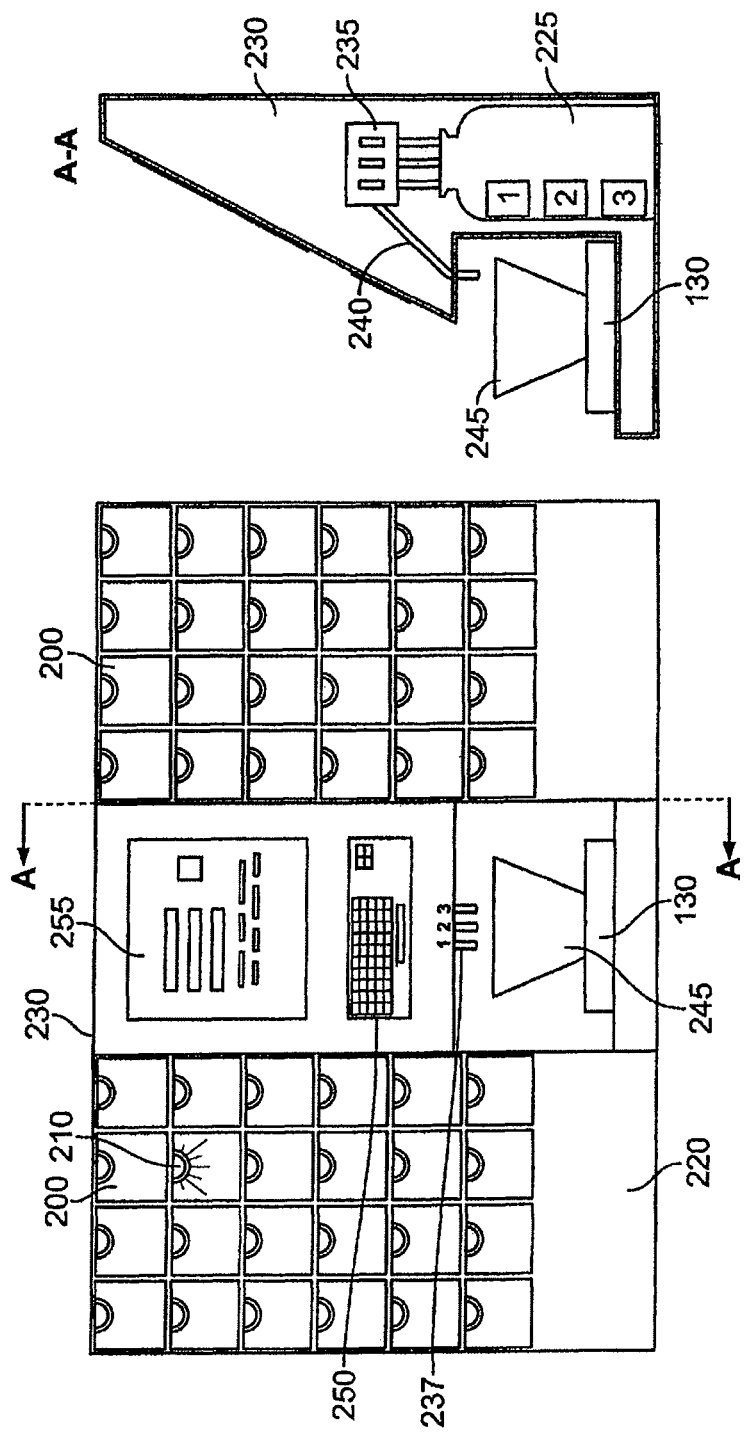
FIG. 1B is a first and cross sectional view of the embodiment from FIG. 1A.
Figure 2:
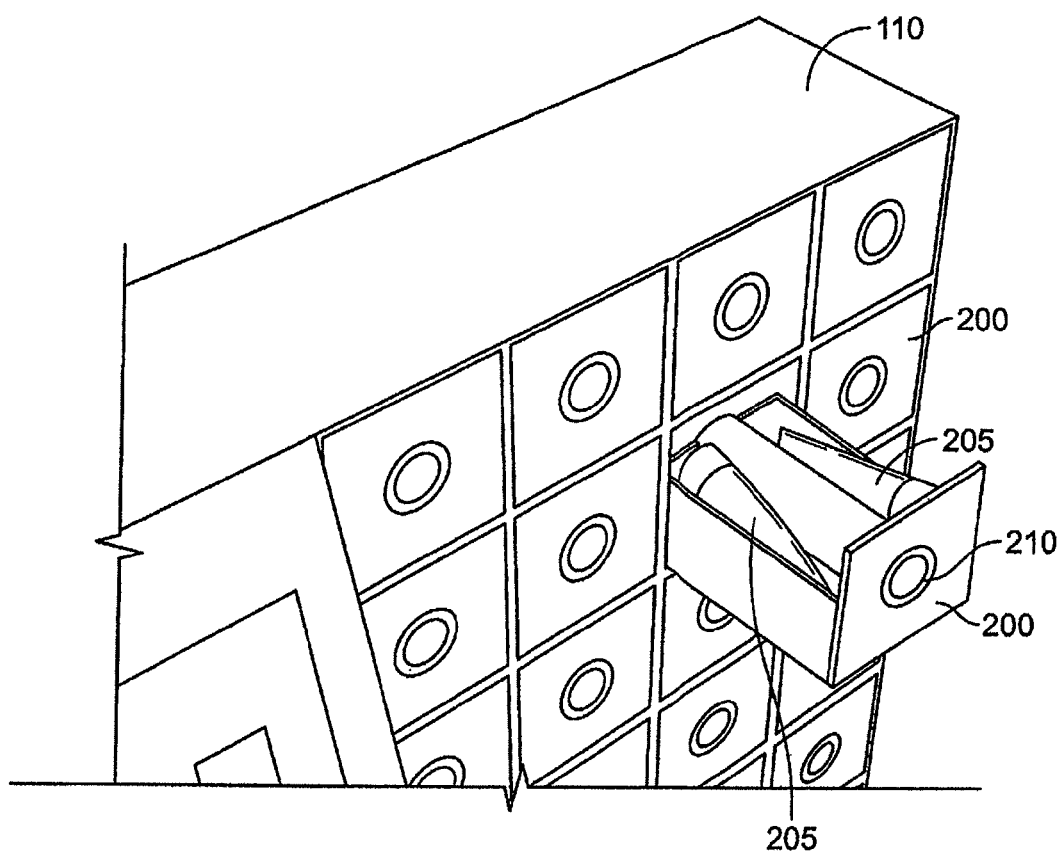
FIG. 2 is an enlarged view of a receptacle from FIG. 1A showing storage areas for the components.

Referring now to FIG. 1, one embodiment of the system is shown that is generally referenced as number 100. The system 100 includes organized storage of the components 110 (such as in one example, color blending ingredients), a computer-driven system 120, and a small electronic scale 130 to be used in monitoring the mixing or blending process. In addition, the system may, but need not, include self contained pumps 140 and/or tanks, to add common activators or ingredients, such as peroxides. The computer-driven system 120 includes one or more processors configured to execute instructions (e.g., code) stored in memory or received from an external source. When executed, the instructions provide the functionality described herein.

As shown in FIGS. 1-13, a number of different embodiments of the system 100 are illustrated. Each system 100 contains a number of bins, drawers, or receptacles 200 to organize and store the individual components, such as blending dye ingredient containers/tubes 205. Each receptacle 200 has an associated LED or other indicator 210 driven by the system 220. A small digital scale 130 is electrically connected to the system 220 to provide feedback to the system 220 on exactly how much of a given ingredient or activator was added to the specific batch.

While not necessarily the preferred embodiment, it is possible to include several small reservoirs 225 of common ingredients, such as bases and additives, stored within a storage area 230. The reservoirs 225 are coupled with metering pumps 235 to measure the common ingredients which eject from nozzles 237 into a mixture batch. Pumping channels 240 are also automatically controlled by the system 220. As illustrated, the common ingredients are either manually added or in the case of the above pumping system, automatically pumped into a mixing bowl 245.

One embodiment would be as follows:

(a) an operator enters/views the customer name or other identifying characteristic into the system 220 via an integral keyboard 250 or touchpad and display panel 255;

(b) the system 220 has a memory storing customer information and/or history of the customer's mixtures, such as a specific or predefined color scheme; the system similarly allows editing, adding, and deleting of customer information or formula;

(c) the operator may either select a previously stored desired finished mixture or dye color from the customer history, or from an available list of known ingredients, formulate a new formula;

(d) the operator is then prompted to enter the required amount of finished product (e.g., whether the operator needs 1 ounce, 2 ounces, or the like of different ingredients);

(e) the operator is then instructed to place an empty batch mixing bowl 245 on the scale 130;

(f) the system 220 will then illuminate or activate an LED or other type of indicator 210 adjacent to a corresponding receptacle, prompting the operator to select the specific component needed for the mixture (optionally, the system may control locking mechanisms on the receptacles to electronically open/close or lock/unlock the desired storage receptacles);

(g) the operator adds the amount of component that is indicated on the display panel 255 to the bowl 245 (While the amount is being added, the computer system 220 monitors the scale 130 to determine exactly how much has been added. The display panel 255 indicates how close the addition is to the target weight by displaying how much more must be added and provides feedback to the operator. This may be done by graphic or other types of indicators as noted herein. In one aspect, the graphic itself can be set such that regardless of the total amount that is needed (1 oz. or 5 oz.), the graphic will appear the same size on the display. The amount with which the graphic is filled will be scaled to accommodate the total amount needed. In comparison, a graphic showing a 1 oz. amount will fill at a faster rate than a graphic showing a 5 oz. amount.);

(h) after returning the component and closing the designated storage drawer/receptacle, the operator presses "next" (or any key specified by the computer system), and the next receptacle LED or other indicator is activated or illuminated, or the receptacle is unlocked along with the required amount of the next component or ingredient;

(i) steps (f) and (g) are repeated until all of the required components or color ingredients and activators have been added; and (j) once the batch has been completed, the precise amount of all ingredients is recorded into the customer's history file.

Had this been a custom blended mixture, a separate software function would be selected. Under this function, the operator would tell the system which ingredients were being added or deleted, and the system would record the exact amount of each addition or deletion via the integrated scale.

When the batch was complete, a record of the custom blend would be stored in the customer's history file.

It is herein noted that any type of computer system having a memory storage area, processor to run various programs, and other components well known in the computer industry can be used by the embodiments herein. The system can be wired or wirelessly communicating with the plurality of storage receptacles to control the LED or other indicators 210 or other lighting, electronic locks, opening/closing and/or sound elements to help identify the specific receptacle(s) the operator will be using and the required amount to be manually dispensed into the bowl 245 to mix the specific components. Further, the system is wired or wirelessly communicating with the electronic scale 130 and the monitor 255 to identify and display to the operator how much of a specific amount of component needs to be added into the bowl 245 and wired or wirelessly communicating with the storage receptacles when used.

On return visits, information stored would be available to precisely re-create the mixture. This concept revolutionizes the way a mixture is produced, and especially when applied to salons. It replaces a messy, uncontrolled mixing process with an easy-to-use, guided process to produce the exact mixture (such as an exact color of hair dye) time after time.

Figure 3:
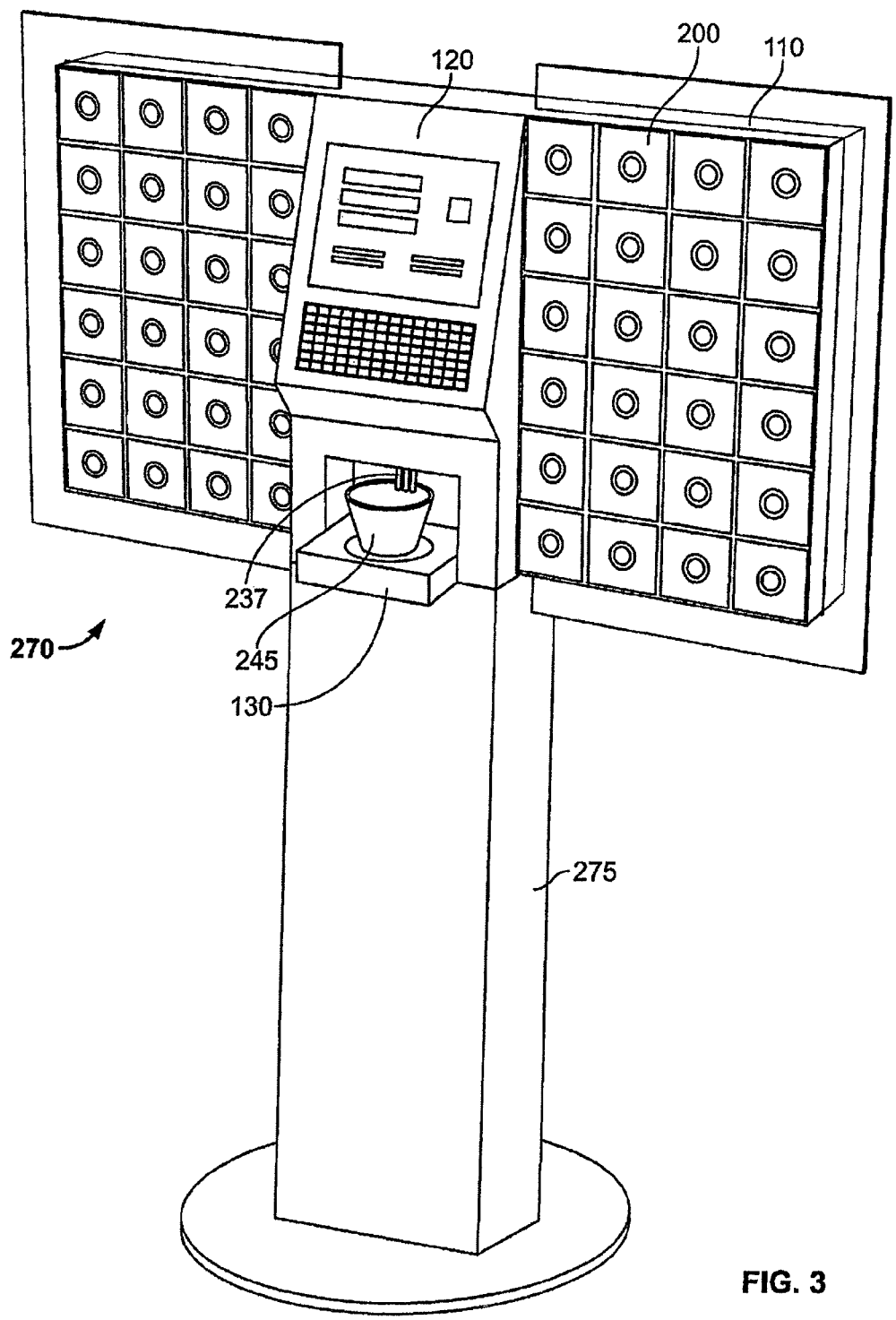
FIG. 3 is a perspective view of one embodiment of the system designed to control a process for mixing components, illustrated in use on a pedestal.
Figure 4:
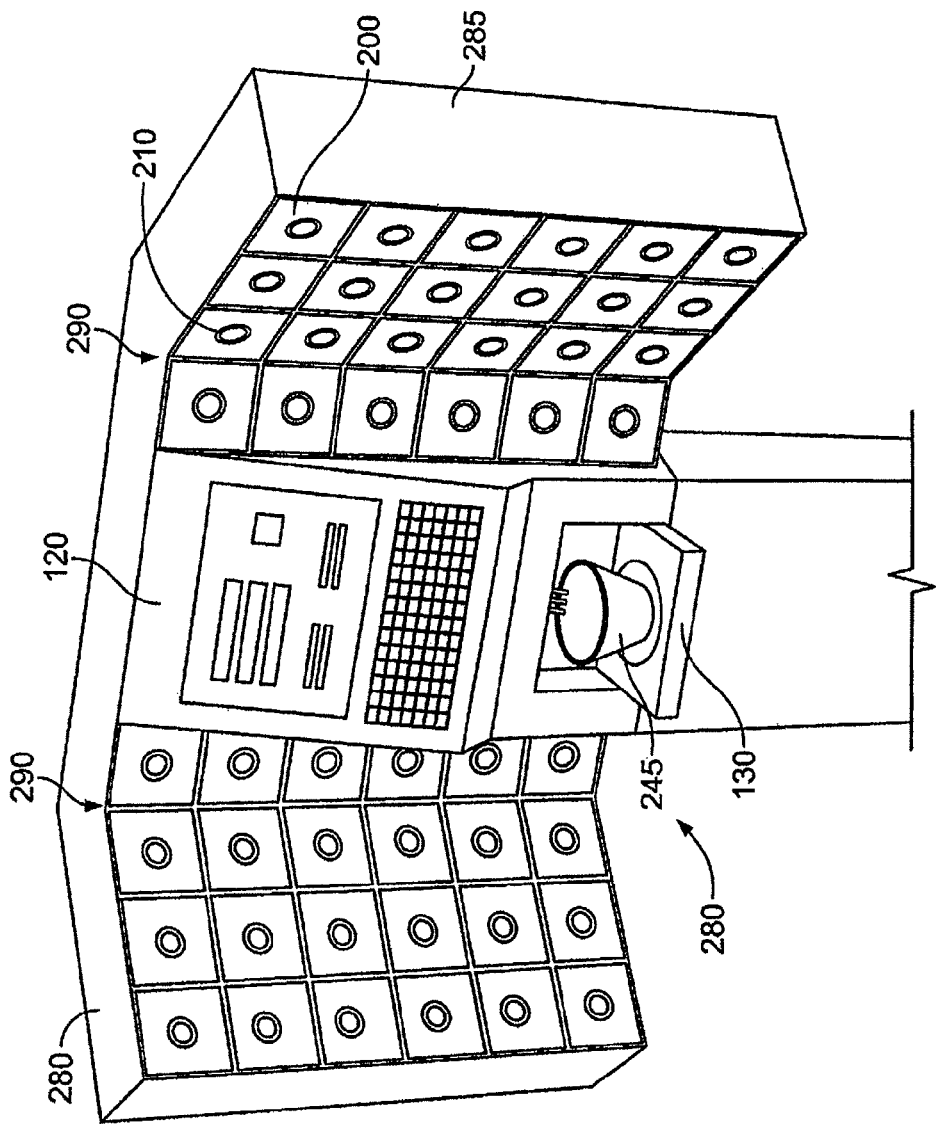
FIG. 4 is a perspective view of one embodiment of the system designed to control a process for mixing components, illustrated in use with curved receptacle storage areas.
Figure 5:
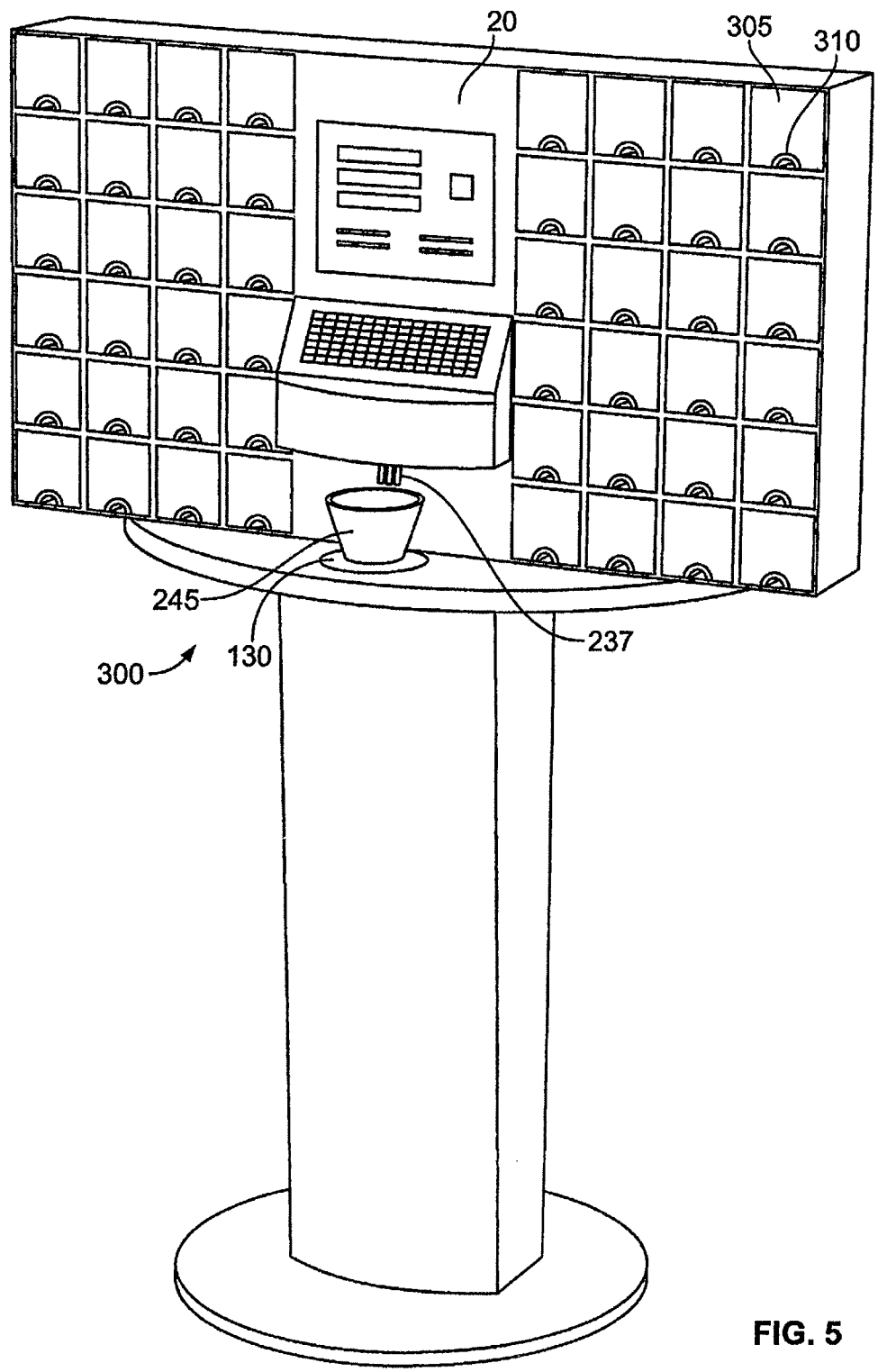
FIG. 5 is a perspective view of one embodiment of the system designed to control a process for mixing components, illustrated in use with receptacles with a change in the LED indicators.
Figure 6:
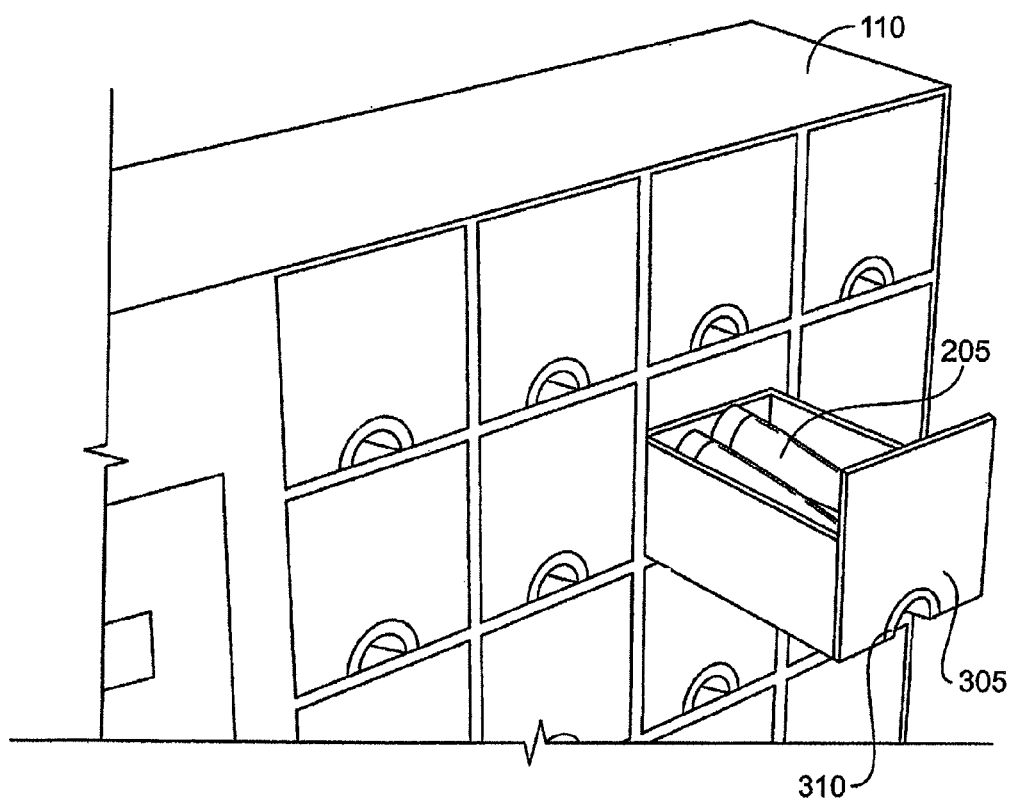
FIG. 6 is an enlarged view of a receptacle from FIG. 5.
Figure 22:
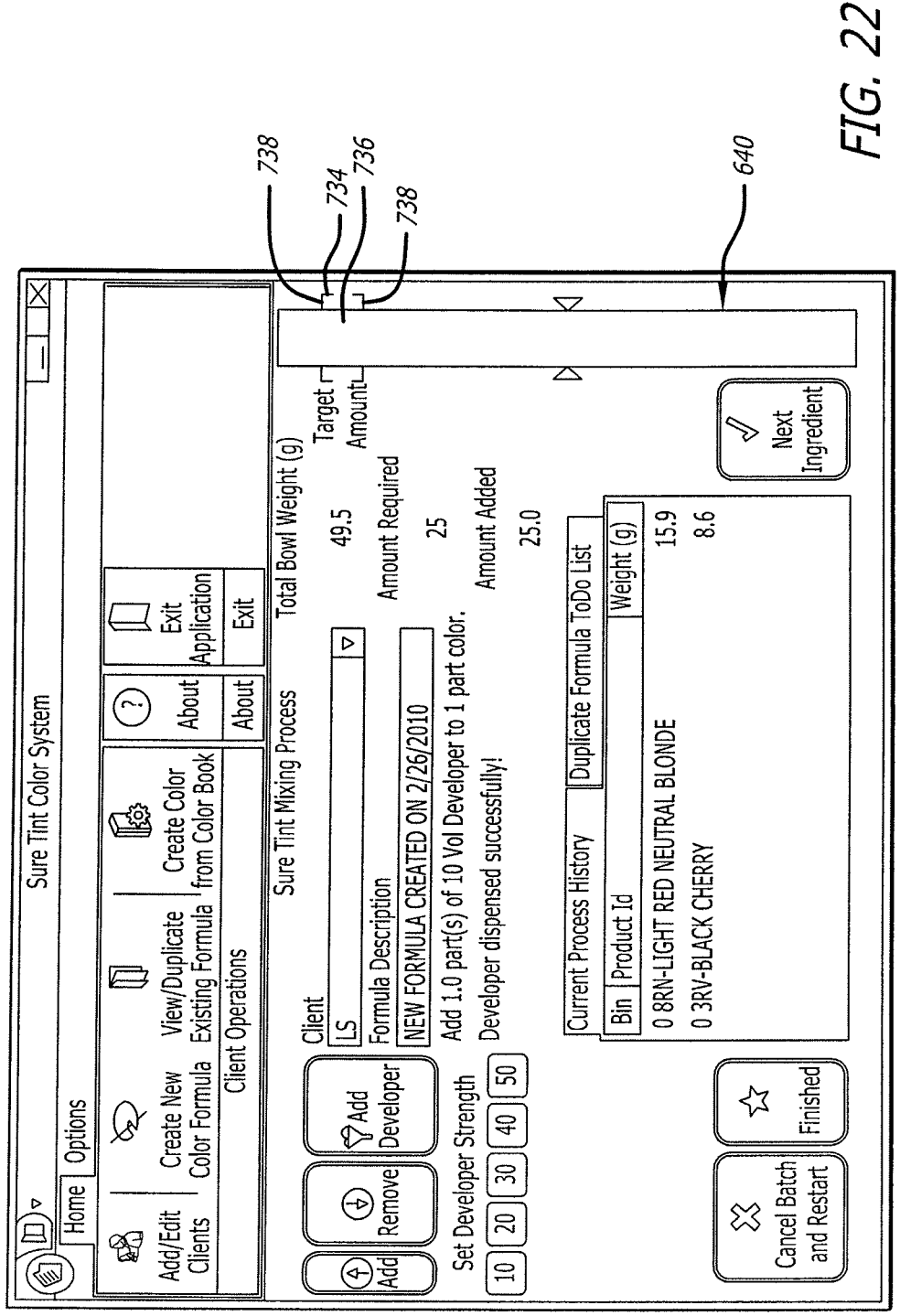
FIG. 22 is a screen shot of a color ingredient mixing system display.

The systems can be configured in various manners. For example as illustrated in FIG. 1, the system is a counter-top model, while FIG. 3 shows a free standing model 270 with a stand 275 so the system can stand on the floor. FIG. 4. shows a corner top model 280 with storage receptacle areas 285 that have curved sections 290. In addition, FIG. 22 shows various embodiments of the system with storage receptacles. In FIGS. 5-6, an alternative system 300 is shown with receptacles 305 that include LED indicators 310 on the bottom of each receptacle (as opposed to in the center, shown in the previous embodiments). In addition, in each embodiment the storage receptacles can be an optional piece to the system.

Figure 7:
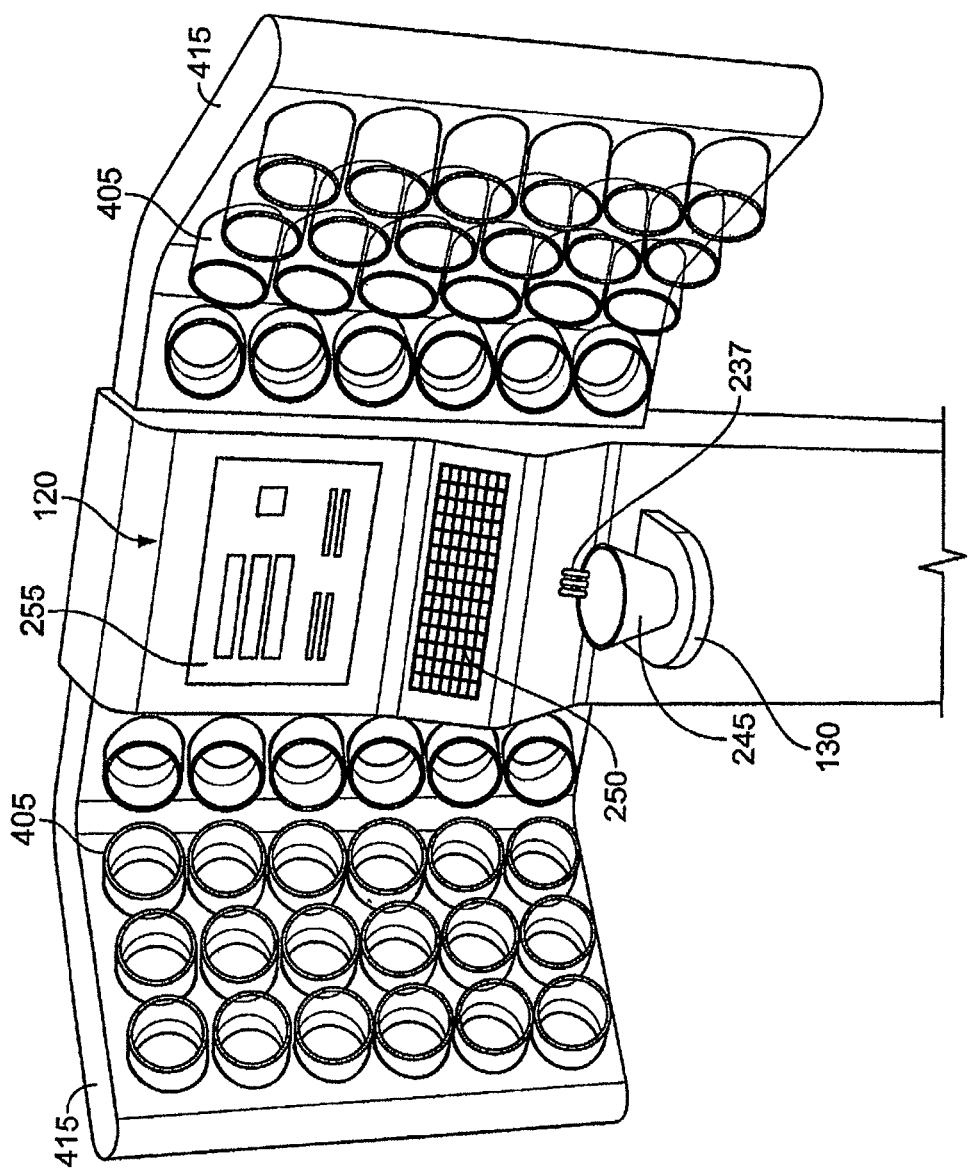
FIG. 7 is a perspective view of one embodiment of the system designed to control a process for mixing components, illustrated in use with slotted tubes as opposed to receptacles.
Figure 8:
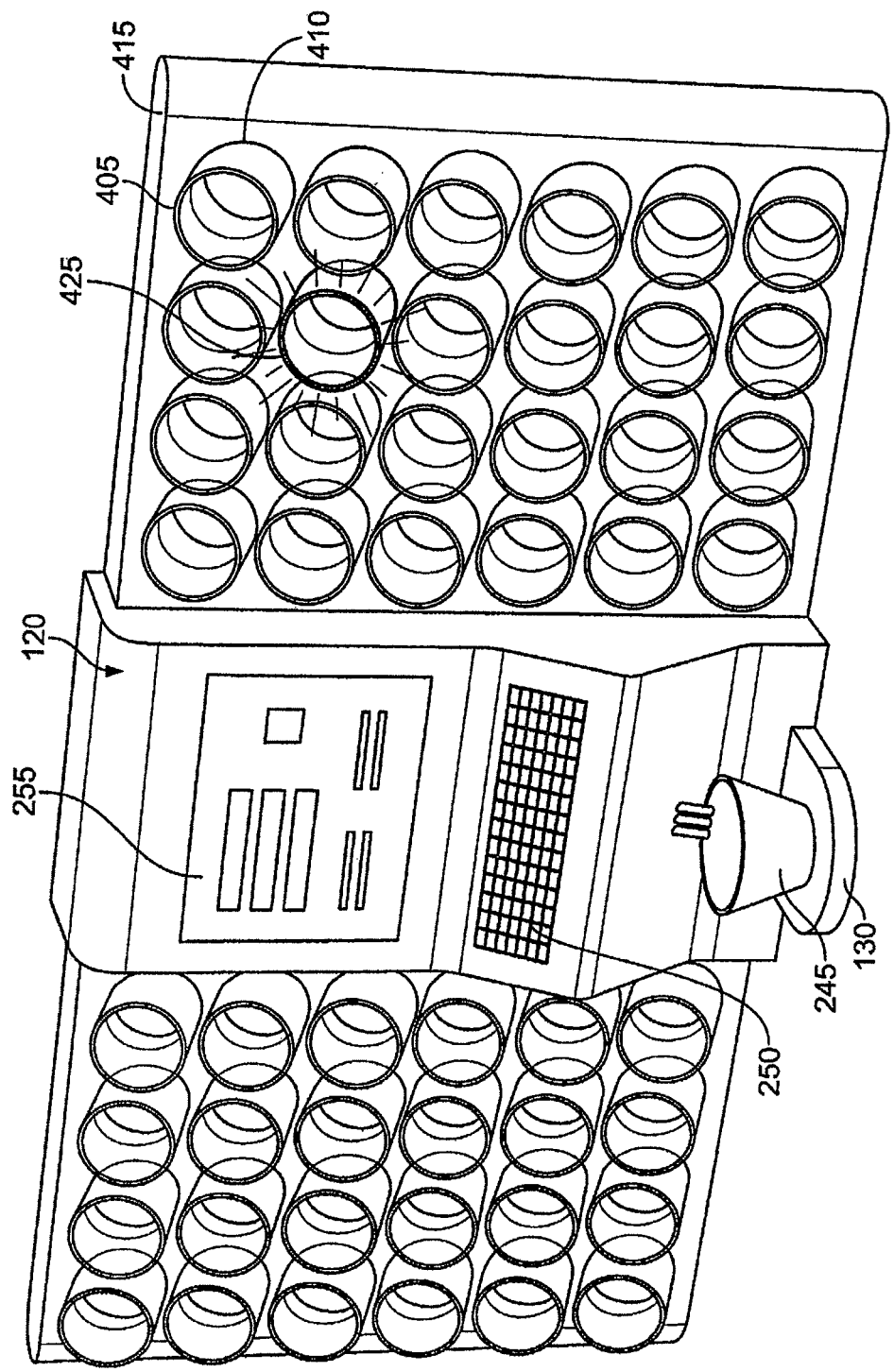
FIG. 8 is a perspective view of one embodiment of the system designed to control a process for mixing components, illustrated in use with slotted tubes as opposed to receptacles.
Figure 9:
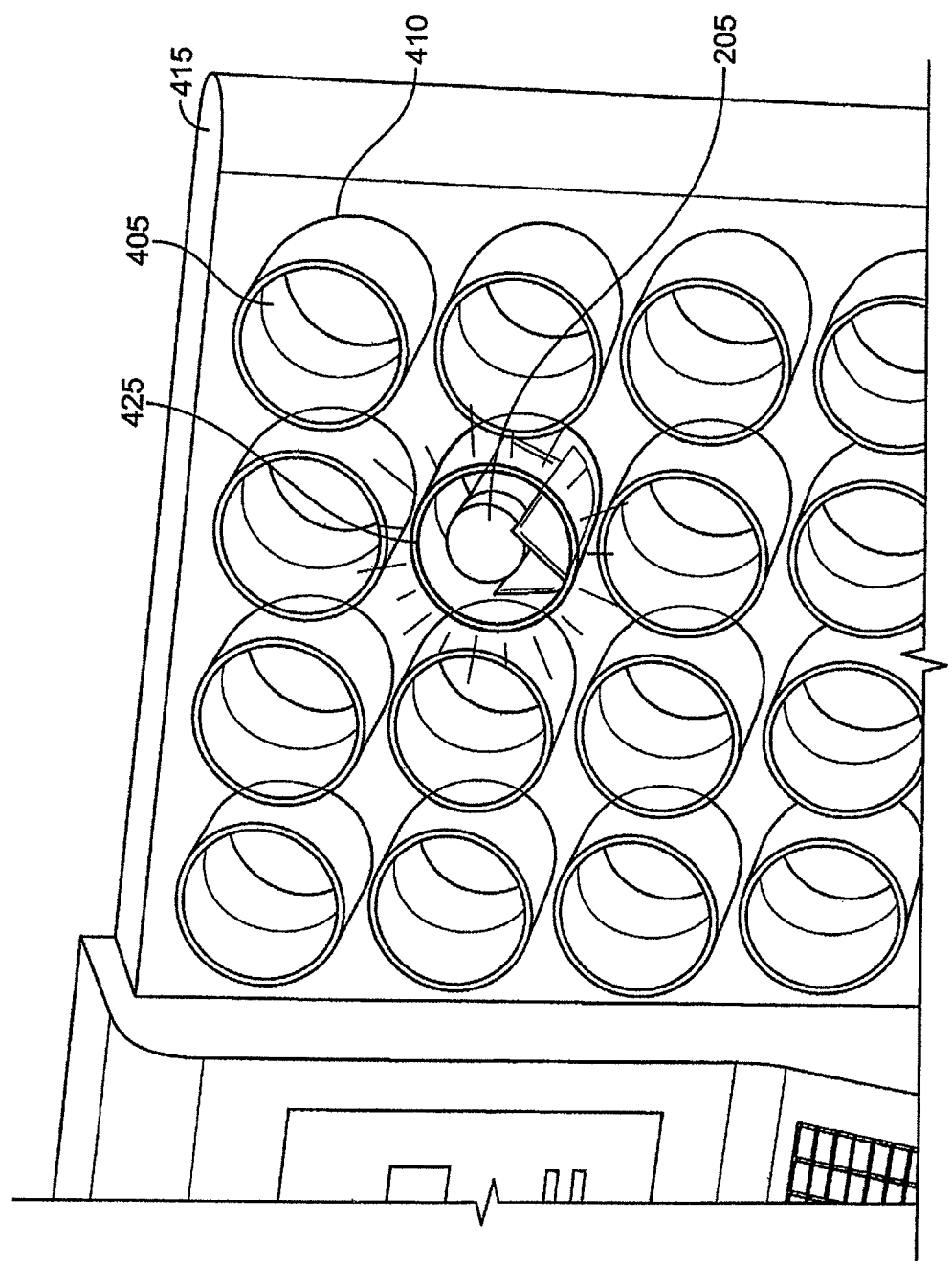
FIG. 9 is an enlarged view of the slotted tubes from FIG. 7 or FIG. 8.

In FIGS. 7-9, a system 400 is shown that includes the same components and functionality as the previous embodiments, except the receptacles are replaced with opened receptacle structures 405 that are secured into openings 410 on the side storage areas 415. The ends 420 of the tubes would include an LED indicator 425 controlled by the system 220.

The present embodiment has one or more of the following benefits over prior art systems: it eliminates mixing or blending errors; the system ensures accuracy; the simple, manual-controlled process produces perfect results regardless of operator's skill level or experience; the system maintains customer histories, so customer formulations can be precisely repeated time after time; using the system, even custom formulations are recorded for future reference; the system makes control independent of the operator, so should a colorist leave a salon, the exact color can be recreated; giving the salon greater control over customer retention or individual requests; the scale coupled with the control software can correct for over-dispensed ingredients, preventing wasted materials and off-shades; the system is compatible with current manufacturing processes and product packaging; the system brings tidiness and organization to an otherwise very messy process and would save counter space; and the control software can track material usage to help eliminate shrinkage, provide easier management reports, estimates future ingredient or inventory needs, and secures the materials and/or discourages employee theft.

Figure 11:
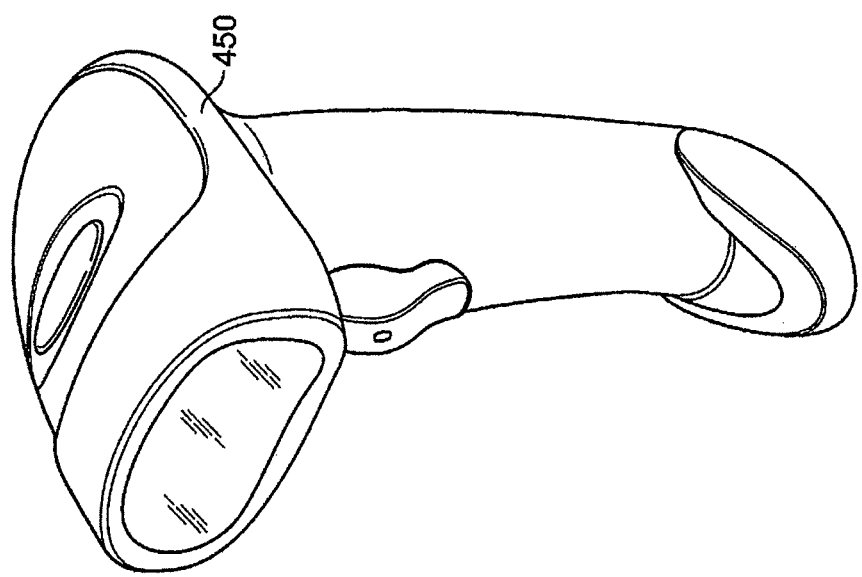
FIG. 11 is a perspective view of a bar code scanner used in one or more of the system embodiments.
Figure 10:
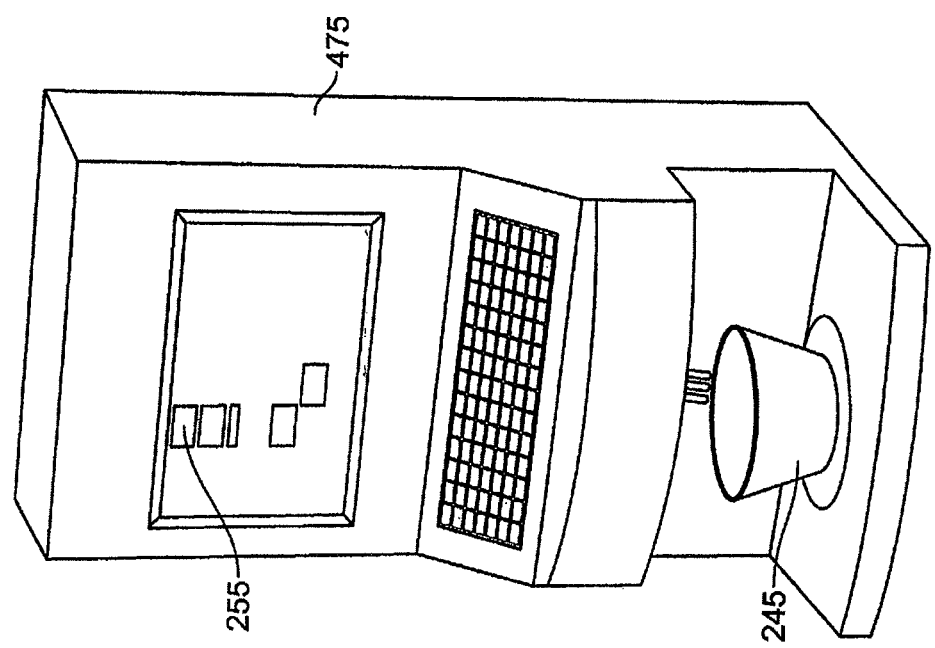
FIG. 10 is a perspective view of one embodiment of the system designed to control a process for mixing components.
Figure 12:
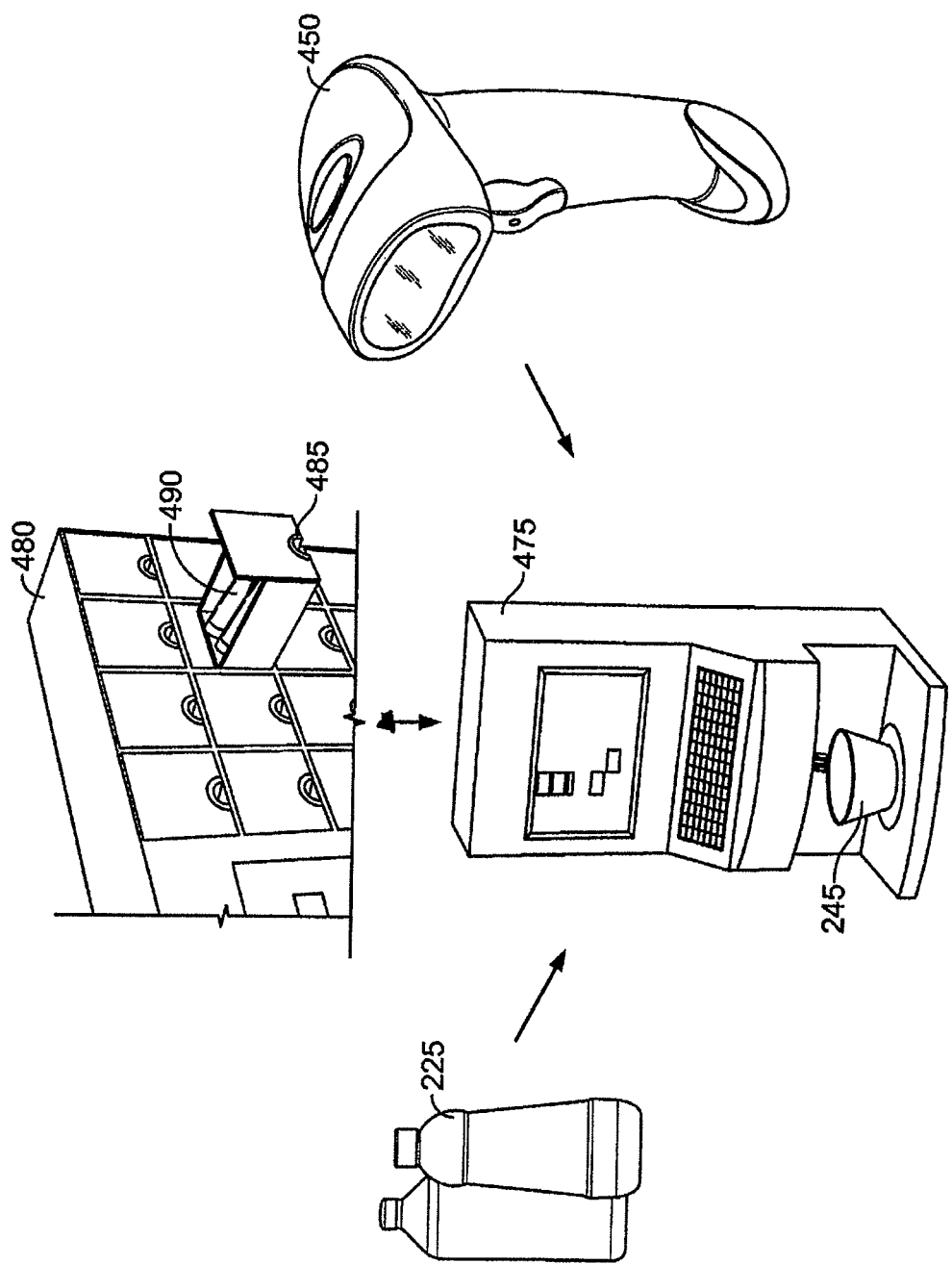
FIG. 12 is a perspective view of one embodiment of the system designed to control a process for mixing components, illustrated in use with a modular system with at least detached storage receptacles.

Referring now to FIGS. 10-12, in another aspect, the system would control a display to indicate a remaining weight required during the dispensing of the component. As the component is being added to the bowl 245, the display 255 indicates how much of the component remains to be added, by counting up or down to the target weight. Various kinds of analog indicators (discussed in greater detail below) can be displayed to more effectively communicate the remaining material to be added. When the operator presses "next" on the system, the system would illuminate the next LED (and/or opens the next drawer) and also recalibrate the scale to zero and indicate to the operator how much of the next component needs to be added. Again, as the operator adds the next component, the system leads the operator through the blending process.

An optional barcode scanner 450 could be provided to verify the correct component SKU prior to use and to facilitate inventory control. The bar code scanner may also help keep track of the product and make sure the operator is using the correct product. For example, if the system identifies a particular product in a particular receptacle, the operator, after retrieving the product, would scan the product. The system would check to make sure the actual product scanned is the correct product identified by the system for use. Other types of scanning equipment may be employed such as RFID scanners.

In other aspects of the present disclosure, the system 475 may have separate receptacle storage areas 480, shown in FIG. 12, as a more modular system setup. The separate storage areas 480 and the main console area 475 would communicate either wirelessly or through wired connections. This would allow one or more consoles 475 to communicate and direct the receptacle storage areas 480 to turn on and off the LED or other indicators 485, in order to illustrate which receptacle to retrieve the required components 490; and keep track of the quantities of components for re-ordering purposes. In addition, it would thus be possible to just use a console without the storage receptacles.

In another embodiment, the system 100 may be used in conjunction with management software. The elements of a basic management package would be shared by the system application including the ability to access and share customer data, customer history, inventory data, and provide usage reports by stylist, customer, salon, and store. This could be a separate solution linked to the present disclosure or completely integrated therewith as a single system.

The management software packages maintain basic customer data such as name, telephone number, email address, and the like. History data would include service date, services provided, user, notes and perhaps photographs. The system may be able to maintain a separate dispense history file, but will be capable of sharing this information with the management software packages for inclusion with customer history records. In addition, the management software packages may have inventory modules and product usage that would need to be reported.

Figure 13:
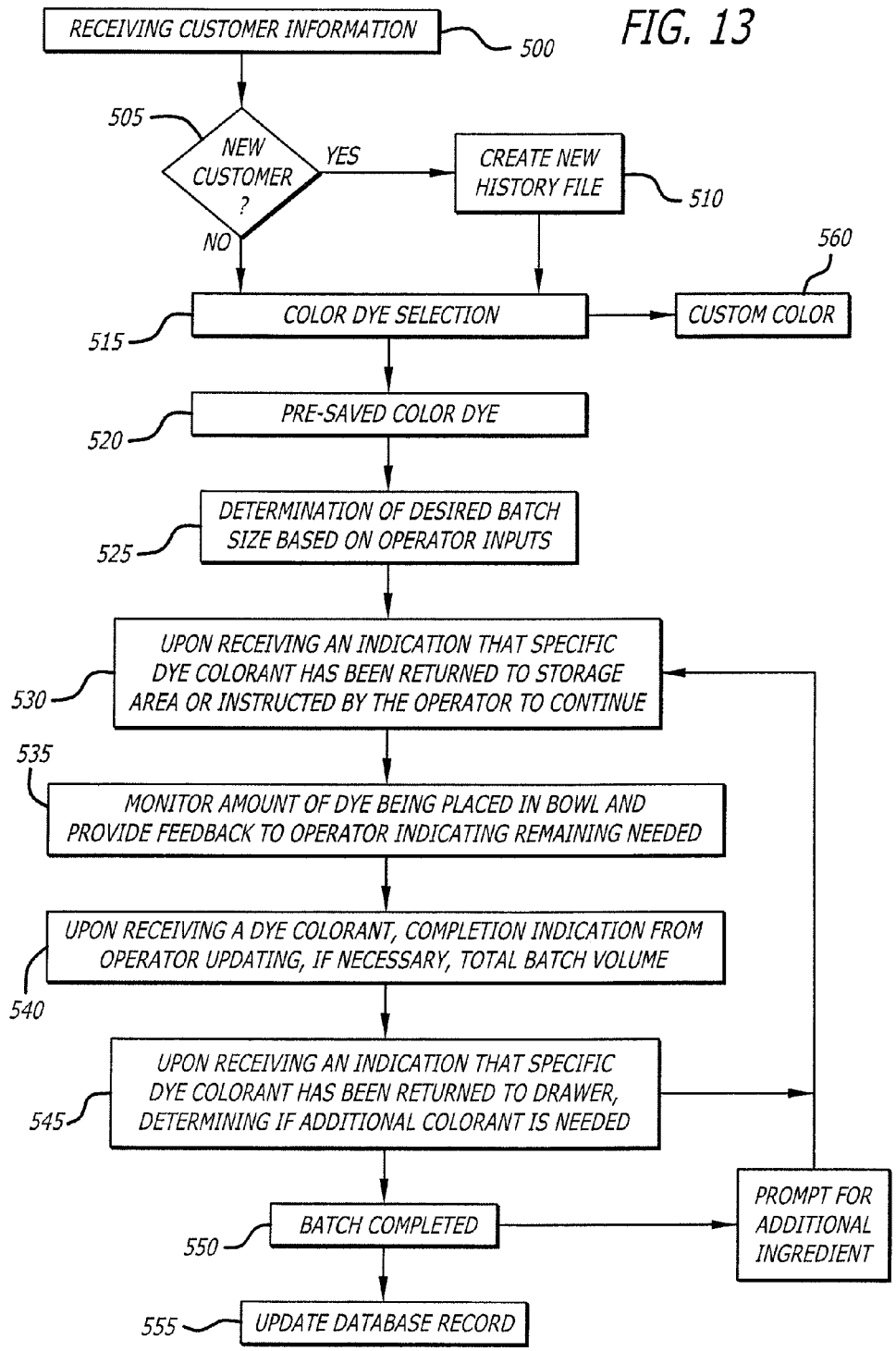
FIG. 13 is a block diagram illustrating the creation of a new hair dye formula.
Figure 14:
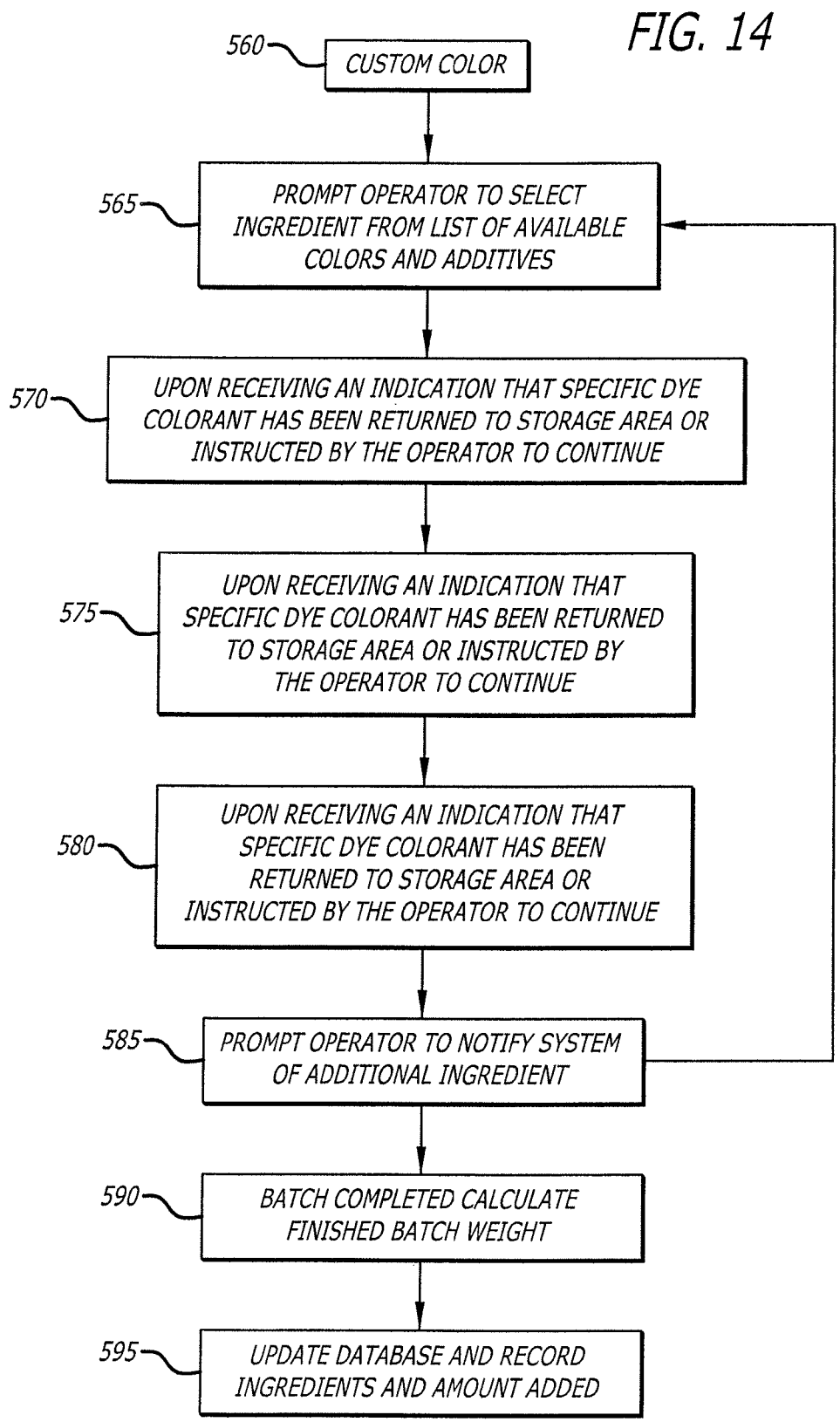
FIG. 14 is a block diagram illustrating the creation of a custom color.

Referring now generally to FIGS. 13 and 14, one or more of the present embodiments will be referenced in the given flow diagrams to illustrate various inputs and outputs from a given system. The use of blending control software is also described below.

In use with one or more of the present embodiments and an available management software, operation of the system could typically proceed in the following steps:

(a) an operator may need to identify or log onto the system and then the operator enters the customer name or other identifying characteristic (i.e., telephone number, and the like.) into the blending control software, BOX 500;

(b) the blending control software would act to control and display the customer's history information (However, if this is a new customer (BOX 505), the blending control software would permit the operator to create a new history file (BOX 510).);

(c) the operator then selects desired components (BOX 515) from an available chart or pallet which is stored within a formulation database (BOX 520) (If the management software package has a chart or pallet database, the blending control software would be linked to it or in communication therewith so the chart or pallet could be read and interpreted by the blending control software.);

(d) the blending control software then prompts for the required amount or size of finished component;

(e) the blending control software may then prompt for an activator strength;

(f) the stock color recipe is mathematically scaled for the desired batch size and the selected activator strength is displayed, BOX 525;

(g) the operator is prompted to place an empty mixing bowl on the scale (The blending control software will compare actual weight of the bowl against a target range value—this range of values is to be user definable. If the set range is 0 to 0, then no validation will occur. The blending control software will contain a maximum weight for the mixing bowl to allow sufficient fluid capacity and stay below the maximum scale capacity. For example, if the maximum scale capacity is 1,200 grams, and the batch size calls for 600 grams of dye components, then the maximum possible weight of the mixing bowl would be 600 grams. However, to allow for batch correction capability, the calculation should assume a 50% dye component weight variation, i.e., of 600 grams, plus variation=900 grams, leaving a maximum bowl weight of 300 grams. Enforcing a maximum bowl value ensures sufficient scale capacity for color mixing. Alternatively, the operator may simply be able to zero out the weight to ensure the system and scale are ready to continue.);

(h) if the correct bowl weight value is achieved or the weight is zeroed out, the blending control software will prompt for the first component, BOX 530 (If the bowl is above the maximum allowable, a caution message should be displayed.);

(i) as the first component is prompted, an LED or other indicator adjacent to the corresponding receptacle is activated so the operator can quickly locate the desired ingredient (for systems with optional storage systems);

(j) if storage locks have been included, an unlocking signal is provided to a corresponding solenoid (For reference, this optional feature would only allow receptacles which were un-locked by the blending control software to be opened. This provides two features: (a) prevents inventory theft and/or (b) forces the operator to use the system, since operators cannot obtain inventory otherwise. This ensures that all transactions are recorded and properly accounted for in the system's history files. Similarly, the blending control software could actual open and/or close the receptacles, or lock and unlock the receptacles with appropriate hardware and mechanics.);

(k) as noted above, either the weight of the mixing bowl is internally recorded for use in measurement calculation or scale is zeroed out (e.g., a digital value of 0.0 grams is displayed to help the user begin adding the first ingredient);

(l) the operator adds the amount indicated on the display panel, while the scale monitors exactly how much has been added and provides user feedback via the analog and/or digital indicators, BOX 535;

(m) a color-coded graphical scale (or as noted below, other types of analog or displays or sounds can be used) is displayed that shows the progress of the first component being added (If an graphical scale is used, then as material is added, the bar-graph scale changes color from green to yellow, to orange and finally to red; green being the starting point, yellow to indicate the operator is nearing the target weight, orange meaning very close, and red meaning stop. If other indicators are used, the display or sounds will change accordingly.);

(n) the blending control software will compare the actual dispensed amount to establish accuracy standards (When the calculated range of a sufficient amount of an ingredient has been reached, the ingredient will be considered complete and the display will turn red. If the volume added is greater than the maximum allowed value, the user will be prompted to "accept," or "correct," the batch. If "correct" is selected, the total batch volume will be re-calculated based on the amount of the discrepancy, BOX 540. All corresponding weights will be increased accordingly. If other ingredients were added to the batch prior to the over-dispensing of the current ingredient, the blending control software will automatically prompt the operator to add additional amounts of these prior-added ingredients, as required. When the correct add has been completed, the operator is prompted to return the component to the storage receptacle/drawer (if applicable) and to close the receptacle in order to continue.);

(o) the blending control software then prompts the operator to the next component by illuminating the LED adjacent to the corresponding receptacle (Similarly, if door locks have been included, and unlocking signal is provided to the corresponding solenoid.);

(p) the current weight of the mixing bowl is internally recorded for use in measurement calculation and then zeroed out, with a digital value of 0.0 grams being displayed to indicate that the blending control software is ready for the next ingredient (The operator repeats steps (l) through (n) for all weighed ingredients (BOX 545).);

(q) if the blending control software is equipped with "automatic additive dispensing" the blending control software will automatically dispense the desired activator or base ingredients (The dispensing function is performed gravimetrically (using the scale). If more than one ingredient is to be added, they will be dispensed sequentially. Without automatic dispensing, the blending control software would simply prompt the user to add the appropriate activator or base ingredient and indicate the required amount as indicated for other ingredients in the previous steps.);

(r) when all ingredients have been added, the operator will be prompted to remove the mixing bowl, Box 550 (A database record is created with the precise amount of each ingredient dispensed and the record is stored in the history file (Box 555). A record containing the color name, amount, time and date is created and can be passed to the salon management software package, and the salon management software package is then able to attach the information as a note to the custom record file.); and (s) a record of the amount of each ingredient used will be maintained in the blending control software for inventory tracking purposes (The operator will have the ability to query the blending control software to determine the amount of each ingredient for a given time period. The blending control software should also be capable of passing usage values to the salon management software package if necessary.).

In instances where the operator would be creating a new mixture for a customer (FIG. 14), the operator would have the option to create a new file (BOX 560), which would be selected to start the appropriate software section of the blending control software. The operation would follow similar steps to the above, except instead of notifying the operator which component to use, the blending control software would prompt the operator to select the first ingredient to dispense from an on-screen list of available components, such as listing available colors and/or additives (BOX 565). After the selection is made, an LED or other indicator adjacent to the corresponding receptacle is illuminated to provide the operator with an identification of where the component can be located (BOX 570). If door locks have been included, an unlocking signal is provided to the corresponding solenoid. After which, locking signals, and if desired, opening and closing signals could be easily added.

The weight of the mixing bowl is internally recorded for use in measurement calculation, and a digital value of 0.0 grams is displayed with the bowl on the scale to indicate the blending control software is ready for an ingredient to be added. The operator adds the desired amount of the first ingredient, while the corresponding reference weight is displayed (BOX 575). When the addition is complete, the user selects "next". The operator is prompted to return the component to the storage receptacle (if applicable) and to "Press any key to Continue." (BOX 580). If door locks are used, the blending control software may automatically lock the receptacle when the component is returned, and the receptacle is closed by the operator, or it may be automatically closed by the blending control software after the component is returned, and the operator indicates that they would want to proceed.

The display would show the name of the first ingredient, and the amount added to the formula. The operator is prompted to select the second ingredient from an on-screen list (BOX 585). If door locks have been included, an unlocking signal is provided to the corresponding solenoid. The weight of the mixing bowl is internally recorded for use in measurement calculation, and then zeroed out with a digital value of 0.0 grams displayed so the operator can add the next ingredient. The operator adds the desired amount of the second ingredient, while the corresponding reference weight is displayed. When the addition is complete, the user selects "next." The display shows the names of the first two ingredients, and the amount of each added to the formula. This would continue until all of the required ingredients have been added. When the last ingredient has been added, the operator selects "done" (BOX 590). Upon completion, a total batch volume will be calculated based on the specific gravity of the individual ingredients. This value is stored for future reference to permit batch size scaling of the recipe.

A database record is created with the precise amount and optimum target amount of each ingredient dispensed, and is stored in the history file within the blending control software (BOX 595). A text record containing the name, amount, time and date is created and passed to the management software package to be attached as a note to the custom record file. A record of the amount of each ingredient used will be maintained in the blending control software for inventory tracking purposes. A simple query should be available to determine the amount of each ingredient for a given time period.

In addition, raw material inventory management functionality with and without the use of optional barcode equipment may be provided by one or more of the present embodiments. Barcode scanning devices simplify inventory management functions. By using an attached barcode scanner, mixing ingredients can be easily identified for inventory tracking purposes. The functions could be two-fold. Firstly, an on-hand salon inventory could be established by scanning all available product inventory items. When new shipments are received, they too could be scanned, thereby easily adding them to the on-hand inventory. Secondly, when blending control software is equipped with the optional storage receptacles, scanning the component could also be used to illuminate the appropriate lamp, or unlock the corresponding door. This functionality will help to ensure that the materials are properly stored and further minimizes the potential for selecting the wrong material during subsequent mixing operations.

In the case of a salon, the blending control software may also track the operator(s) use of the system, which allows cost reporting by employee. It would also accurately track third-party billing for "chair rental" environments. In many salons, some of the stylists are not employees, but rather rent a chair from the salon owner. Sometimes a stylist renting a chair provides their own materials, such as hair color, and some utilize materials from the salon. Since the blending control software would know the exact amount of each ingredient included in a blend, it has the ability to establish the exact material cost for each batch. This data can be used to better understand service costs and can also be used to provide billing data for "rental chair" staff.

In additional embodiments, the blending control software can be provided with the ability to help eliminate waste. In salons, the user or stylists typically mix more than the required amount of components for their clients. The reasons are twofold: (a) current volumetric measurement systems do not allow for scaled down batches, and (b) it is difficult to estimate the actual amount of components or color required, and they do not want to run out mid-application. One improved feature would allow the user or stylist to return the mixing bowl to the scale after finishing with the client. Since the weight of the bowl at the end of the mixing step was known when the mixture was produced, the blending control software can subtract the returned bowl weight from the final weight. It is then possible for the blending control software to know the amount of mixture actually used by the user or stylist during application. The client's master formula can then be adjusted to the actual amount used, and if necessary, an additional amount can be added for a defined safely factor, such as a 5% or 10%. On subsequent client visits, the re-scaled master formula, combined with the precision measurement capabilities of the blending control software, virtually eliminates product waste.

In one embodiment, a system is provided for recalculating a formula previously used in preparing a mixture made from adding at least two components. The system includes a control apparatus and a scale. The control apparatus has a memory (permanent and/or temporary), input controls, and a display. The memory being used to store a mixture formulated from mixing at least two components. The scale is in communication with the control apparatus. The control apparatus monitors a weight on the scale, such that a final weight of the mixture previously prepared from mixing at least two components is stored on the memory. In this embodiment, when an end weight of the mixture, defined to be the final weight of the mixture previously prepared minus an amount used by a user, is positioned on the scale and when the control apparatus receives a recalculation signal, a blending control software calculates the amount used, recalculates the mixture based on the amount used, and stores a new mixture for subsequent use. This helps reduce and eliminates extra waste.

This embodiment can further be defined as a method for recalculating a formula (e.g., producing an adjusted batch size using different but proportional amounts of the components in the formula). The method includes a first step of providing a control apparatus having at least a memory, input controls, and a display, wherein the memory stores a mixture that is formulated from mixing at least two components. The next step includes providing a scale in communication with the control apparatus, such that the method stores in the memory, a final weight of a mixture that was previously prepared from mixing at least two components. After use, the user would weigh an end weight of the mixture on the scale. The end weight of the mixture is defined as the final weight of the mixture previously prepared minus an amount used by a user. Finally, the method recalculates the formula of the mixture based on the end weight of the mixture against the final weight of the mixture, and stores the recalculated formula in the memory of the control apparatus.

In an additional embodiment, a system is provided for preparing a mixture. The system includes a control apparatus having at least a memory, input controls, and a display. The memory has the capacity to store at least one mixture formulated from the mixing of one or more components, based on recommended formulated amounts of the one or more components. In communication with the control apparatus is a scale monitored by the control apparatus for changes of a weight on the scale. The control apparatus, upon receiving an input for a creation of a mixture, will display a formulation of the mixture indicating the component(s) and amount(s) needed to create the mixture. The control apparatus will further monitor changes in the weight of the scale. Additionally, the control apparatus will adjust the batch size of the formulation (i.e., amount of the mixture to be produced) when a weight of a component added to the mixture is different than the recommended formulated amount.

In yet another embodiment, there is provided a system for the storage and for the mixing of ingredient components to provide an operator the ability to create a mixture. The system is defined to include a plurality of storage receptacles, each receptacle holding at least one component and each receptacle in communication with a control apparatus. The control apparatus has at least a memory, input controls, and a display. The system improvement includes: (a) the memory having the capacity to store and/or storing at least one formulated mixture, which lists the component(s) and amount(s) thereof; (b) the control apparatus, upon receiving an input for a creation of a mixture, displays the formulated mixture indicating the component(s) and amount(s) needed to create the mixture; and (c) an electronic locking mechanism positioned at each storage receptacle, wherein the control apparatus, upon receiving the input for the creation of the mixture, is capable of sending a signal to the electronic locking mechanism to lock and/or unlock one or more receptacles relative to the component(s) being held therein to create the mixture.

Alternatively, each receptacle may have an opening position and a closing position. In this instance, each receptacle having the electronic mechanism positioned at each storage receptacle is set to open and/or close the storage receptacles. Therefore, when the control apparatus receives the input for the creation of the mixture it is capable of sending a signal to the electronic locking mechanism to open and/or close one or more receptacles relative to the component(s) being held therein to create the mixture.

Figure 15:
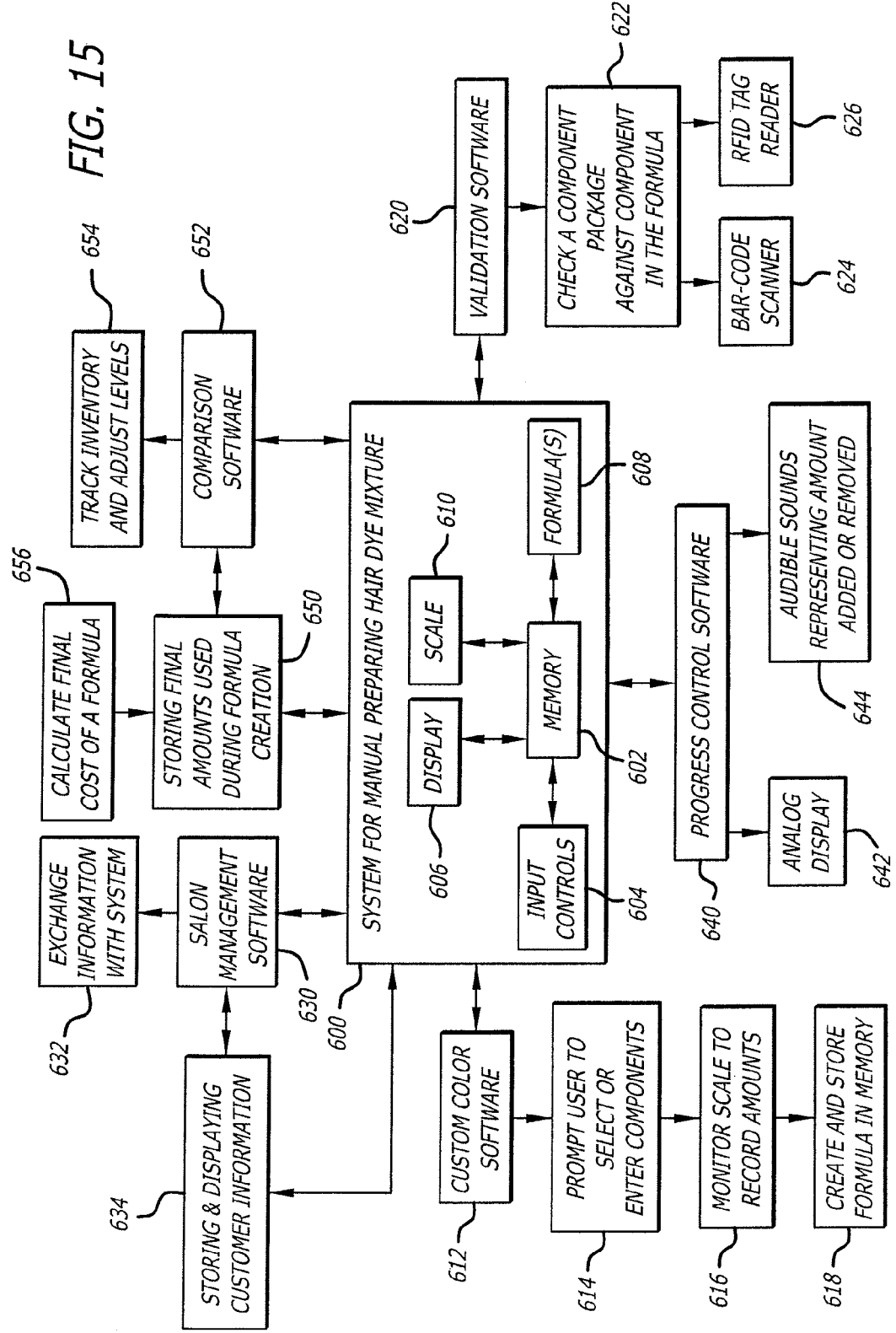
FIG. 15 is a system illustration showing various software components and their relationship to the system.

Referring now to FIG. 15, there is provided in various embodiments a blending control system 600 for preparing a hair dye mixture. The blending control system generally includes a control system having one or more of the following elements: (a) a memory 602, (b) input controls 604, and/or (c) a display 606. The blending control system further includes at least one formula 608 stored in the memory 602. The formula defines instructions of one or more colorants and/or dye blending materials and amounts recommended for recreating a hair dye mixture. The blending control system also includes a scale 610 in communication (wireless or wired) with the blending control system.

The blending control system in a first aspect of the various embodiments includes custom color software 612 to permit the user to create a custom color. The custom color software 612, upon receiving a input from the input control for a creation of a hair dye custom color mixture, will prompt a user to select or enter one or more colorants and/or dye blending materials 614, and monitors the scale for an amount corresponding to said one or more colorants and/or dye blending materials 616. The custom color software will create and store 618 a hair dye mixture formula based upon the selected or entered colorants and/or dye blending materials and the corresponding amounts that were placed on the scale. Various other aspects and uses of the custom color can be incorporated with the formula adjusting software used to adjust the formula of the hair dye mixture when a weight of a colorant or dye blending material being added to the scale is different than the amount recommended in the formula.

In a second aspect of the various embodiments, the blending control system includes validation software 620 to check a hair dye component package against the hair dye component(s) in the formula to ensure and validate a user is accurately recreating the hair dye mixture 622. The validation software may be used in connection with a bar-code scanner 624 to scan the bar codes positioned on the component package or used in connection with an RFID reader 626 to read information for an RFID tag positioned on the component package.

In a third aspect of the various embodiments, the blending control system includes salon management software 630 in communication with the system to exchange information on customers and formulas of hair dye mixtures associated to said customers 632. In this aspect, the input control and the display are in communication with the blending control system and the software, which is for displaying the instructions on the display in response to a manual input from the input controls and monitoring software to monitor a weight on the scale 634. The monitoring software aids in monitoring changes in the weight on the scale such that the blending control system is able to calculate a difference between a recommended formulated amount of a colorant or dye blending material and an actual amount of the colorant or dye blending material added to the scale. This difference can then be measured down to a zeroed amount, with an adjustment for the weight of a receptacle, such that the blending control system is able to indicate how much additional colorant or dye blending material is needed to be added to the scale to reach the recommended formulated amount of the colorant.

In a fourth aspect of the various embodiments, a blending control system includes progress control software 640 to indicate how much of one or more of the colorant(s) and/or dye blending material(s) from the hair dye mixture may be added to or removed from the scale. The progress control software can include an analog or other display representation 642 of one or more of the colorant(s) and/or dye blending material(s) from the hair dye mixture. The software is capable of changing the representation to indicate an amount being added to or removed from the scale. The representation can be a graph, such as a bar-graph, circular, pictorial, or line graph, and can be color coded, black/white, or a gradation thereof; alternatively, the representation could use sound or other types of representations. The process control software can also include the ability to replay audible sounds 644 (or lights) representing the amount dispensed of one or more of the colorant(s) and/or dye blending material(s) from the hair dye mixture. Additionally, the process control software includes the capability to replay audible sounds or lights to indicate an amount being added to or removed from the scale.

In a fifth aspect of the various embodiments, the blending control system includes at least one set of customer information stored in said memory, such that the customer information 634 is associated with the at least one formula. The blending control system further includes software to update at least one set of customer information. And the blending control system can be linked to the salon management software to exchange customer information.

In a sixth aspect of the various embodiments, the blending control system includes software to store in the memory a final amount used of each of the one or more colorants and/or dye blending materials defined by the formula 650. In this aspect, the blending control system may further include comparison software 652 to track the inventory 654 of the one or more colorants and/or dye blending materials by reducing a current inventory level of each of the one or more colorants and/or dye blending materials by the final amount used of each of the one or more colorants and/or dye blending materials. In addition, the comparison software is used to track inventory levels and reduce the current inventory level by an amount used during the preparation of a hair dye mixture and/or increase the current inventory level by an amount received during a new shipment or returns of unused ingredients. Moreover, the amount reduced can further be allowed to track if a product is thrown out, spoiled, missing or otherwise needs to be reduced to ensure proper inventory levels. Yet as a further consideration, the amount used during the preparation of the hair dye mixture is determined by the amount on the scale. This could also be used to compare the performances of different stylists, stores, or manufacturers.

In a seventh aspect of the various embodiments, the blending control system has stored in said memory current inventory levels for at least one or more colorants and/or dye blending materials and the costs associated with each one or more colorants and/or dye blending materials. The blending control system further includes software to calculate the final cost 656 of a hair dye mixture by monitoring the preparation of the hair dye mixture, including monitoring the scale for a final amount used of each of the colorants and/or dye blending materials defined by the formula, allocate a cost of each of used during the preparation, and calculate the final cost by adding the individual costs. Once a final usage and/or cost is determined, color usage and/or cost can be reported by a reporting software. The reporting software may further be capable of creating reports for specified time periods on the material usage and cost based by stylist, client, salon or region (when the software is linked to other salons), manufacturer of a particular product or by product line, and/or chair or booth renter. The reporting software may further include components for determining average costs per client per treatment and other operating data.

Figure 16:
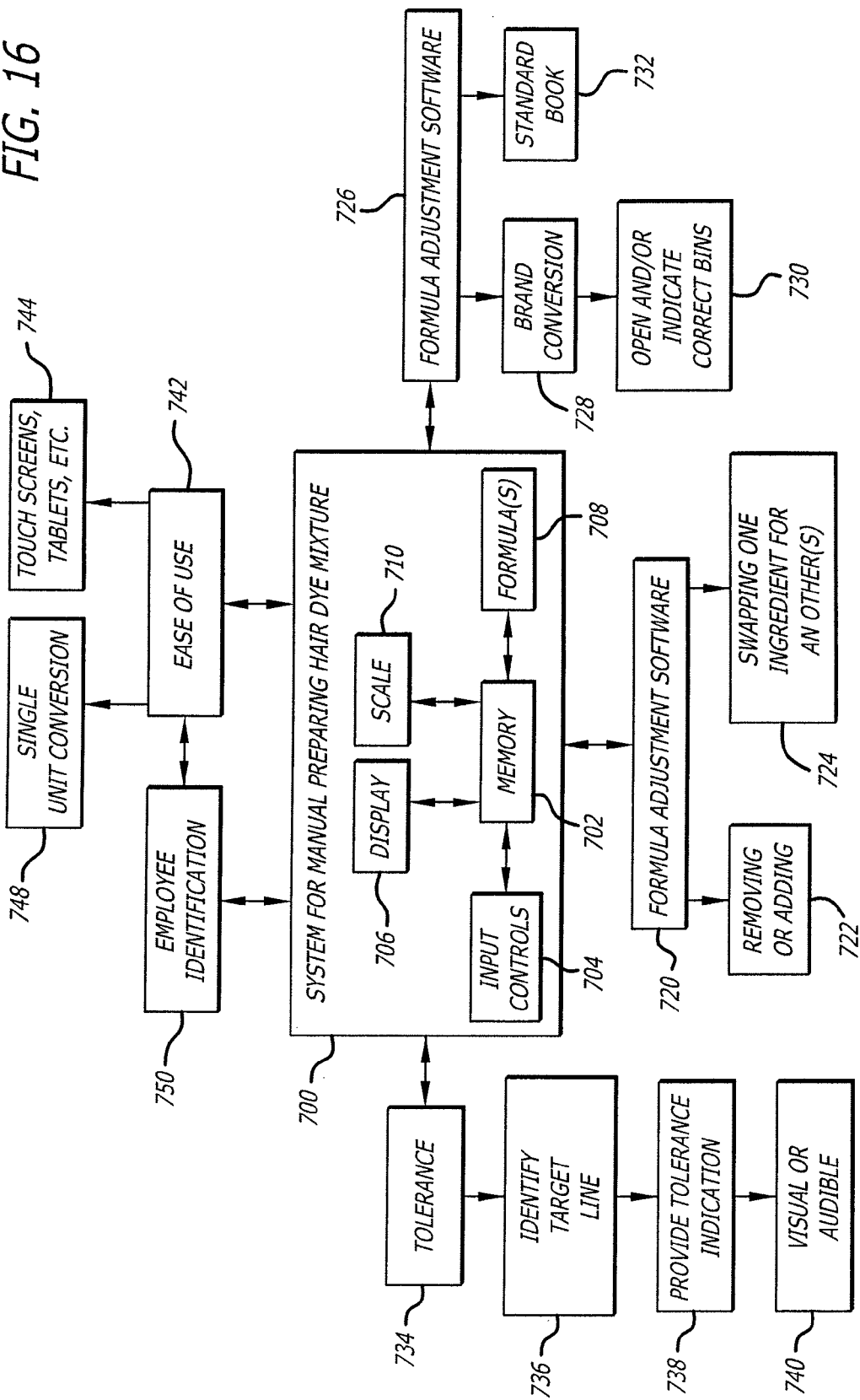
FIG. 16 is a system illustration showing various software components and their relationship to the system.
Figure 17:
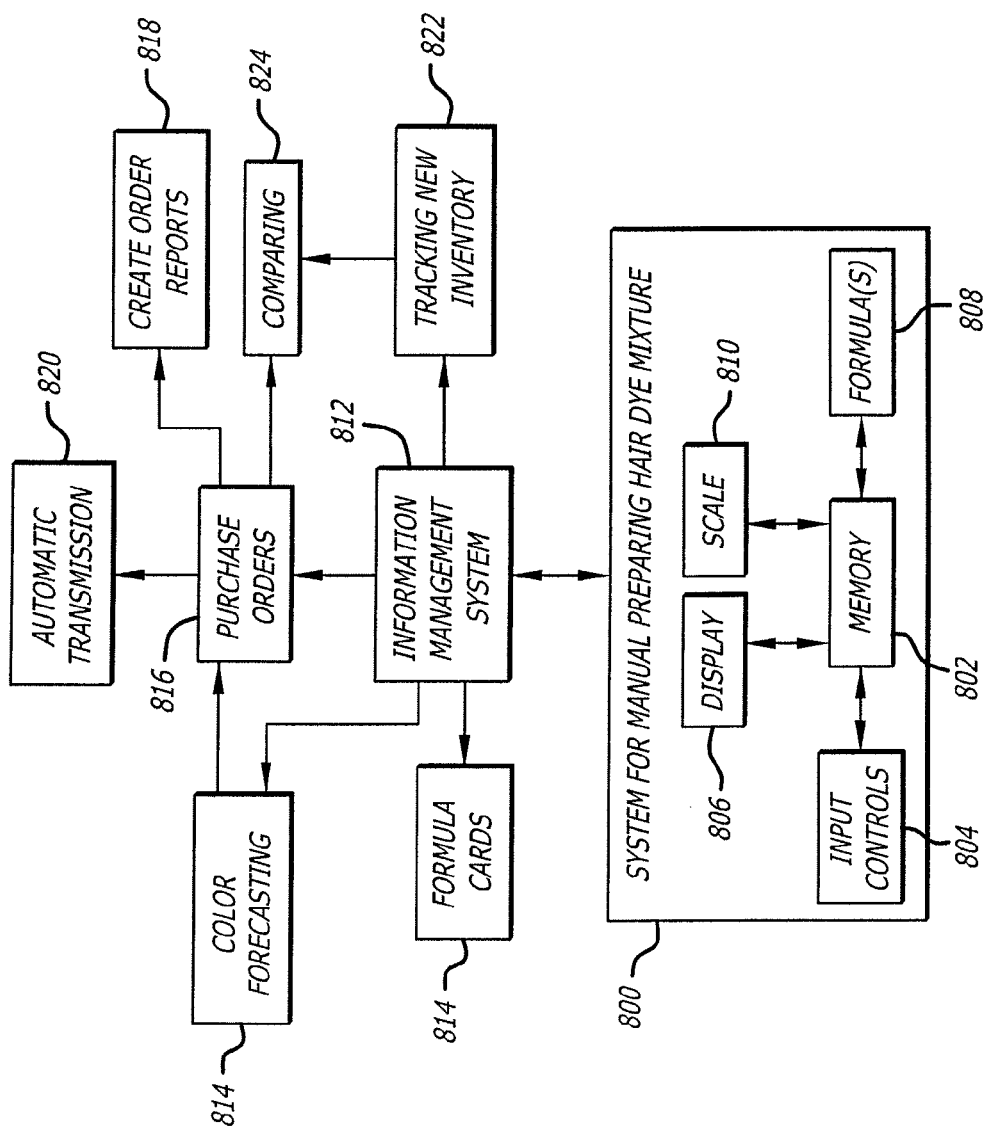
FIG. 17 is a system illustration showing various software components and their relationship to the system.

Referring now to FIG. 16, there is provided in various embodiments a blending control system 700 for preparing a hair dye mixture. The system generally includes one or more of the following elements: (a) a memory 702, (b) input controls 704, and/or (c) a display 706. The system further includes at least one formula 708 stored in the memory 702. The formula defines instructions of one or more colorants and/or dye blending materials and amounts recommended for recreating a hair dye mixture. The system also includes a scale 710 in communication (wireless or wired) with the system.

In an eighth aspect of the various embodiments, the system includes software that permits for formula blending and adjustments. As mentioned above, this could include reformulating a formula based on changing a particular quantity of an ingredient such as adjusting for adding too much or not enough of an ingredient. Separately, this could also include the ability to add or remove a particular ingredient from a formula, or swap or change a particular ingredient with another component. Formula adjustment software 720 would receive an indication from the input control that either an additional ingredient is being added or an ingredient from the formula is being removed 722. The formula adjustment software 720 will then adjust the final total and/or in some circumstances may recalculate the formula to adjust for the increased batch size or strength of the mixture. The user would then not be required to start over with a new customer mixture. In another aspect, a particular ingredient may need to be changed or swapped out for a different ingredient 724. Changing a particular ingredient may be done because the particular ingredient is missing from inventory. For example, if a shade of red is out of stock the stylist may know that they can combine certain other colors for the desired effect. The formula adjustment software will adjust the final total and/or in some circumstances, may recalculate the other components of the formula to adjust for the increased batch size or strength of the mixture.

In other aspects, the formula adjustment software 726 can be capable of converting a particular formula from one brand of product to another brand 728. For example, if a particular mixture of colors in one brand needs to be duplicated for a different brand, the particular ingredients may be different. A formula brand conversion would permit the operator to recreate the mixture using different branded products. If provided with the system, once converted, the system would also control the correct receptacle or drawer to unlock, open, and/or indicated (by LED or other means) 730. In another aspect, the formula adjustment software 726 may include a particular manufacturer's standard book of colored mixtures 732. This permits the user to start with a base line formula that may be adjusted and customized for a particular client.

It is further noted that the blending control system has further built in a defined tolerance component 734 towards the target total amount needed for the particular ingredient or total mixture. When adding a particular ingredient, it has been found that within a certain small tolerance of being over or under the target amount does not necessarily affect the end mixture. This tolerance has a tendency to be about 1-2 percent over or under the recommended value in the formulas; however, it is possible that the tolerance level can be set by the salon, operator, manager, manufacturer of the product, or and the like. To help a particular user identify the tolerance, the progress indicator may include a Target Line 736 to which the user may attempt to achieve for a perfect mixture, but then it may further include a Tolerance Indication 738 above and below the Target Line that the user will identify as a region that if the ingredient weight added reaches within the Tolerance Indication, the user can move on to the next ingredient without reformulating the entire mixture. The Tolerance Indication may be visual or audible 740. Additionally, a visual Tolerance Indication may be represented as lines or brackets above and below the Target Line, as shown in FIG. 22.

In a ninth aspect of the present embodiments, the blending control system can include various aspects to increase an operator's ease of use 742. Various technological components can be provided, such as touch screens 744 and wireless keyboards/mouse. Employee Identification systems 746 may also be used to correctly identify an employee and provide the employee with the appropriate access to the blending control system. Various employee identification systems may be used, such as, but not limited to, magnetic card scanners; fingerprint scanners; barcode readers; and password protection. The employee identification systems can also be used in connection with the below information management systems with its layered security measures to correctly identify personal with specific access to certain areas in the blending control system.

Other aspects of the system that increase an operator's ease of use include an ability to automatically convert product packaging units to a single system 748. Various packages may have volume and weight in various scales. The system having the information entered into the blending control system based on the particular product will convert the unit to a single system used by the operator. The single system may be configured as a weighted system. Alternatively, since the progress indicator system is provided, the indicator may itself be viewed as the single unit system.

The increase of an operator's ease of use can be further implemented with the disclosed system by provided step by step guidance on screen instructions and warnings (e.g., if the operator is adding too much of a particular ingredient or if the operator is using the incorrect ingredient). The warnings and instructions can be augmented with the system's ability to control the opening or unlocking of a particular storage area or bin.

In a tenth aspect of the present disclosure, the blending control system may be further provided with an information management structure 812. Various software components may be used to manage the information in the blending control system which may or may not include information in the salon management system. As noted above, the salon management system and the blending control system may be a single system or separate systems linked or communicated together. The blending control system 800 is generally provided for preparing a hair dye mixture. The blending control system generally includes a computer-driven system having one or more of the following elements: (a) a memory 802, (b) input controls 804, and/or (c) a display 806. The blending control system further includes at least one formula 808 stored in the memory 802. The formula defines instructions for mixing one or more colorants and/or dye blending materials, as well as amounts recommended for recreating a hair dye mixture. The blending control system also includes a scale 810 in communication (wireless or wired) with the system. An information management system 812 is provided and is in communication with the blending control system 800.

The information management system 812 includes one or more components either used in concert or separately. A first component of the information management system may be directed to information about the customer or client information and their associated formulation(s). The blending control system would be able to prepare a Formula Card 814 that a customer or stylist could use at another location. The Formula Card would help the second or subsequent stylist recreate the mixture at another location if, for example, the other location was not linked to the blending control system. A second component of the information management system 812 would include the ability to color forecast 814. Color forecasting 814 is the ability to forecast the amount of color needed in a particular period. The forecasting can be based on a number of factors such as historical color usage, scheduled appointments and the client history, and/or promotions done by a salon. The color or ingredients in the formula is forecasted by reviewing the factors and generating a report that could include purchase orders.

A third component of the information management system 812 is the ability to generate purchase orders 816. Purchase orders 816 for particular ingredients can be generated based on color usage forecasts and real-time inventory levels, which as mentioned can be monitored and tracked by other component systems. Purchase orders 816 can also be based on reorder point levels. With the purchase orders, the blending control system would be able to create open order reports 818 and transmit the orders automatically 820 to vendors via e-mail.

In a fourth component of the information management system 812, new inventory updates 822 can be obtained when a new inventory is taken and entered into the system. Entering the inventory can be done by scanning codes or entry into the blending control system. The new inventory received can also be compared 824 to the purchase orders and usage report to determine the accuracy of the orders and reports.

Figure 18:
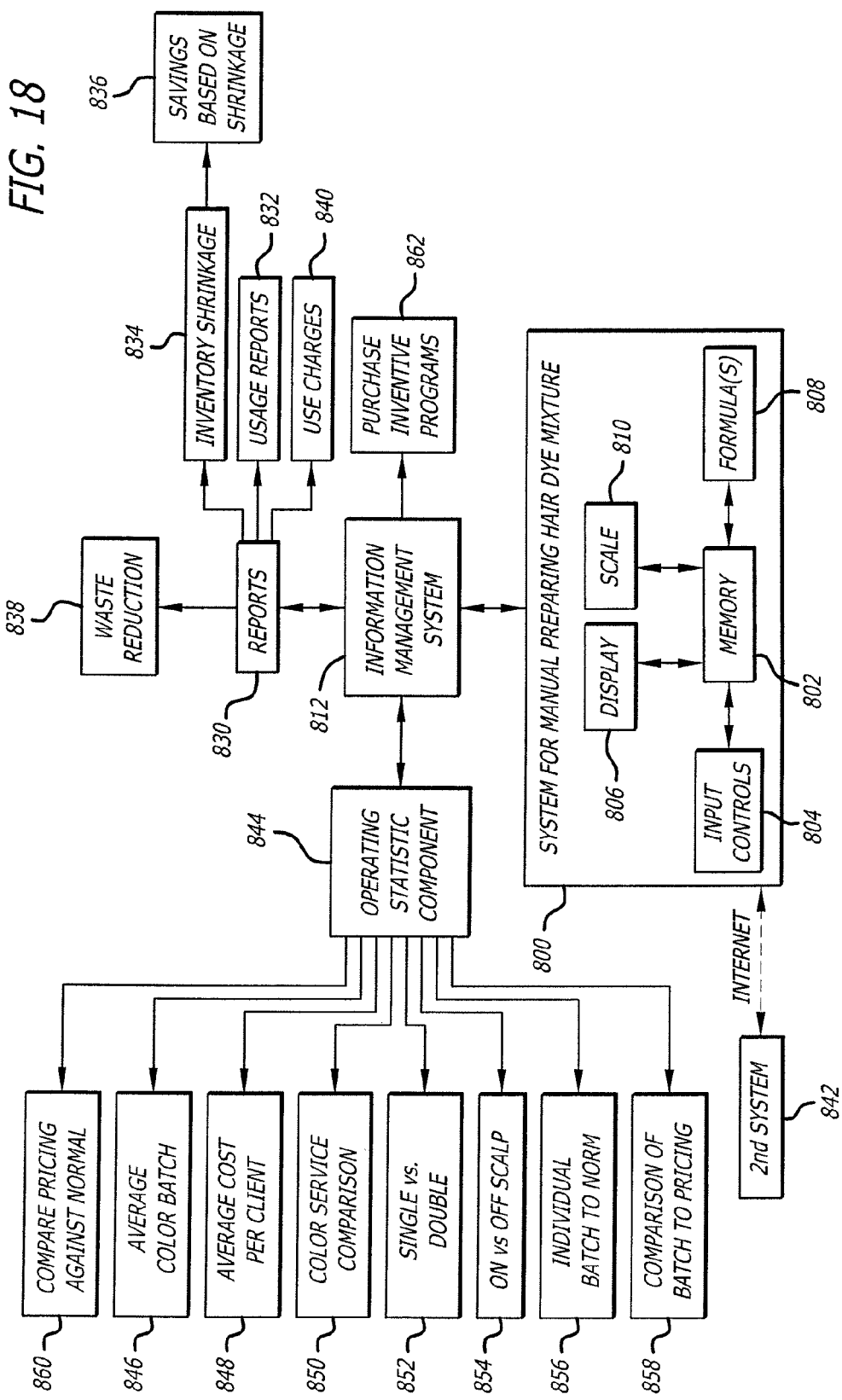
FIG. 18 is a system illustration showing various software components and their relationship to the system.

Referring now to FIG. 18, in a fifth component of the information management system 812, various Reports 830 can be generated to help the management of the system and salon(s). With detailed records on the clients and their use of the salon services, Reports 832 shows the number or percentage of clients that use coloring services and the frequency of their use or absence. Reports 834 show a calculation of the inventory shrinkage in concert with the physical inventory can be obtained. Along with this aspect, a Report 836 can be generated on the savings due to a reduction in inventory shrinkage for a time period. Additionally, a Report 838 can be generated on the savings from the above noted waste reduction measure as compared to a pre-defined normal amount used for a period of time. Reports 840 can also be generated to help the salon determine use charges, for example, suggested charges can be generated for excessive amounts of ingredients used, (e.g., if a double or triple batch is prepared because of the length or thickness of the hair). These reports can also be exported through an intra or internet for a manager 842 to analyze trends over a period of time. These reports can also be consolidated amongst multiple salons, regionally or for a nationwide report.

Along with various reports, the blending control system can also include an operating statistic component 844. The operating statistics can be based on a number of various factors either alone or in combination with each other. These factors include an average color batch by the operator/stylist 846; average cost per client 848; comparison of color services per hour, per appointment against default predetermined values 850; comparison of the number of single versus double color applications 852; comparison of the number of on-scalp or off-scalp applications 854; comparison of individual batch sizes to salon norms and flag deviations 856; comparison of batch sizes deviated to pricing surcharges 858; and comparison pricing of specific applications against normal procedures 860.

Other Reports can be generated to provide information on a number of salons owned by a single entity. The information can be sorted and detailed based on the aggregate of all the salons or based upon a specific city, region, or country.

Since the information management system is capable of tracking inventory, Reports can be generated to help outline the higher turn ingredients as well as show the slowing moving or dormant ingredients. Reports can also be generated to allocate usage between normative uses for a given time period and waste over the same time period.

The blending control system can further track purchase incentive programs 862 by monitoring items purchased in the store against the products used by the stylists. With full client information in the blending control system (including the brand or specific ingredients used) specific promotions of retail products can be determined and recommended to the client, as well as promotions for specific salon services that are also based on specific products purchased, used, or applied.

Figure 19:
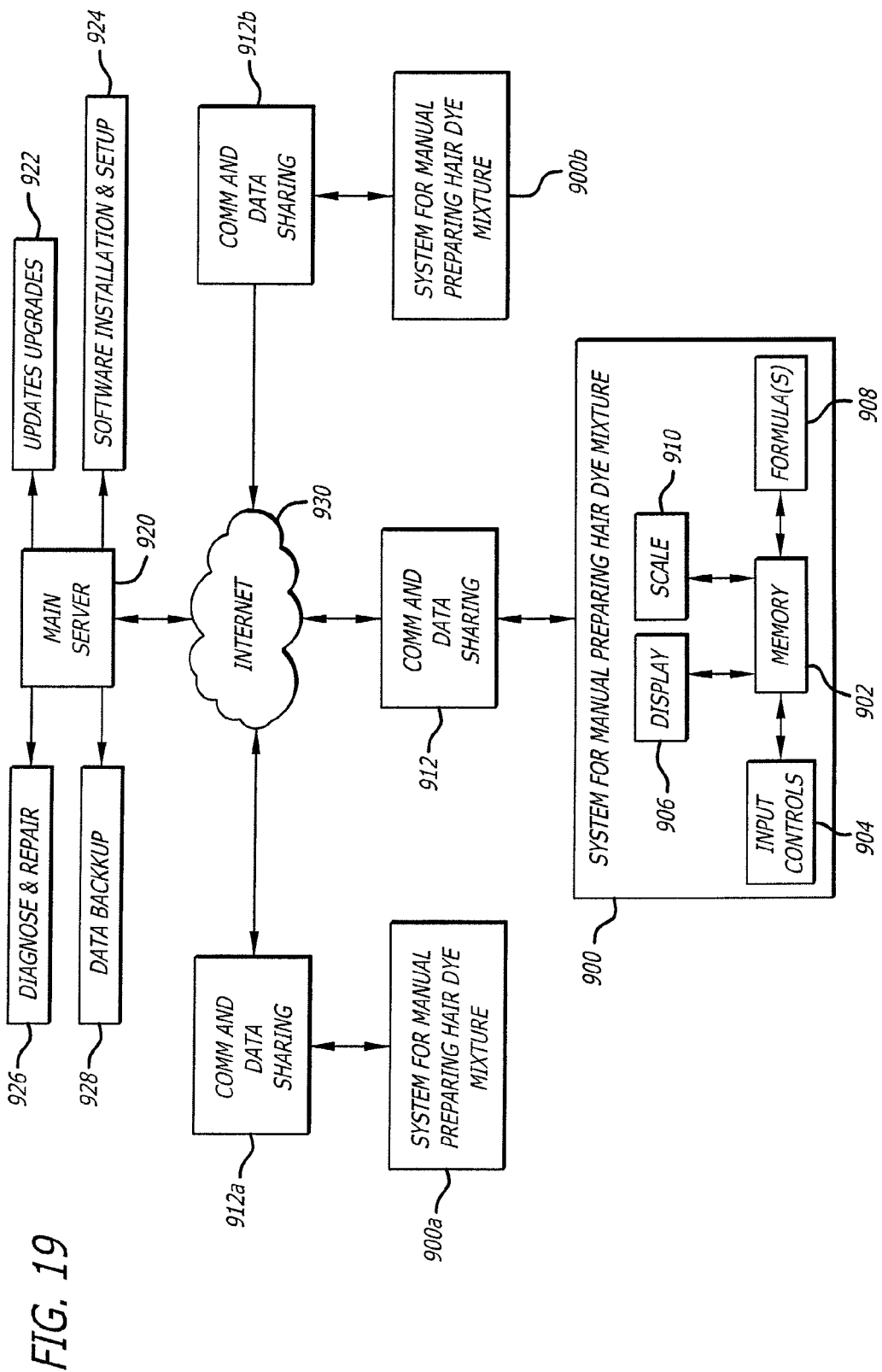
FIG. 19 is a system illustration showing various software components and their relationship to the system.

Referring now to FIG. 19, in an eleventh aspect of the present disclosure, the blending control system may be further provided with a communication and data sharing components. Various software components used to communicate and share data may or may not include information in the salon management system. The blending control system 900 is generally provided for preparing a hair dye mixture. The blending control system generally includes a computer-driven system having one or more of the following elements: (a) a memory 902, (b) input controls 904, and/or (c) a display 906. The blending control system further includes at least one formula 908 stored in the memory 902. The formula defines instructions of one or more colorants and/or dye blending materials and amounts recommended for recreating a hair dye mixture. The blending control system also includes a scale 910 in communication (wireless or wired) with the system. A communication and data sharing system 912 is provided and is in communication with the system 900.

In a first component of the communication and data sharing system 912, software would allow the blending control system 900 to communicate with a main server 920 to provide updates against a manufactured and/or installed system. Updates and upgrades 922 to the software can be done by internet login into a main server. In addition, software installation and setup 924 can also be done over the internet. The main server 920, when in communication with the blending control system 900, could help diagnose and repair 926 any maintenance issues with the blending control system, as well as provide data backup capabilities 928. If the systems are licensed for use, the main server could maintain the licenses which, if not updated and renewed, could lock out the system for control by the salons.

In a second component, as mentioned above, the blending control system and the salon management system can be integrated or linked together to allow the sharing of information. The information shared between the two or more systems 900 could include data on the stylists, appointment information, point of sale service ticket information, and formula data for new and existing clients, as well as modified formula information.

If multiple systems 900a, 900b, and the like, are employed in a single salon or multiple salons each system can be connected to each other to share and consolidate information. Multiple salon applications can use a dedicated connection IP address or across the internet 930. The information shared can include inventory data, cost data, usage data, employee data, customer data, and formula data.

Figure 20:
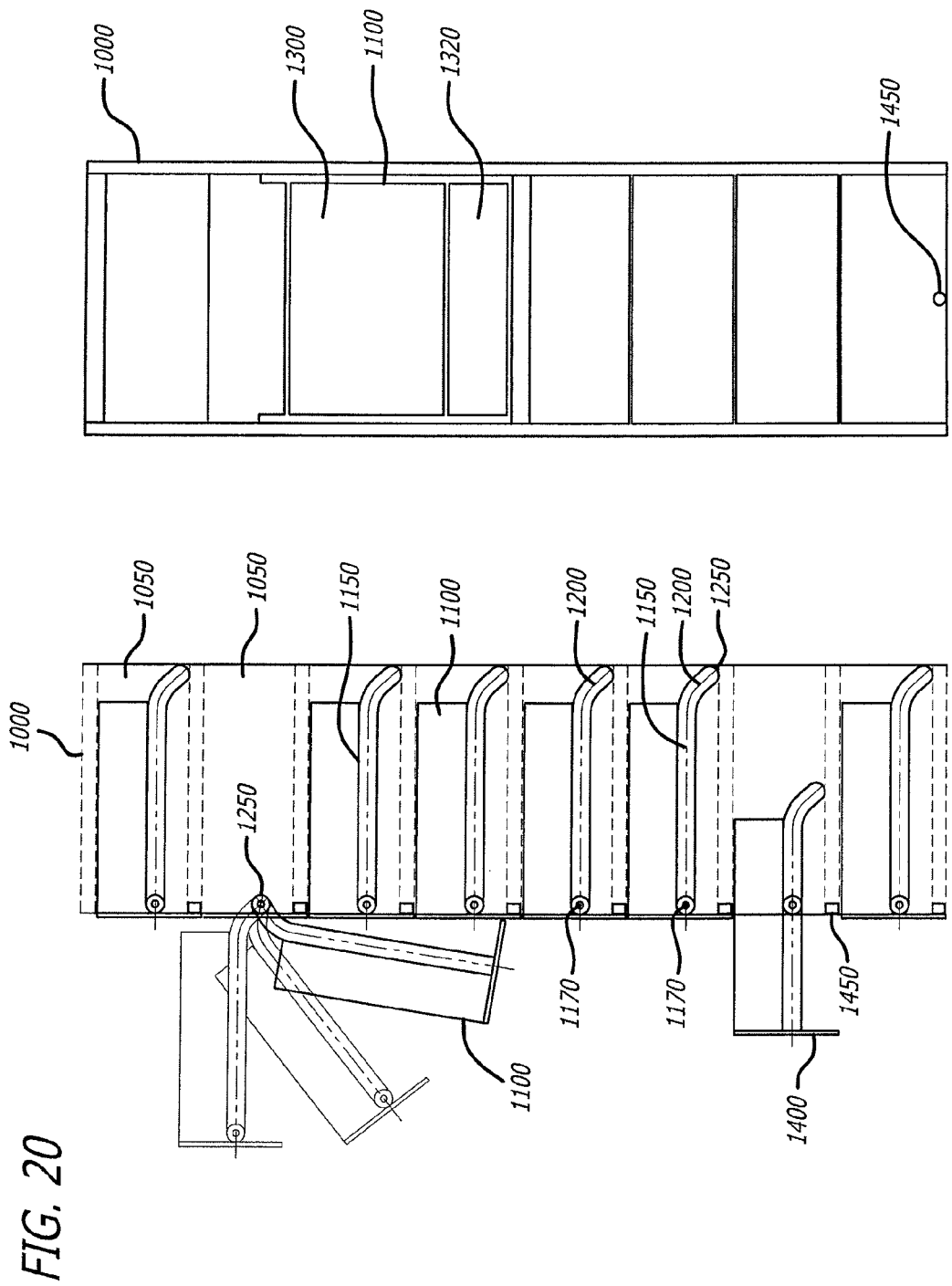
FIG. 20 is an embodiment showing a particular bin structure capable of being included in the various system embodiments.

Turning now to FIG. 20, there are shown modular shelf units 1000 which can be used in connection with a hair dye system. The modular shelf units 1000 include a plurality of shelf openings 1050 to accommodate receptacles 1100 that slide outwardly towards the user to open. The receptacles 1100 include a glide or channel 1150 that receives opposing pins 1170 that protrude from the front of the openings. The channel 1150 includes a curved section 1200 near the back region of the receptacle. The curved section 1200 curves such that an end 1250 of the channel 1150 is positioned near the back lower region of the receptacle. Thus, when the receptacle is pulled out, it can swing or pivot downwardly. The drawer can have various sections 1300, 1320 to help organize and sort the product placed therein.

As further shown, the receptacle can have a front lower lip region 1400 that covers a fixed indicator light 1450 or LED positioned in the shelf openings. The front lower lip region 1400 may have transparent or translucent qualities, such that when the receptacle is fully closed and the light is turned on, the user would be able to see the light through the front lower lip region 1400.

Figure 21:
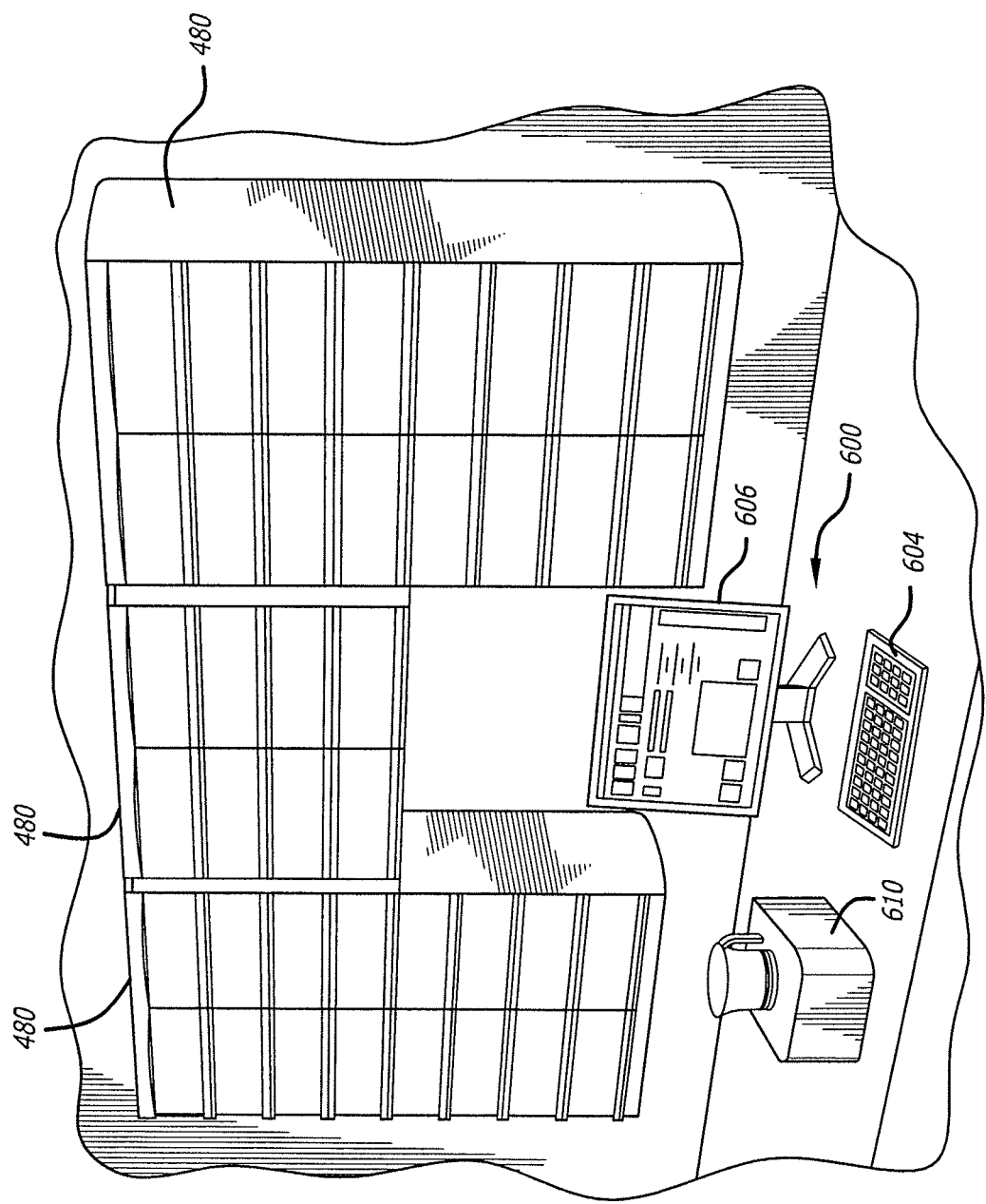
FIG. 21 is a perspective view of a system in accordance with an embodiment of the present disclosure.

Referring now to FIG. 21, a blending control system 600 is shown for preparing a hair dye mixture having various components. The blending control system generally includes a computer-driven system having one or more of the following elements: (a) a memory, (b) input controls 604, and/or (c) a display 606. The blending control system further includes at least one formula stored in the memory. The formula defines instructions of one or more colorants and/or dye blending materials and amounts recommended for recreating a hair dye mixture. The blending control system also includes a scale 610 in communication (wireless or wired) with the system. The blending control system further includes bins in communication with the blending control system. As explained above, the receptacles may include indicators and/or locks.

It is further provided that the above noted software functions are defined to be created within either a single software component or multiple software components. These components can be designed to work together regardless of the software language used to create the functions. Furthermore, the software would be specifically configured to perform the functions in order to impart structural elements into the software and the embodiments disclosed herein.

In one further embodiment, there is provided a method for preparing a hair dye mixture, either manually, semi-manually, or automatically as defined above. The method to be performed uses a scale and control system in communication with each other. The control system provides a memory and a display, with the memory containing a formula that defines instructions for blending a hair dye mixture. The instructions are displayed on the display for a stylist or user to perform the various steps which include viewing the display of instructions and then following the instructions by adding to a receptacle on the scale, colorant(s) and dye blending material(s) in accordance with the instructions. In this embodiment, the stylist is using a hair color manufacturers' standardized packaging, such that non-standardized or specialized packaging of colorants and/or dye blending materials are not required. Terminology is as defined above.

In other aspects of this embodiment, the method continues with the steps of viewing the display of an indicator of an amount of one or more of the colorant(s) and/or dye blending material(s) which has been added to the receptacle. The indicator further indicates pre-defined tolerances above and below a recommended amount defined by the formula. Based thereon, the stylist adds to and/or removes from the receptacle colorant or dye blending material until the indicator shows the amount in the receptacle is within the pre-defined tolerances. In addition, the indicator may further include lights, sounds, and/or graphics.

Still other aspects of this embodiment may include the step of validating the colorant and/or dye blending material being adding to the receptacle by comparing the hair color manufacturers' standardized packaging against the formula. The validating step may include using a scanner to scan the hair color manufacturers' standardized packaging and checking the display for an indication that the scanned hair color manufacturers' standardized packaging is listed by the formula. In yet other aspects, the method may include the stylist accepting a weight of a colorant or dye blending material in the receptacle on the scale, and then adding additional colorant(s) or dye blending material(s) to the receptacle on the scale in response to the control system displaying an adjusted formula calculated by the control system. The adjusted formula is based on the accepted weight of the colorant or dye blending material in the receptacle when the accepted weight is different than a recommended amount defined by the formula.

In addition, the stylist may verify and accept a weight of a colorant or dye blending material in the receptacle on the scale, prior to adding subsequent colorant(s) or dye blending material(s) to the receptacle on the scale in accordance to the formula. The stylist may also weigh the receptacle on the scale, when the receptacle holds a remaining amount of colorant and/or dye blending material (e.g., after use). The remaining weight is defined to include only a portion of the colorant and/or dye blending material previously prepared in accordance with the instructions. In this instance, the control system is capable of revising the stored instructions based on the remaining amount of colorant and/or dye blending material in the receptacle compared to an amount of colorant and/or dye blending material previously prepared.

In another embodiment, the blending control system has a control system that communicates with a plurality of receptacles (that may be one or more of the type detailed above or may be a general type of receptacle defined to hold one or more dye or blending component or tube). As also explained above, in one aspect, the receptacles may include a number of indicators to identify one or more specific receptacles as provided by the control system. The indication to a specific receptacle would be done to notify the operator of the control system of where a particular component or tube is located or where it should be placed. The indicators may be lights, sounds, or any combination thereof.

As also noted above, in another aspect of this embodiment, the control system may have a locking software component that is in communication with mechanisms which control the locking and unlocking of the receptacles. The locking software component is configured to perform a number of operations depending on the need. For example, the locking software component may release and unlock on the receptacles or only on a portion of the receptacles. This may be needed for inventory purposes. The locking software component may also be in communication with the control system formula software component such that the locking software component is configured to release and unlock one or more receptacles based on the items needed to re-create and manually prepare a formula. Specific ingredients needed for the formula and stored in a receptacle would be locked in the receptacle for security purposes. When needed and identified by a formula, a signal would be sent to the mechanism to unlock the receptacle. When the component or tube is replaced, the user would note the replacement of the component or tube into the system, and the locking software would then lock the receptacle. These steps would repeat as the formula was recreated by the user.

The locking software may also identify specific manufacturers such that during inventory inspection/addition the system could release all of the locks to a specific manufacturer. This could also be linked to a specific order such that when an order of products is received, the locking software would be configured to only unlock the receptacles noted in the order. The locking software may also be configured to unlock/lock for a predetermined period of time, thereby providing the operator with only a limited period to use and replace the component or tube. If the time period is exceeded, a signal/alarm may be noted to identify that the receptacle has been unlocked too long.

In yet another aspect of this embodiment, the system may include a means to detect the contents of the receptacles. The means to detect may include scales positioned in each receptacle. The scales would each have monitoring software communicating with the control system to monitor and report the weight of the contents of the receptacle. The system could then detect when a component or tube is missing when compared to the actual inventory content. Other types of monitoring equipment could be employed such as RFID tags and readers. Each component or tube would have to have a tag which would be read by a reader positioned in each receptacle. Infrared tags and readers could similarly be employed. Scales would, in particular, provide for accurate measurements of the amount of the components in each receptacle, allowing the software to report on inventory levels needed for re-ordering. This would eliminate the need to check each component tube when inventory and ordering is done. Reporting software would also be provided to generate reports on the accurate inventory levels, when components are missing, and ordering reports. These lastly lead to an increased security access on the receptacles. The salon would then be able to generate reports on which employees accessed the receptacles, when access was made, and if inventory is missing or over used.

In one of the system embodiments, there is provided a system for storing hair dye components including a computer control system having at least a memory, input controls, and a display. The system further includes a plurality of receptacles, each receptacle being sized to store at least one hair dye component tube to define storage of a colorant or dye blending material. The computer control system further includes linking software configured to link and identify one or more colorant(s) or dye blending material(s) to a receptacle. Each receptacle provides for an indicator in communication with the control system and is configured to activate upon the receipt of a signal from the control system. An indicator software component is stored on the control system and is in communication with the indicators. The indicator software component is configured to send a signal to one or more of the indicators when the control system receives an input to select a colorant or dye blending material.

Similar to this system embodiment, there is also provided a method of storing hair dye components. The method includes the steps of providing a control system with at least a memory, input controls, and a display. The method further includes providing a plurality of receptacles. Each receptacle is sized to store at least one hair dye component tube to define storage of a colorant or dye blending material. Each receptacle further provides an indicator about each receptacle, each indicator being in communication with the control system and configured to activate upon the receipt of a signal from the control system. The method also provides for the step of linking, at the control system, one or more colorant(s) or dye blending material(s) to a receptacle; and then sending a signal from the control system to one or more of the indicators when the control system receives an input to select a colorant or dye blending material.

In other aspects of these system and method embodiments, the indicators may be lights or sounds. Furthermore, the input to select a colorant or dye blending material by the control system may be in response to (a) the selection of a formula, which is stored in the memory and defines instructions of one or more colorants and/or dye blending materials and amounts recommended for manually recreating a hair dye mixture; (b) the creation of a new custom color; (c) the inventory of hair dye component tubes; (d) the restocking of inventory; and the like.

In another aspect, there is provided a system embodiment for the storing of hair dye components. The system includes a computer control system having at least a memory, input controls, and a display; and a plurality of receptacles, each receptacle being sized to store at least one hair dye component tube to define storage of a colorant or dye blending material. The computer control system further includes linking software configured to link and identify one or more colorant(s) or dye blending material(s) to a receptacle. Each receptacle also includes a locking mechanism configured to lock and unlock the receptacle. Each locking mechanism is further in communication with the control system and configured to lock or unlock upon the receipt of an unlocking or locking signal from the control system. The computer control system further includes a locking software component in communication with the locking mechanisms and is configured to send a unlocking or locking signal to one or more of the locking mechanisms.

Similar to this system, there may be provided a method for storing hair dye components. The method may include the steps of providing a computer control system having at least a memory, input controls, and a display; providing a plurality of receptacles, each receptacle being sized to store at least one hair dye component tube to define a storage of a colorant or dye blending material; providing a locking mechanism positioned about each receptacle configured to lock and unlock the receptacle, each locking mechanism is in communication with the control system and configured to lock or unlock upon the receipt of an unlocking or locking signal from the control system; linking one or more colorant(s) or dye blending material(s) to a receptacle; and sending, from the control system, an unlocking or locking signal to one or more of the locking mechanisms.

Furthermore, the locking software may be further configured to send an unlocking or locking signal to one or more of the locking mechanisms when the control system receives an input (a) selecting a colorant or dye blending material; (b) monitoring an inventory of the colorant or dye blending material; (c) identifying a specific manufacturer of colorant or dye blending material; (d) relating to an order of inventory stored on the control system; (e) relating to the selection of a formula, stored in the memory and defining instructions of one or more colorants and/or dye blending materials and amounts recommended for manually recreating a hair dye mixture, and the like. In addition, the locking software may be further configured to send unlocking or locking signals (a) to all of the receptacles; (b) to a plurality of the receptacles, and the plurality of the receptacles all relate to a specific manufacturer of colorant or dye blending material; and the like. The system and method in this embodiment may further include a reporting software component in communication with the control system and configured to (a) generate a report on the unlocking of receptacles; or (b) generate a report on the unlocking of receptacles over a period of time or as related to a specific user.

In still another aspect, there is provided a system for storing hair dye components, having a computer control system having at least a memory, input controls, and a display; a plurality of receptacles, each receptacle being sized to store at least one hair dye component tube to define a storage of a colorant or dye blending material; linking software stored on the control system and configured to link and identify one or more colorant(s) or dye blending material(s) to a receptacle; and a detection means positioned in each receptacle and being in communication with the control system to detect and monitor hair dye component tubes stored in each receptacle. Similar thereto, a method may be provided that includes providing a detection means positioned in each receptacle and being in communication with the control system to detect and monitor hair dye component tubes stored in each receptacle.

In the system and method, the detection means may include a scale positioned in each receptacle and be in communication with the control system and may further include monitoring software in communication with the control system to monitor a weight on each of the scales. The detection means may also be defined with an RFID reader positioned in each receptacle, and each is in communication with the control system and monitoring software in communication with the control system to monitor the RFID readers, and each hair dye component tube has an RFID tag. In another detection means, there may be provided an infrared reader positioned in each receptacle and each is in communication with the control system and monitoring software in communication with the control system to monitor the infrared readers, and each hair dye component tube has an infrared tag.

As described herein, there are provided various systems and methods to perform specific functions of the various embodiments. In one embodiment there is provided a system for preparing a hair dye mixture. The system includes a control system having at least a memory, input controls, and a display. At least one formula is stored in the memory, and the formula contains one or more colorants and/or dye blending materials and amounts recommended for recreating a hair dye mixture. A scale is provided and is in communication with the control system, with monitoring software to monitor a weight on the scale. In addition, software for displaying the formula on the display in response to a manual input from the input controls is provided. The embodiment further includes indication software configured to display an amount of the colorants(s) and/or dye blending material(s) required to be added to the scale and further configured to indicate the recommended amounts in comparison to the amount that has been added to the scale. Tolerance indication software is also provided and configured to indicate predefined ranged tolerances above and/or below the recommended amounts, such that a user is able to identify whether the amount added to the scale for a colorant and/or dye blending material is within the predefined ranged tolerances.

The tolerance indicates can be lines on a pictorial graph, or audible signals. A further warning signal may be provided to indicate when the amount on the scale for a colorant and/or dye blending material is outside the predefined ranged tolerances.

In another embodiment, there is provided a system for the preparation of a hair dye mixture, the system including a control system having at least a memory, input controls, and a display and at least one formula stored in the memory. The formula defines instructions of one or more colorants and/or dye blending materials and amounts recommended for recreating a hair dye mixture. Each colorant and/or blending material is separately assigned to a first product brand, such that brand selection software can be configured to receive a manual input from the input controls to change a colorant and/or blending material from the first product brand to a second product brand. Brand adjusting software would be configured to adjust the formula of the hair dye mixture from the first product brand to the second product brand in response to the manual input. The brand selection software may further be configured to receive a single manual input from the input control to change all of the colorant(s) and/or blending material(s) from the first product brand to a second product brand, such that the brand adjusting software can adjust the formula of the hair dye mixture from the first product brand to the second product brand in response to the manual input.

In one embodiment, brand conversion software may be configured to convert all of the formulas in a database from the colorant(s) and/or blending material(s) in a first product brand to the colorant(s) and/or blending material(s) in a second product brand. In this manner, the brand conversion software may convert all of the formulas in the hair dye mixture from the first product brand to the second product brand. In another embodiment, brand conversion software may be configured to convert a user-selected number of formulas (e.g., more than one formula but less than all of the formulas) in the database from the colorant(s) and/or blending material(s) in a first product brand to the colorant(s) and/or blending material(s) in a second product brand, thereby converting the user-selected number of formulas in the hair dye mixture from the first product brand to the second product brand.

The conversion from one brand to another brand may be based on a predetermined formulated brand conversion ratio or adjustment bracket. Once converted, the adjusted formula may be stored in the memory. In the embodiment in which all of the formulas in a database or a user-selected number of formulas in the database are converted, all of the converted formulas may be saved and stored in the database for later use without requiring the conversion process to be recalculated every time a converted formula is needed.

In another embodiment, there is provided a system for preparing a hair dye mixture. The system includes a control system having at least a memory, input controls, and a display; along with at least one formula stored in the memory. The formula defining instructions include one or more colorants and/or dye blending materials and amounts recommended for recreating a hair dye mixture. The embodiment further includes software for displaying the instructions on said display in response to a manual input from the input controls, and formula adjustment software configured to receive an adjustment protocol input from the input controls, the adjustment protocol input being further defined as a change in the instructions to the formula. The formula adjusting software is further configured to adjust the formula of the hair dye mixture when it is in accordance with the adjustment protocol input such that the formula adjusting software defines an adjusted formula. The formula adjusting software is further configured to display the adjusted formula on the display.

The adjustment protocol input can be based on a removal, addition, or substitution of one or more colorants and/or dye blending materials. As such the system may determine if additional colorants or blending materials need to be added or removed in response to the change.

In another embodiment, there is provided a system for preparing a hair dye mixture, which includes a control system having at least a memory, input controls, and a display and a scale in communication with the control system. Monitoring software is provided and configured to monitor a weight on the scale along with software that is configured to display the instructions on said display in response to a manual input from the input controls. The embodiment further includes memory having information stored thereon, wherein the information includes (a) at least one client and associated client data, (b) at least one formula defining instruction of one or more colorants and/or dye blending materials and amounts recommended for recreating a hair dye mixture, and/or (c) inventory data relating to the colorants and/or dye blending materials are available for recreating a hair dye mixture, and the information further includes employee information and corresponding employee identification. The embodiment is then able to include identification software configured to prevent access to the information and/or scale, and the identification software further is configured to allow access to the information and/or scale when an entered identification matches an employee identification. The entered identification may be associated with one or more of the following: a magnetic card scanner, a fingerprint scanner, a barcode reader, and a password.

In another embodiment, there is provided a system for preparing a hair dye mixture, having a control system having at least a memory, input controls, and a display; a scale in communication with the control system; monitoring software configured to monitor a weight on the scale; and software configured to display the instructions on the display in response to a manual input from the input controls. The memory has information stored thereon, including (a) at least one client and associated client data, (b) at least one formula defining instructions of one or more colorants and/or dye blending materials and amounts recommended for recreating a hair dye mixture, and/or (c) inventory data relating to the colorants and/or dye blending materials available for recreating a hair dye mixture. The embodiment further includes inventory software configured to calculate an inventory level of the one or more colorants and/or dye blending materials by reducing a current inventory level by an amount used during the manual preparation of a hair dye mixture and by increasing the current inventory level by an amount received during a new shipment; and the inventory software further configured to receive and store an actual inventory level of the one or more colorants and/or dye blending materials based on a manual input and/or weight on a scale. Lastly, reporting software is provided and configured to create a report based on inventory shrinkage when a current calculated inventory level is compared to an actual inventory level. This can further be based on costs such that the inventory, shrinkage reports can include final costs.

In yet another embodiment, there is provided a system for preparing a hair dye mixture, having a control system having at least a memory, input controls, and a display; a scale in communication with the control system; monitoring software configured to monitor a weight on the scale; and memory having information stored therein. The information includes (a) at least one client and associated client data, (b) at least one formula defining instructions of one or more colorants and/or dye blending materials and amounts recommended for recreating a hair dye mixture, and/or (c) cost associated with each one or more colorants and/or dye blending materials. The information further includes at least one employee information and corresponding employee identification.

Tracking software is provided and configured to store on the memory a final amount used of each of the one or more colorants and/or dye blending materials defined by the formula during creation of a hair dye mixture and an associated cost of the creation of the hair dye mixture. The tracking software further configured to link the associated cost to an employee. Reports based on the final costs/average costs can be generated for specified time periods. In addition, the tracking software can report on an amount of the one or more colorants and/or dye blending materials used by an employee as well as the remaining amounts when the mixture is weighed after application. Final costs of product used versus amounts charged can be reviewed and charted. In addition, high use or low use materials can be determined for stocking and ordering as well as purchase incentive programs. Generated purchasing orders can be calculated and automatically sent to third party venders.

Furthermore, with the knowledge of which products are being used and with the system potentially linked to the salon management portion of the system, further forecasting of the salon needs can be determined. With appointments logged with the type of service and formulas that will be generated, reports can be generated to determine how much of a product needs to be in stock as well as actual inventory levels and reports on which products need to be ordered. Generating and sending purchase orders when needs are determined either automatically or upon review and approval by the salon manager.

In a first embodiment, a system is disclosed for the preparation of mixtures, such as but not limited to hair dye mixtures, personal care product mixtures, and the like. The system includes a computer control system having at least a memory, input controls, and a display. The system may be any computer based system readily available for use and incorporation, including but not limited to touch screen tablets, laptops, mobile devices, and/or PC hard drives with separate monitors and input devices (keyboards, a mouse, and the like). The system further includes the capacity to run various software programs, algorithms, and coded lines to accomplish the tasks that are outlined herein. These software related tasks may either be separable and linked together to exchange/communicate information and date; or be combined into a single program.

The memory has the capacity to store and/or storing at least one mixture formulated from the mixing of one or more components, such as but not limited to colorants, dyes, and/or blending materials. The system upon receiving an input for a creation of a mixture includes software for displaying the formula of the mixture on the display to indicate the component(s) and amount(s) needed to create the desired mixture.

The system further includes software for batch sizing the mixture based on inputs received from the stylist. The batch sizing software automatically creates an adjusted formula that is displayed to the stylist for their manual re-creation of the mixture. Inputs could be from a touch screen, mouse, keyboard, voice recognition software, and the like. The batch sizing software is capable of adjusting the formula to create an adjusted formula and then is further capable of displaying the adjusted formula for the stylist's use.

In one embodiment, the system automatically determines the correct batch or formula size by requesting an input(s) from the stylist. The stylist will first select a formula of a mixture. The stylist will then request to have the formula right-sized. Electronically, this is done by using a selection either in a touch screen, mouse dick, or highlighted entry. The system then produces a matrix, or other configuration, on the screen, which requires the stylist to select one of the boxes. Once one of the boxes is selected, the batch sizing software is capable of batch-sizing the formula to match the selected entry. The adjusted or batch-sized formula is then displayed for the stylist. If batch sizing is not requested, the formula can simply be displayed. After which the batch sizing software will end.

In other aspects, the right sizing system software once selected is capable of displaying a series of questions prior to the display of the matrix or other configuration. The questions may further include graphical images that help the stylist to formulate a response. In some embodiments, a series of questions and/or graphical images may be included with the questions. Based on the answer to these questions, the batch sizing software is capable of automatically calculating an adjusted formula, or if the formula is not present is capable of displaying the proper amount of materials to use, which typically would not include the developer material. It is typical in the industry to use a 1:1, 1:1.5, or 1:2 ratio of materials to the developer. Often the manufacturer sets this ratio for its own products. For example, one embodiment includes a question on the determination of the type of hair application, such as a Retouch Application, a Scalp to Ends Application, or a Retouch and Refresh Application. A second question may determine the length of the hair, with pictorial representations of Short Hair; Medium Hair; and Long Hair. Lastly, the system may need to determine the texture of the hair, such as Fine Hair; Medium or Normal Hair; and Coarse Hair. As noted the individual questions could be presented electronically one at a time to provide the batch sizing software with answers that once received are capable of automatically creating an adjusted formula for further display to the stylist. The answers to the questions may be displayed through a touch screen with the user selecting the appropriate graphic representation.

In another embodiment, a matrix may be used by a stylist to determine the amount of colorant to use on a customer. The matrix while shown as a 3×3 matrix may be larger or smaller depending on specific use, customization, or product manufacturer aspects. Following a similar process above, the system will request input(s) from the stylist. Initially, the stylist will select a formula of a mixture. Second, the stylist will request to have the formula right-sized. Next, the system will produce a matrix on the screen, requiring the stylist to select one of the boxes from the matrix. In this embodiment, across the top of the matrix there is a first legend listing hair lengths: short length hair, medium length hair, and long hair; while across the side there is a second legend listing the hair care application: retouch, scalp to ends, and retouch and refresh.

In a color retouch for a single process color, the application of a batch is applied to the new growth of hair not exceeding ½ inch growth. The color retouch is necessary for covering gray, or in maintaining all over color, such as the maintenance of color services. In a retouch and refresh, the application of batch is applied to the new growth, mid-growth and ends of hair. Often a separate formulation is prepared for the mid-shaft and ends. All hair from new growth through the ends is covered with color. This service is needed when the overall color has lost its tone, faded more than one level, and corrected work is needed, or the client has requested a change of color. Color tends to fade due to sun exposure, swimming or the use of harsh shampoos. It is also shown or illustrated that the total amounts are listed by the matrix for the total amount of colorant or dye, but does not include developer. Also, the stylist should keep in mind other key factors such as multi-shades, alternating more than one color and ration of the developer.

In another embodiment, there is a retouch box for short length hair, a retouch box for medium length hair, and a retouch box for long length hair; a "scalp to end" box for short length hair, a "scalp to end" box for medium length hair, and a "scalp to end" box for long length hair; and a "retouch and refresh" box for short length hair; a "retouch and refresh" box for medium length hair; and a "retouch and refresh" box for long length hair.

In addition, a subsequent or preceding question regarding the texture of the hair could alter the amounts accordingly. For example, the information calculated or displayed could be for normal texture hair. The batch sizing software, if prepared to take the texture of the hair into account in its adjustment, would be capable of adjusting the formula by decreasing the amount of the formula for fine or thin textured hair and/or increasing the amount of the formula for coarse or dense hair. The increase or decrease may be based on the hair or may simply be adjusted by adding or subtracting ¼ or ½ oz. of product to the total amount. This would be automatically done by the batch sizing software that is capable of a textured adjustment.

In another embodiment, a further matrix or other configuration may be used or provided to determine the batch sizing adjustment based on the amount of an off scalp process. Across the top of the matrix there is first legend listing hair lengths: short length hair, medium length hair, and long hair;

while across the side there is a second legend listing amount to apply: such as Low Zone (20% or less of the head); Partial Zone (no more than 40%); and Full Zone (50% and greater). Once one of the grid squares is selected the software is capable of right-sizing the formula based on the amount to apply. The right-sized or adjusted formula will then be displayed for the stylist in order for the manual re-creation of the right-sized formula.

Additionally, there is shown the following: a "zone off scalp application" box for short length hair, a "zone off scalp application" box for medium length hair, and a "zone off scalp application" box for long length hair; a "partial off scalp application" box for short length hair, a "partial off scalp application" box for medium length hair, and a "partial off scalp application" box for long length hair; and a "full off scalp application" box for short length hair; a "full off scalp application" box for medium length hair; and a "full off scalp application" box for long length hair.

In addition, the data input for the boxes or matrix can be based on other customer characteristics or services requested. As such, the individual items in the rows and columns exhibited herein, may be changed in other embodiments. In addition, a larger matrix can be placed that further defines other percentages of application and further defines the types of hair such as fine, medium, coarse, and combinations thereof. Each of these types can be further refined; for example, coarse hair may include Rough, Wire, Heavy, Wild, Strong. The system may include further questions for the stylist, including whether the regrowth on long hair exceeds ½ inch, in which case the right-sizing will add 75 grams or ¼ ounce of color to the formula.

In a method of right-sizing a batch, the stylist starts with a formula outlining the various colorants and/or blending materials along with the amounts to be added. With being provided a particular matrix that outlines the hair length or hair style against the service requested (refresh, scalp to end, retouch, particular zone, partial, full) the stylist will select the correct matrix grid square corresponding to the customer characteristic and the service required. Based on the selected matrix grid square and the amount dictated therein, the stylist can calculate the correct batch size. This can be done without the aid of a computer-driven system. According to another aspect, the matrix being a 3×3 grid for the application off scalp starts with a single zone for short length hair with the required amount of 15 grams of color used to blend.

One or more various embodiments for batch sizing a formula are disclosed herein. In a first embodiment, there is provided a method of batch sizing a formula of one or more hair dye materials, with corresponding recommended amounts. The formula is defined for a stylist to manually recreate a hair dye mixture. This first embodiment is performed by an electronic device that has a display, memory, and an input device. The first embodiment includes, providing an electronic device that has a computer based medium with a computer readable program code executed to perform various functions. These functions include (a) the displaying of a plurality of batch sizing adjustment criteria, wherein each of the batch sizing adjustment criteria defines a total amount for a formula; (b) the receiving of a user input selecting one of the plurality of batch sizing adjustment criteria; (c) the creation of an adjusted formula with adjusted corresponding recommended amounts based on the selected batch sizing adjustment criteria; and (d) the displaying of at least the adjusted corresponding recommended amounts.

In a second embodiment, there is provided a method of batch sizing a formula, of one or more hair dye materials, with corresponding recommended amounts. The formula is defined for a stylist to manually recreate a hair dye mixture. This second embodiment is performed by providing an electronic device, which has a computer based medium with a computer readable program code being executed to display a plurality of batch sizing adjustment criteria auto-arrange in a matrix of adjustment boxes. Each of the batch sizing adjustment criteria defines a total amount for a formula. The second method is formed by selecting one of the plurality of batch sizing adjustment criteria; and adjusting the formula by adjusting corresponding recommended amounts based on the selected batch sizing adjustment criteria.

In a third embodiment, there is provided a method of batch sizing a formula, of one or more hair dye materials with corresponding recommended amounts. The formula is defined for a stylist to manually recreate a hair dye mixture. A third embodiment is performed by providing a plurality of batch sizing adjustment criteria wherein each of the batch sizing adjustment criteria defines a total amount for a formula. The method continues by the selection of one of the plurality of batch sizing adjustment criteria and then adjusting the formula by adjusting corresponding recommended amounts based on the selected batch sizing adjustment criteria.

In a fourth embodiment, there is provided an apparatus for batch sizing a formula. The apparatus includes a control system having at least a memory, an input control, and a display. The apparatus further includes batch sizing software, being configured to first display a plurality of batch sizing adjustment criteria, wherein each of the batch sizing adjustment criteria defines a total amount for a formula; being configured to receive an input from the input control a selection of one of the plurality of batch sizing adjustment criteria; being configured to create an adjusted formula with adjusted corresponding recommended amounts based on the selected batch sizing adjustment criteria; and being configured to display the adjusted formula and to display the adjusted corresponding recommended amounts.

In a fifth embodiment, there is provided an apparatus for batch sizing a formula. The apparatus includes a control system having at least a memory, an input control, and a display. The apparatus further includes batch sizing software, being configured to display a plurality of batch sizing adjustment criteria, wherein each of the batch sizing adjustment criteria defines a total amount for a formula. The batch sizing software is further configured to receive an input from the input control a selection of one of the plurality of batch sizing adjustment criteria and configured to create an adjusted formula with adjusted corresponding recommended amounts based on the selected batch sizing adjustment criteria. The batch sizing software is yet further configured to display the adjusted formula and to display the adjusted corresponding recommended amounts.

In one or more of the above embodiments, the control system or electronic device may be defined to reside in one of the following: a hand-held PDA, mobile-phone, laptop computer, and PC computer. The above embodiment may further define the batch sizing adjustment criteria as a series of questions or as a plurality of adjustment boxes arranged in a matrix on the display.

Various embodiments are described herein that may utilize various features of a color preparation and management system and method described herein. As disclosed, the color preparation and management system and method includes a computer with display to provide a graphical user interface (GUI) to a user (e.g., operator, technician, stylist, client, customer, and the like). The display may be a touchscreen.

The color preparation and management system and method includes a scale communicably coupled to the computer. The computer may be connected to the scale over a network connection, wired connection (e.g., USB), a wireless connection (e.g., BLUETOOTH®), or the like. In some embodiments, the scale includes one or more processors and to execute software instructions stored on a memory corresponding to the methods disclosed herein, and uses the computer for the display and user input devices (e.g., touchscreen, keyboard, and mouse). For example, connecting the scale to the computer may cause the processor in the scale to process software instructions and pass graphical information to the computer for display to the user. Using the computer, the user may provide one or more inputs that are transmitted to the processor in the scale for processing.

Thus, the scale may be used to create a virtualized environment. For example, a scale may be communicably coupled to a plurality of computers over a network. The scale may provide graphical data for each computer in the network to display, which may be the same or different for each computer. As the scale receives data (e.g., user input data, environment data, location data, and the like) from each computer, the scale processes the data to update the information presented to the user at each respective computer. Such an embodiment saves valuable system resources on each computer connected to the scale.

In other embodiments, the scale may rely on the computer to execute software instructions corresponding to the methods disclosed herein. For example, upon connecting the scale to a computer for the first time, the scale may download software from the memory local to the scale to the memory local to the computer. In yet other embodiments, the scale simply transmits weight information data to a computer that has software installed thereon that, when executed, performs one or more functions disclosed herein.

The GUI allows for intuitive operation because the user is able to view graphical and textual information in a visually organized manner. In addition, the GUI provides the user with a plurality of inputs in the form of virtual keys/buttons. In embodiments employing a touchscreen display, these virtual keys/buttons may be activated by touching the screen where the virtual keys/buttons are displayed. The computer may process the touch data to determine the coordinates of the touch, and therefore, whether a virtual key/button has been activated. As described herein, the color preparation and management system and method performs a plurality of different functions by executing software. Reference to the color preparation and management system and method may refer solely to the computer or both the computer and the scale connected to the computer.

Alternatively or additionally, soft keys may be positioned alongside the display, which may be programmed to correspond to specific virtual keys/buttons. In such embodiments, the user may activate a soft key to activate the corresponding virtual key/button on the display, which may invoke a function corresponding to the virtual key/button. In some embodiments, the GUI may be presented to the user as shown in FIGS. 23-32 with one or more GUI modules. The one or more GUI modules may include, for example, a "Log-In" GUI (e.g., the log-in screen) module, a "Client Selection" GUI module (e.g., FIGS. 24A-C), a "Client History" GUI module (e.g., FIGS. 25A-D), a "Client Information" GUI module (e.g., FIGS. 26A-D), a "Create New Formula" GUI module (e.g., FIGS. 28A-I and 29A-B), a "Modify Formula" GUI module (e.g., FIG. 28J), a "Batch Sizing" GUI module (e.g., FIGS. 27A-B), a "Dispense Formula" GUI module (e.g., FIGS. 30A-J), a "Weigh-Out" GUI module (e.g., FIGS. 31A-E), a "Re-batching" GUI module (not shown), a "User Session Time-Out" GUI module (e.g., FIG. 32), and the like.

Figure 33:
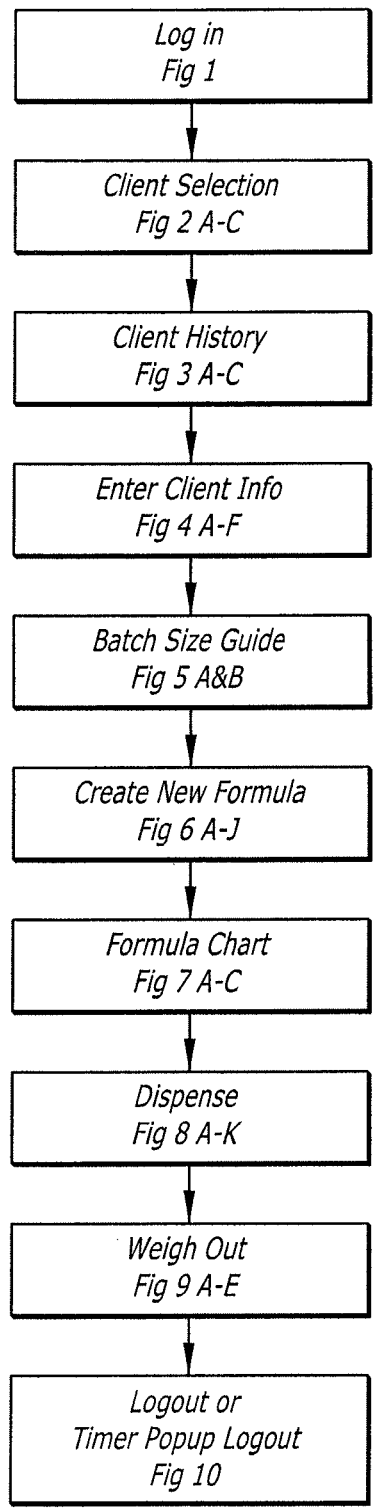
FIG. 33 shows one embodiment of a user's navigational flow between the different GUI modules disclosed herein.

In one embodiment, the user may navigate through the GUI modules as shown in FIG. 33. The color preparation and management system and method may enable the user to navigate from one GUI module to another GUI module in any order. For example, while the flow between different screens and GUI modules is described herein according to various embodiments, other embodiments may be designed such that any screen may be accessed from any other screen in any GUI module. The color preparation and management system and method may enable such navigation by displaying the requisite virtual keys for the user to select.

In one embodiment, each screen presented on the display in each GUI module may include a virtual "Map" key. Upon the user selecting the "Map" key, the color preparation and management system and method may bring the user to the "Map" or "Table of Contents" GUI module. The "Map" GUI module enables the user to select particular screens and/or GUI modules to navigate in any order. In some embodiments, the color preparation and management system and method restricts access to one or more screens and/or GUI modules if certain data has not been input by the user. For example, if the user wishes to navigate immediately to the "Batch Sizing" GUI after logging in, the color preparation and management system and method may prompt the user to first select a client and a formula. In other embodiments, the color preparation and management system and method may enable the user to navigate to the "Batch Sizing" GUI without the required data so that the user may simply view the screen layout. However, the color preparation and management system and method may not enable the user to make any selections other than to go back to the "Map" GUI or continue navigating screen-by-screen with only the ability to view the screen layout.

Virtual keys/buttons labeled the same, whether by reference number or text, may cause the computer to perform the same or different function(s) on different screens in the same or different GUI module. For example, a virtual "Manufacturer" (or variations thereof) key may, when activated, cause the color preparation and management system and method to display a pop-up window in one GUI module or navigate the user to a new screen in a different GUI module. In addition, the function(s) may be different because of the theme, goal, or function of the particular GUI screen(s) or module(s) within which the seemingly same virtual key is displayed. For example, the virtual "Back" key may cancel out the user's last action (e.g., remove an ingredient just added in the "Create New Formula" GUI module) or take the user to the GUI module that the user was at before. In addition, one or more functions corresponding to any virtual key may be based on touch length, touch pressure, a gesture within or around a virtual key, and the like.

In addition, one or more virtual keys may temporarily increase in size when activated to indicate to the user which virtual key was selected. In some embodiments, virtual keys that may be toggled or selected may have a plurality of graphical states (e.g., 1 color for ON, 1 color for OFF, 1 color for unselected, 1 temporary color for selected). Navigational keys may be in every screen.

The layout of each screen or GUI module may be customized by each salon, user, business, and the like. In some embodiments, the computer may present to the user a plurality of layout options. Options may be directed towards different layouts, which may have different themes and differ in how the information is presented to the user. For example, some users may prefer fewer graphics and some may prefer more graphics. In some embodiments, the user may not like the layout of the virtual keys. The user may enter into a layout edit mode enabling the user to reposition and resize virtual keys and other graphical elements. Such customization enables a user to view information according to a layout deemed most efficient by the salon, user, and the like.

In addition, the layout of each GUI module as well as which GUI modules are accessible to the user may depend on user privileges. User privileges may also restrict access to certain data and certain calculations to only authorized users. User privileges may include one or more of the following: novice user, intermediate user, expert user, student, teacher, business owner, administrator, manager, lead stylist, independent stylists, employee stylists, and the like. For example, a novice user may only be able to access previously created formulas and not be given ability to create a new formula from scratch. In some embodiments, a novice user may be given access to restricted GUI modules once an expert user, teacher, administrator, manager, lead stylist, or the like provides his or her credentials (e.g., password). An intermediate user may be able to access both previously created formulas and be given the ability to create a new formula from scratch. However, the computer may require an expert user, teacher, administrator, manager, lead stylist, or the like to review a formula created by an intermediate user before the formula may be saved to memory. For example, if the intermediate user selects a virtual key to save the formula, the computer may display a prompt on the display requiring an expert user, teacher, administrator, manager, lead stylist, or the like to provide his or her credentials (e.g., password). An expert user may be able to access both previously created formulas and be given the ability to create a new formula from scratch without any oversight. Thus, the color preparation and management system and method enables, for example, novice hair stylists to produce exact color shades, while experienced colorists can easily create, document, and store new custom formulas.

Figure 23:
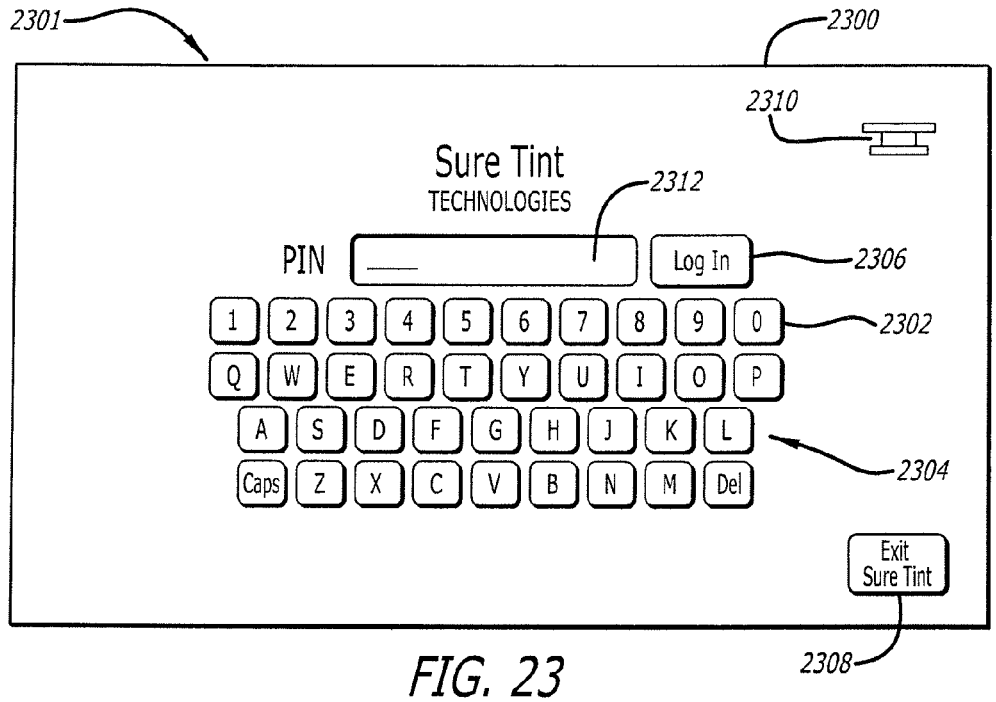
FIG. 23 shows a screenshot of a screen associated with a "Log-In" GUI module according to one embodiment.

Referring now to FIG. 23, a display 2300 with a screenshot of a log-in screen 2301 associated with the "Log-in" GUI is shown according to one embodiment. In some embodiments, the user may interact with the display 2300 by touching it, activating one or more soft keys, and/or controlling a virtual object such as a cursor by manipulating a user object such as a mouse. Thus, while the embodiments may be described as the user touching the display 2300 to invoke corresponding functions when making screen selections, the user may additionally or alternatively use soft keys or a computer peripheral device such as a mouse to interact with the GUI to make screen selections. As disclosed herein, these inputs may be processed by the computer processor or transmitted to the scale's processor for processing.

In some embodiments, a splash screen may precede the "Log-In" GUI module. The splash screen may be static or dynamic. A static splash screen does not change once initially programmed whereas a dynamic splash screen may be manually updated by an authorized user or automatically updated by a server over an internet connection. The information on the server may be updated by an authorized user. By updating information on a server, the system removes the need for the authorized user to access every computer or system individually. Instead, by updating information stored on a server, the user may effectively update the splash screen on a plurality of devices by updating the server on which the computers obtain the information.

Whether static or dynamic, the splash screen may include messages to a user of the system. These messages may be reminders or special offers that the salon or business is offering its users (e.g., stylists or customers). For example, the splash screen could display the following message: "Please remember to ask customers if they would like a beverage before mixing!" In this way, before logging in, a stylist is reminded to keep a customer's wait comfortable while the system is being accessed away from him or her. A special offer may be stylist-centric or customer-centric. For example, a stylist-centric offer may inform a stylist that the salon is starting a competition on a particular date: "Exciting news! Next Monday, our monthly mixing efficiency competition starts! The competition lasts for two weeks and the winner receives $200. Ask management for more details or log-in now to register!"

Upon providing an input (e.g., a touch or predefined gesture, mouse click, depressing a soft key, pressing any key on a keyboard), the color preparation and management system and method may proceed from displaying a splash screen to displaying a log-in screen, such as the one depicted in FIG. 23. A predefined or "unlocking" gesture may include putting all five fingers on the display in an extended fashion and simultaneously bringing them inwardly. Another predefined or "unlocking" gesture may require the user to make a circle on the display screen with one or more fingers. Yet another predefined or "unlocking" gesture may require the user to drag one or more graphical objects on the screen. Predefined or "unlocking" gestures may be useful to prevent the log-in screen from inadvertently being displayed when a user accidentally provides a different input to the color preparation and management system and method, such as a simple touch, mouse click, or the like.

As shown in FIG. 23, the log-in screen may include a plurality of virtual keys or 2302. The plurality of virtual keys 2302 may include a virtual keyboard 2304. The virtual keys 2302 may also include a virtual "Log-In" key 2306, a virtual "Exit" key 2308, and a virtual "Scale" key 2310. A pin or password field 2312 may display the numbers, letters, or special characters that the user enters via the virtual keyboard 2304. The characters displayed in field 2312 may change to masked characters to enhance security after a period of time, such as 1, 2, 5, or 10 seconds. This time period may be specific to each character or specific to the pin or password as a whole. In other embodiments, field 2312 only displays masked characters. In some embodiments, the log-in screen may include a username field. In yet other embodiments, no username or password is necessary.

One or more virtual keys 2302 may provide visual feedback when activated. For example, when the user touches the "R" virtual key, it may temporarily increase in size for a period of time and then revert back to its normal size. Such visual feedback help the user determine which key was actually touched by the user instead of having to monitor the pin or password field 2312. An audible tone or vibration may additionally or alternatively be output to the user by using a speaker in the color preparation and management system and method. For example, a piezo-electric motor may be driven to rotate, and when rotated, causes a tactile vibration that the user is able to feel.

If the user wishes to return to the splash screen, the user may activate the "Exit" key 2308. If the user wishes to access the system, the user inputs the requisite information on the log-in screen and activates the log-in key 2306. The color preparation and management system and method checks the information in a memory local or remote to one or more processors of the system. For example, the color preparation and management system and method may query a server to verify the log-in information. If the information does not match a registered user, the user may opt to re-enter the username and/or password. If the information matches a registered user, the GUI presented on display 2300 may proceed to the "Client Selection" GUI (e.g., FIGS. 24A-C). Additionally or alternatively, the requisite information may include biometric information, such as a fingerprint scan. In such an embodiment, the user may simply approach the color preparation and management system and method whilst the splash screen is displayed. The user may simply press and hold his or her finger against the screen, which causes the computer to scan the fingerprint and analyze it to determine whether the user is authorized to access the system. If authorized, the color preparation and management system and method may proceed to the "Client Selection" GUI module.

Figure 24A:
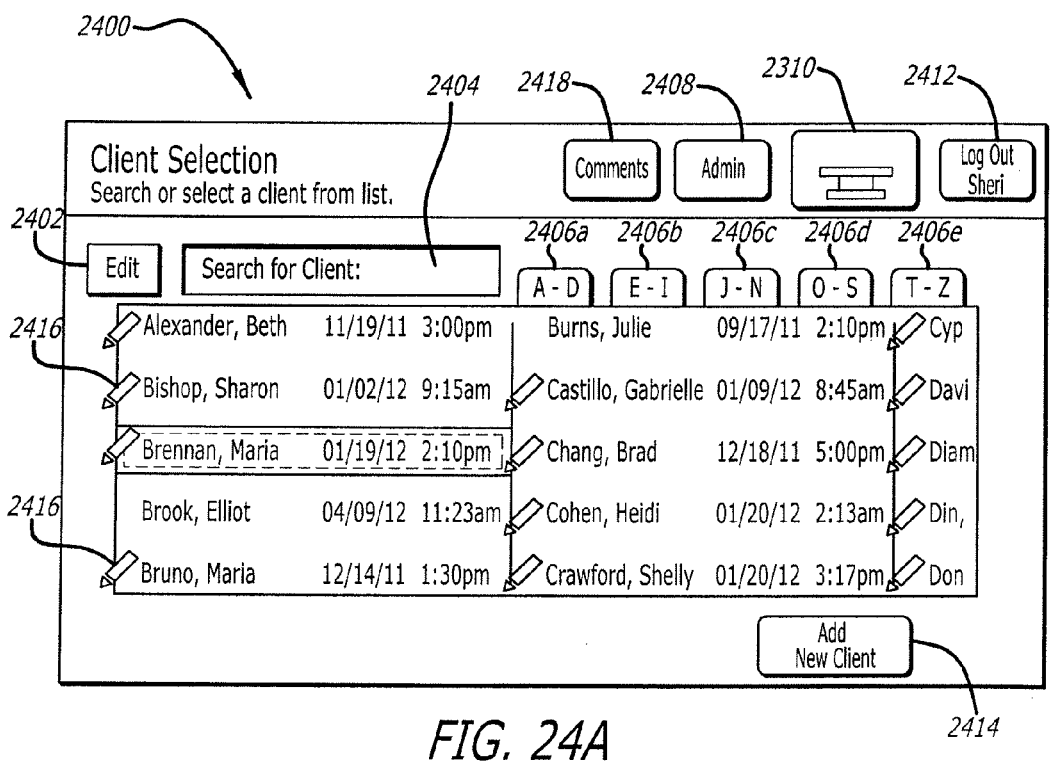
FIGS. 24A-C show various screenshots of screens associated with a "Client Selection" GUI module according to one embodiment.

FIG. 24A depicts a screenshot of the "Client Selection" GUI at a client selection screen 2400. The client selection screen 2400 enables the user to search for an existing client or add a new client. As shown, the client selection screen 2400 may include a plurality of virtual keys such as a virtual "Edit" key 2402, search field 2404, virtual tabs 2406*a-e*, a virtual "Administrator" key 2408, the virtual "Scale" key 2310, a virtual "Log-Out" key 2412, a virtual "Add New Client" key 2414, a plurality of edit icons 2416, a virtual "Comments" key 2418.

When the virtual "Log-Out" key 2412 is selected, the computer or scale processes the input, which may cause the GUI presented on display 2300 to present a pop-up window or a new screen asking the user to confirm whether he or she wishes to log-out. If the user wishes to log-out, the computer or scale may process the input such that the GUI presented on display 2300 may proceed to present the log-in screen shown in FIG. 23.

The virtual "Comments" key 2418 may be client and/or user specific. For example, the user may input global notes that may be accessed from any screen shown on the GUI of the color preparation and management system and method disclosed herein. In addition to global system notes, the user may input client-specific notes that may only be displayed when the user has selected that client in the database stored in memory. Thus, the virtual "Comments" key 2418 enables the user to view mixing notes, client notes, management notes and the like in a pop-up window or new screen. In some embodiments, the color preparation and management system and method adds a comments column in-line with other information already presented on the GUI when the virtual "Comments" key 2418 is selected by the user. For example, the client selection screen 2400 may be resized to include a comments column such that each client name would have a corresponding comments row.

The clients listed in the client selection screen 2400 may include (1) clients that the logged-in user has serviced before; (2) clients that the logged-in user is scheduled to service on a given day(s), week(s), or month(s); or (3) a combination of previously serviced clients and scheduled clients (existing or new). In some embodiments, the clients listed may include all clients irrespective of the logged-in user. As shown, the clients are listed in a vertical and horizontal fashion. The user may scroll through the list by dragging his or her finger horizontally or vertically on the screen of display 2300. In other embodiments, the clients may only be listed vertically so that the user need only scroll vertically.

In the embodiment shown, the user may access one of the navigational tabs 2406*a-e* to view the clients having last names beginning with the letters designated on the virtual tab. Activating the virtual "Administrator" key 2408 may bring the user to the log-in screen depicted in FIG. 23. Upon logging in as an administrator (or other authorized user), the user (which may be the same or different user depending on the initial user) may be brought back to the screen the system was displaying when the virtual "Administrator" key 2408 was selected.

In this regard, some embodiments may automatically save a user's session periodically (e.g., every 2, 5, 10, 30, or 60 seconds) to ensure that any progress is saved prior to the user advertently or inadvertently logging out. Information saved may include all session information, such as but not limited to (1) current screen data, (2), previous screen data, (3) all information input during the session, (4) all scale information, and (5) system state information. For example, a second user may approach a first user's logged-in session and log-out the first user with or without the first user's permission. Thus, even if the first user was in the middle of adding ingredients to a mixture, the second user may interrupt the first user without causing unnecessary waste. Once the second user is done, the first user may log back in. Upon logging in, the first user may be prompted to (1) start a new session, (2) continue the interrupted session, or (3) start a new session and save the interrupted session so that the interrupted session may be continued at a later time. In some embodiments, the interrupted session data is automatically saved until the first user or an administrator selects to delete it. If deleted, the color preparation and management system and method may analyze the data to determine waste, if any. In addition, color preparation and management system and method may store information such as the identity of the second user, and what activity the second user engaged in on the system.

In some embodiments, if the user selects to continue the interrupted session, the color preparation and management system and method determines whether the user had dispensed any ingredients. If so, the color preparation and management system and method analyzes whether a defined period of time has elapsed so as to prevent mixing over oxidized ingredients. In such an example, the color preparation and management system and method may inform the user that the previously dispensed ingredients should be discarded and the user should start dispensing the selected formula from the beginning. There is no need for the user to weigh-out the discarded, dispensed ingredients because the system already knows the exact amount dispensed. Therefore, in such a situation, the color preparation and management system and method uses the dispensed amount to determine the amount of waste.

In other embodiments, the color preparation and management system and method may present an administrator home screen to the user with a variety of different options. For example, the authorized user may be presented with one or more of the following options to select from: report generation, GUI layout management, user privileges, splash screen message, inventory management, and the like. Inventory management may enable the user to set inventory thresholds that cause the color preparation and management system and method to automatically purchase one or more ingredients when the threshold is reached. In other embodiments, the color preparation and management system and method informs an authorized user (e.g. manager or owner) that the threshold has been reached by, for example, automatically sending an email to the authorized user containing low inventory information. The email enables the user to purchase inventory in real-time. The user may respond to the email, which the system receives and analyzes to determine whether the authorized user has authorized the color preparation and management system and method to purchase more ingredients that are at their threshold values. For example, the user may simply need to respond with a "Yes" or a "No." Upon receiving the email message from the user, the color preparation and management system and method processes the message and responds with either purchasing the low inventory, setting a reminder for the user to purchase low inventory, or the like.

When a user selects the report generation virtual key, it may cause the color preparation and management system and method to generate a single report or a plurality of reports. The single report simply may be the combination of the plurality of reports into one report. Reports may be generated to provide the authorized user with information related to one or more of the following: inventory tracking, user data, trend data, and the like. Inventory tracking may involve the system tracking the number and types of services rendered, the ingredients dispensed, the amount of waste produced (e.g., the amount mixed formula left over after a service is complete). As disclosed above, the color preparation and management system and method may suggest purchases.

In some embodiments, the color preparation and management system and method may conduct predictive analysis. For example, an inventory threshold disclosed above may not be met by a particular ingredient; however, the color preparation and management system and method may nonetheless suggest that additional amounts of that ingredient be purchased. This may occur when predictive analysis shows that the rate of inventory decline requires purchasing the ingredient before the threshold set by the authorized user is met. For example, the color preparation and management system and method may determine that the ingredient will run out in 2 days once the threshold is met but that it takes 3 days for the ingredients to arrive to the salon once purchased. Therefore, the color preparation and management system and method may recognize that without purchasing the ingredient before the threshold is met, the salon may be without the ingredient for at least a day. In some embodiments, the color preparation and management system and method may suggest or automatically change the threshold amount according to the predictive analysis so that orders may be placed in time to receive the shipped ingredients before the ingredients run out.

Predictive analysis may also illustrate projected costs related to inventory loss (e.g., waste) which may be attributable to each user. Thus, the authorized user is able to quickly ascertain which users are creating waste, the amount of waste, and the cost related to the amount of waste. User data may include information such as average time spent in each GUI module, the number of times the user has had to re-batch, the amount dispensed during any re-batch, and the like.

Referring back to the screenshot of the "Client Selection" GUI at a client selection screen 2400 shown in FIG. 24A, the virtual "Edit" key 2402 may be toggled ON or OFF. In the screenshot shown, the "Edit" key 2402 is toggled ON, and therefore, the color preparation and management system and method is in edit mode. As a result, edit icons 2416 may be displayed next to the clients that are editable. Additionally or alternatively, clients that may not be edited may be dimmed or grayed-out to visually inform the logged-in user that information corresponding to those clients is not editable. When in edit mode, the GUI presented on display 2300 may proceed to a client information screen when the user selects an editable client from the list, such as the client information screen depicted in FIG. 26A. In order to select a client from the list without editing the client's information, the logged-in user may be required to toggle OFF the edit mode if it is ON. In some embodiments, edit mode is toggled OFF by default.

With edit mode toggled OFF, the user may select a client from the list of client provided on the client selection screen 2400. Upon selecting a client, the GUI presented on display 2300 may proceed to a client history screen specific to the selected client, such as the client history screen depicted in FIG. 25A.

Figure 24B:
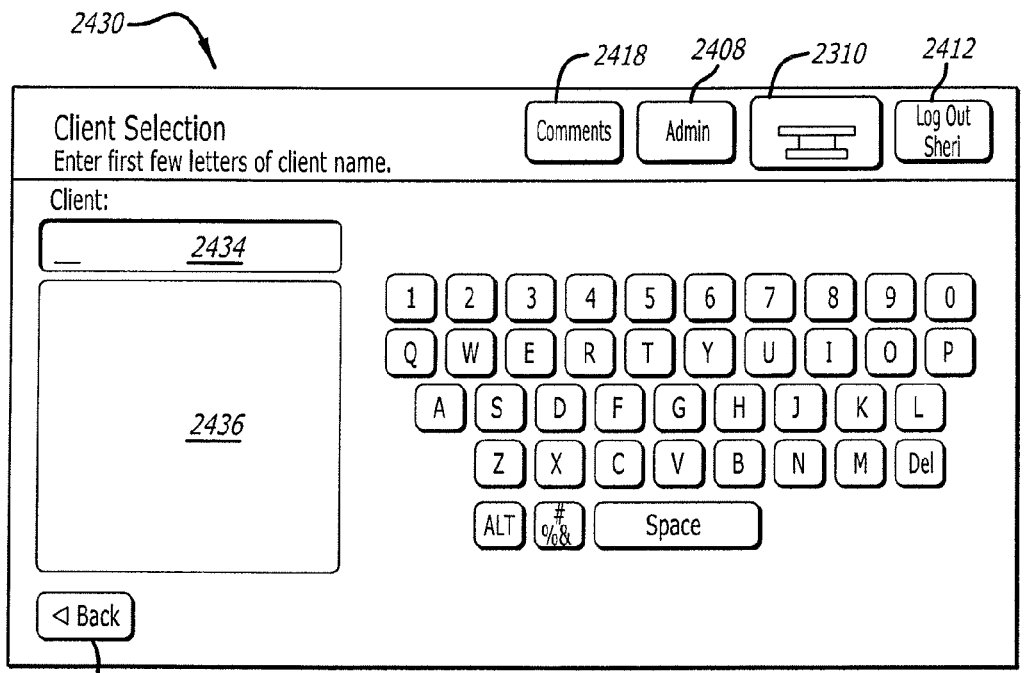
Figure 24C:
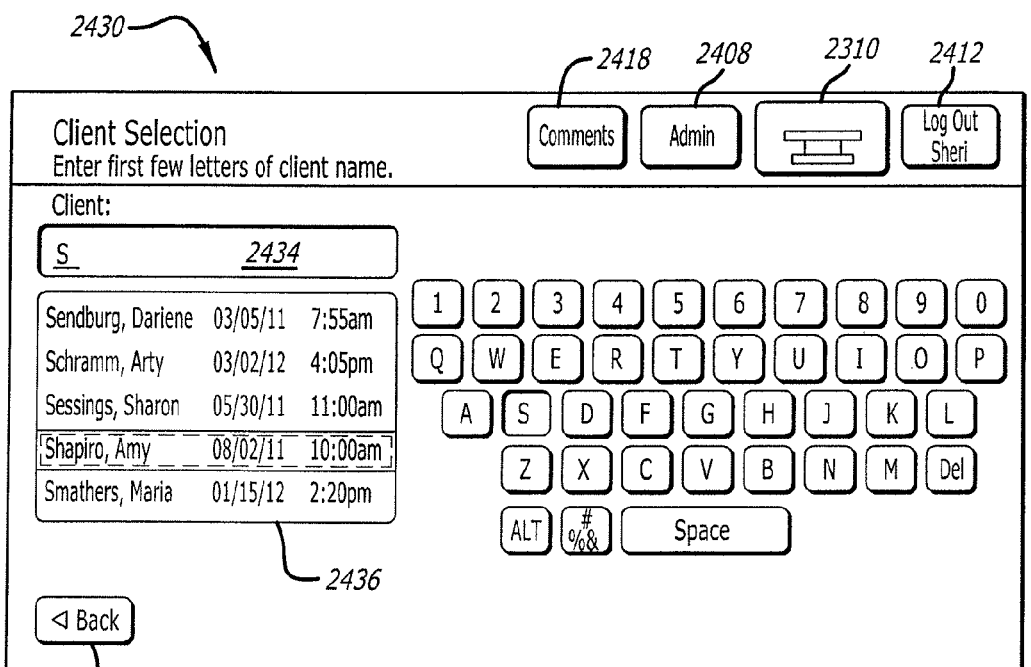

When the user selects search field 2404 in FIG. 24A, the GUI presented on display 2300 may proceed from the client selection screen 2400 to a client search screen regardless of whether edit mode is toggled ON or OFF, such as the client selection search screen 2430 depicted in FIG. 24B. A virtual keyboard 2432 may be provided to the user to enable the user to input information in search query field 2434. A navigational "Back" virtual key 2438 may be provided to the user so that the user may navigate to the previous screen upon activating it. Upon entering information in the search query field 2434, the color preparation and management system and method may automatically start providing search results in the search results box 2436. Such an embodiment is shown in FIG. 24C. As shown in FIG. 24C, the user has input an "S" into the search query field 2434. Without hitting "enter" or another input, the color preparation and management system and method automatically displays clients having a last name starting with the letter "S" in alphabetical order. When the user selects a name in the search results box 2436, the color preparation and management system and method may determine whether edit mode was on or off when the user accessed client selection screen 2400.

Figure 25A:
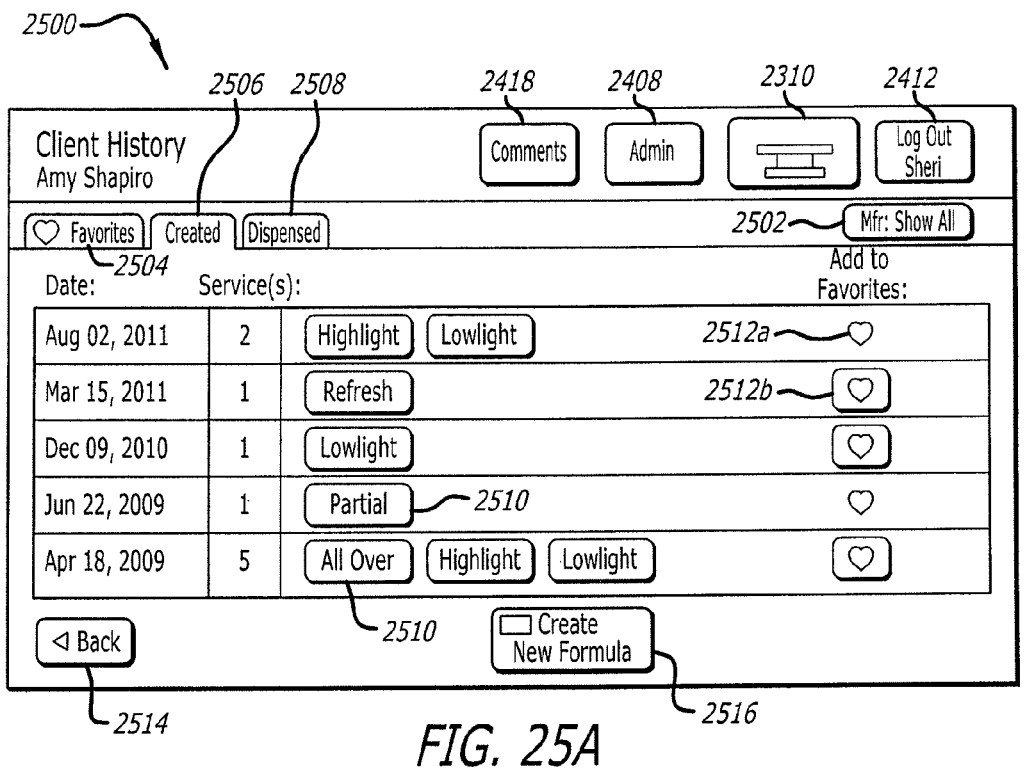
FIGS. 25A-E show various screenshots of screens associated with a "Client Information" GUI module according to the embodiment.
Figure 26A:
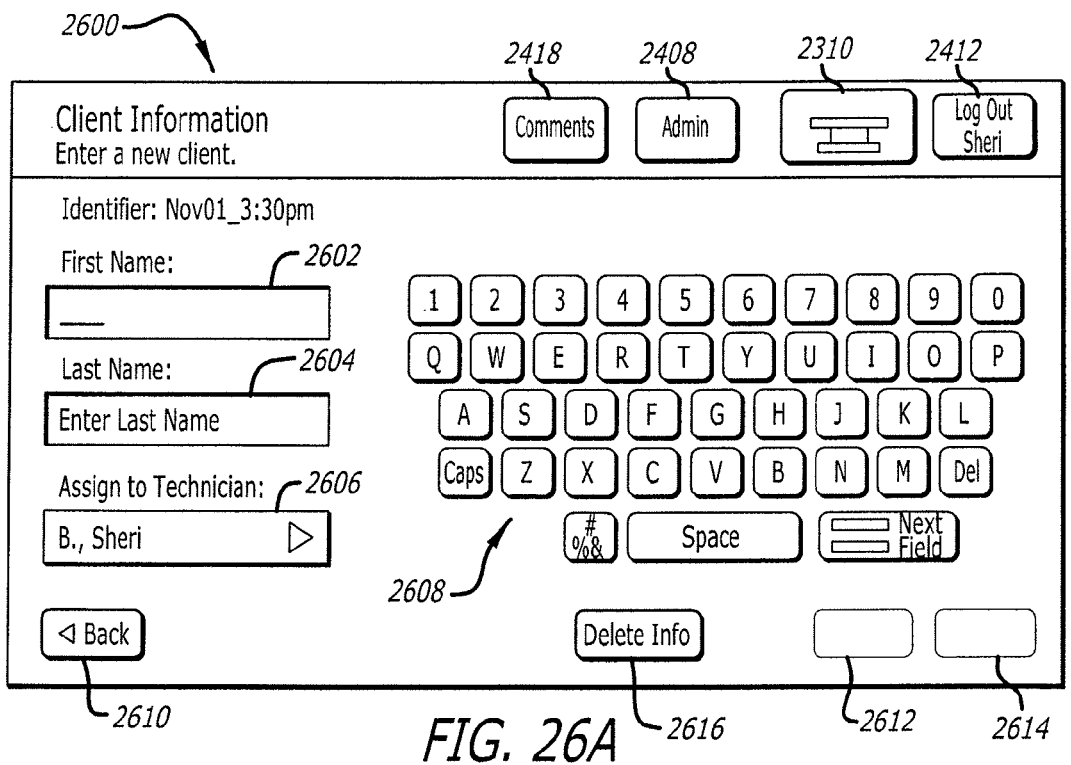
FIGS. 26A-D show various screenshots of screens associated with a "Client Information" GUI module according to one embodiment.

If the color preparation and management system and method determines that edit mode was toggled ON when the user accessed client selection search screen 2430, the color preparation and management system and method may proceed to display the "Client Information" GUI module, such as the client information screen 2600 shown in FIG. 26A according to one embodiment. If the color preparation and management system and method determines that edit mode was toggled OFF when the user accessed client selection screen 2400, the GUI presented on display 2300 may proceed to the "Client History" GUI module, such as the client history screen shown in FIG. 25A that displays client history specific to the selected client. In some embodiments, before the GUI presented on display 2300 proceeds to the next screen, the GUI may query whether the user selected the intended name. If not, the color preparation and management system and method may continue to display the client selection search screen 2430 with the search results to enable the user to make a different selection. In yet other embodiments, the user may be required to activate an additional input such as "Go" or "Enter" for the GUI to present the client information screen or the client history screen specific to the selected client. Such an embodiment may be considered more intuitive for some users.

While FIGS. 24B and 24C illustrate that the user may search for a client based on the client's last name, other embodiments may provide more than one search query field or at least one or more customizable search query fields. In such embodiments, the user may conduct a search based on information input into a plurality of search query fields. Search query fields may include last name, first name, age, length of hair, hair color, type of service, date of last service, period of time (e.g., search for clients that the logged-in user or a logged-out user serviced between a first date and a second date), any other client-related information, and the like. In other embodiments, the user may select a search query field and be presented with a drop-down menu that lists the type of information that the user would like the search query field to search thereby customizing the search query field. For example, the user may select a first search query field and select "First Name" and select a second search query field and select "Hair Color."

In yet other embodiments, the color preparation and management system and method may assign a unique identifier to each client in the database in memory. The unique identifier may be based on the date the client was entered into the database. The client may inform the user of the unique identifier, which the user may use to search for and acquire the requisite information on the database by using the color preparation and management system and method disclosed herein. In further embodiments, the user may be issued an RFID device at their first visit, such as a key fob that may be attached to a key chain. Upon entering a salon or other business, the client may introduce the RFID device to an RFID reader to sign-in. In other embodiments, the client may have been issued a barcode (e.g., UPC barcode or a matrix barcode). The barcode may be emailed to a user or otherwise electronically transmitted to a user's electronic device (e.g., picture message). Upon entering the salon, the user may scan their barcode to sign-in. The color preparation and management system and method, which is in direct or indirect communication with the RFID or barcode reader, receives data indicating the user has signed-in. The color preparation and management system and method may use the data to expedite the client selection process. For example, on the client selection screen 2400 may include a virtual "Signed-In Clients" tab that the user may select to view clients who have electronically signed in.

In other embodiments, the color preparation and management system and method automatically selects the client based on the scheduled appointment time for the client. For example, a first and a second client may enter the salon at the same time a few minutes before 10:00 am, both having scheduled appointments with the same hair stylist. The first client may have an appointment scheduled for 10:00 am whereas the second client may have an appointment scheduled for 11:00 am. The hair stylist may log-in to the color preparation and management system and method to select the client; however, the system may automatically select the first client due to the scheduled appointment time. For example, had both clients signed-in at 10:40 am, the color preparation and management system and method may automatically select the second client due to the scheduled appointment time. In both instances, the color preparation and management system and method may flag or warn the user of the excess wait for the second client in the first scenario or the tardiness of the first client in the second scenario. In some embodiments, the color preparation and management system and method may suggest a schedule change. For example, the color preparation and management system and method may analyze appointment data for all stylists in the salon to determine whether the second client in the first scenario may be serviced earlier by a different hair stylist. The color preparation and management system and method may list alternative options for the user to relay to the client. Likewise, the color preparation and management system and method may determine whether the first client in the second scenario may be serviced by a different hair stylist.

Referring back to FIG. 24A, the GUI presented on display 2300 may proceed to a "Client Information" GUI module (e.g., client information screen 2600 shown in FIG. 26A) when the user activates the "Add New Client" virtual key 2414 on the client selection screen 2400. Since the user is instructing the color preparation and management system and method that he or she seeks to add a new client, the system may disregard whether edit mode is toggled ON or OFF.

FIG. 26A depicts a screenshot of a client information screen 2600 associated with the "Client Information" GUI module. The client information screen 2600 enables the user to add a new client or edit information corresponding to an existing client. As shown, the client information screen 2600 may include a First Name field 2602, a Last Name field 2604, an "Assign to" field 2606, and a virtual keyboard 2608. Depending on the embodiment, the "Assign to" field 2606 may read "Assign to Technician," "Assign to Colorist," "Assign to Stylist," "Assign to User," or the like. A navigational "Back" virtual key 2610 may be provided to the user so that the user may navigate to the previous screen upon activating it. The user may navigate between different fields by touching the screen of display 2300 where the field is located or select the "Next Field" virtual key in the virtual keyboard 2608. A "+More Clients" virtual key 2612 enables the user to add more than one client. A "Done" virtual key 2614 may be provided to the user so that the user may indicate to the color preparation and management system and method when the user is done adding one or more clients to the database (i.e., memory) or editing one or more existing clients in the database. Of course, other embodiments may include more fields such as "Other Family Members," "Age," "Natural Hair Color," "Preferred Hair Length," "Services Interested In," and the like. A "Delete Info" virtual key 2616 may enable the user to delete all information in all fields with a single input when the user is inputting information for a new client. For an existing client, the "Delete Info" virtual key 2616 may be used to delete the client from the database (i.e., memory). The GUI presented on display 2300 may present a pop-up window or a new screen asking the user to confirm his or her intent to remove the client from the database. If the user confirms deletion of a client, the GUI presented on display 2300 may proceed to the client selection screen 2400.

If the client information screen 2600 was accessed by the user by selecting the "Add New Client" virtual key 2414 on the client selection screen 2400, the client information screen 2600 may automatically fill in the "Assign to" field 2606 with the name of the currently logged-in user. In some embodiments, the "Assign to" field 2606 may only be changed by an administrator (e.g. supervisor). Thus, the logged-in user may be the default technician, colorist, stylist, or the like; which can only be changed by upper management in some embodiments. Generally, the logged-in user inputs the client's first and last name in the corresponding fields 2602 and 2604 and selects the "Done" virtual key 2614 to add the new client to the database. Since the new client is in the database, the new client will now appear on the client selection screen depicted in FIG. 24A and any information corresponding to the client is searchable.

If the new client is already in the database that the user seeks to add, the GUI presented on display 2300 may present a pop-up window or a new screen informing the user that the client is already in the database. In such an embodiment, the user may be able to add a numeric identifier to the client, if indeed the client is new (i.e., the existing client in the database may have the same name but is a different person). For example, in the event that adding "Melissa Templeton" results in such a warning, the user or color preparation and management system and method may add a numeric identifier. In some embodiments, a picture of the client may be loaded into the database such that a numeric identifier may be unnecessary for identification purposes.

Figure 26B:
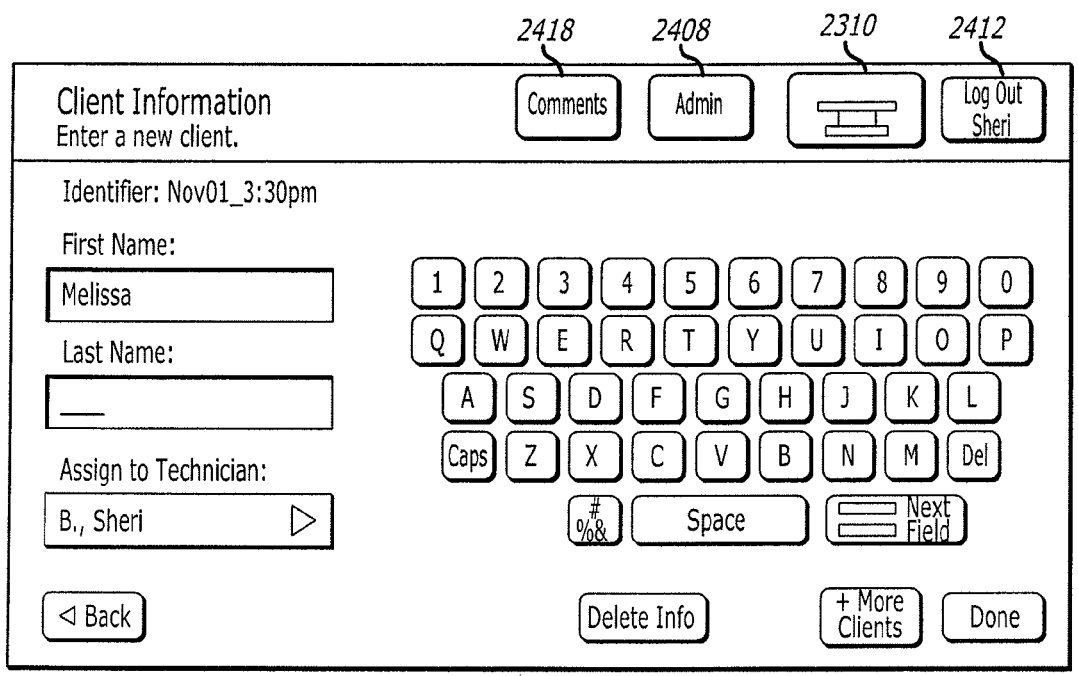
Figure 26C:
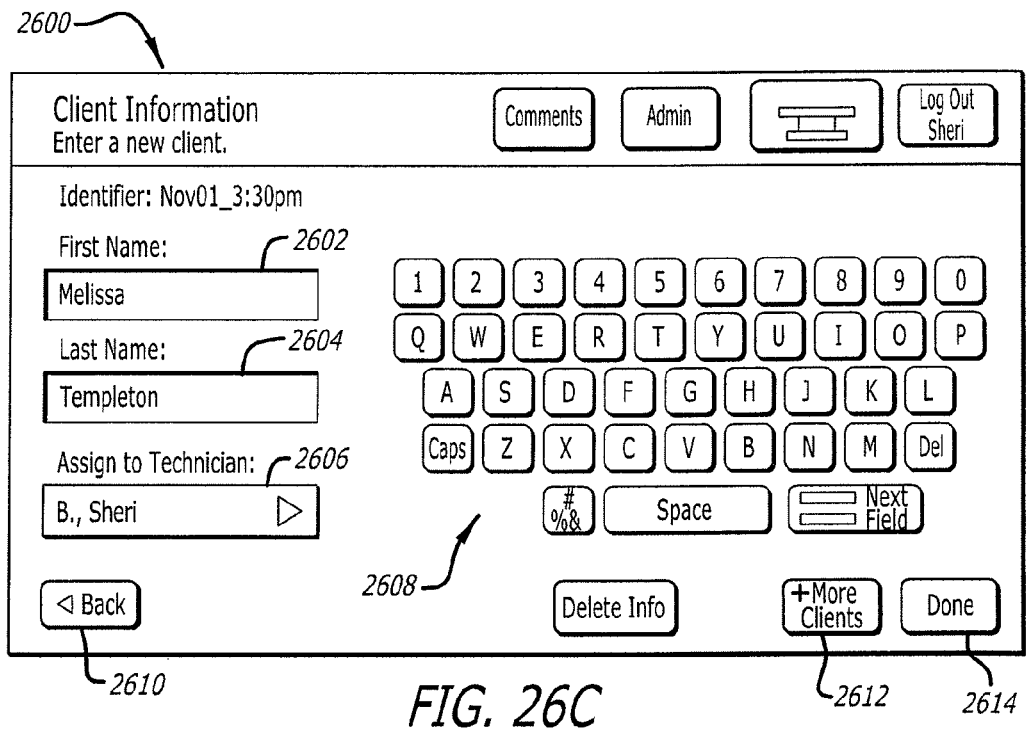
Figure 26D:
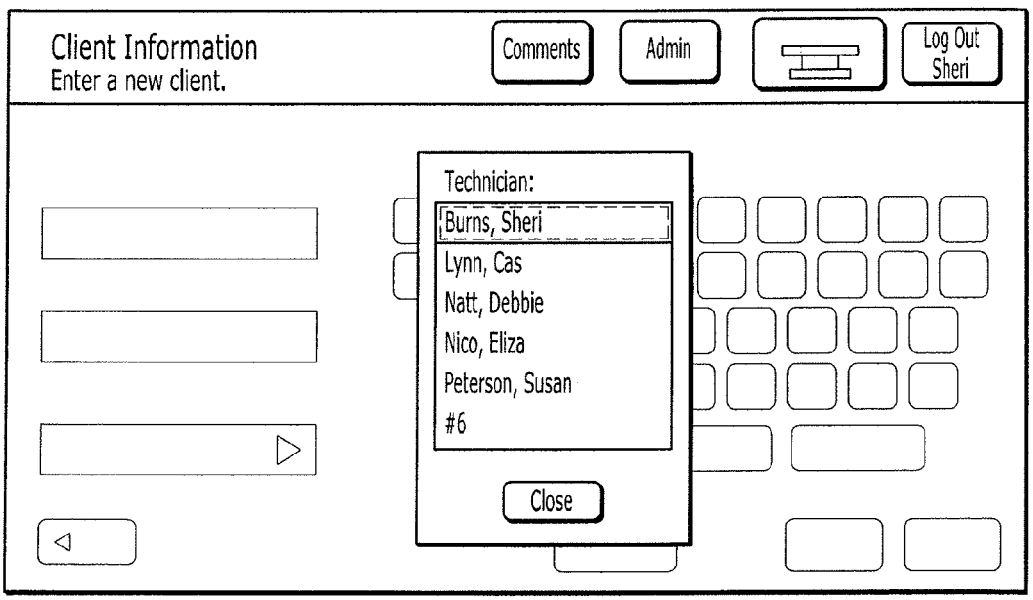

FIG. 26B shows one embodiment of the client information screen 2600 after the user has input the first name "Melissa." FIG. 26C shows one embodiment of the client information screen 2600 after the user has input the last name "Templeton." FIG. 26D shows one embodiment of a list of individuals that the user may select from when assigning a technician, colorist, stylist, or the like to a new client.

Instead of selecting the "Done" virtual key 2614, the user may select the "+More Clients" virtual key 2612 to (1) add the new client to the database and (2) clear the first and last name fields so the user can input another new client. When done adding more than one client, the user simply activates the "Done" virtual key 2614 after the last new client entered.

If the client information screen 2600 was accessed by the user by selecting a name when edit mode was toggled ON at the client selection screen 2400 or the client selection search screen 2430, the displayed fields may automatically be populated with the information stored in the database. Thus, the user is able to edit existing information. In some embodiments, the "Delete Info" key 2616 is only available for selection by the user if the client information screen 2600 is accessed when edit mode was toggled ON.

FIG. 25A depicts a screenshot of a client history screen 2500 associated with the "Client History" GUI module according to one embodiment. As shown, the client history of the client "Amy Shapiro" is displayed. The client history screen 2500 may include the virtual "Comments" key 2418, the virtual "Administrator" key 2408, the virtual "Scale" key 2310, the virtual "Log-Out" key 2412, a virtual "Manufacturer: Show All" key 2502, a virtual "Favorites" tab 2504, a virtual "Created" tab 2506, a virtual "Dispensed" tab 2508, various virtual service name keys 2510, "Favorite" icons 2512a, and "Non-Favorite" icons 2512b, a navigational "Back" virtual key 2514 that operates similarly to other navigational "Back" virtual keys described herein, and a virtual "Create New Formula" key 2516.

As shown, the client history screen 2500 has the "Created" tab 2506 selected by default. Other embodiments may have a different tab selected as the default tab upon the user reaching the client history screen 2500. The "Created" tab 2506 may generally include a client's service history such as the dates on which the client came to the salon for one or more services, the number of services (e.g. formulas) created by the user on each service date, the products purchased by the client on each service date, the length of the service(s), whether or not the service was especially liked by the client (e.g., favorite), and the like. The "Dispensed" tab 2508 may generally include a client's service history such as the dates on which the client came to the salon for one or more services, the number of services (e.g., formulas) dispensed by the user on each service date, the products purchased by the client on each service date, the length of the service(s), whether or not the service was especially liked by the client or the user (e.g., favorite), and the like.

In some embodiments, the "Favorite" and "Non-Favorite" selection may be specific to the service date and/or each service rendered. In the embodiment shown, the user may select a "Non-Favorite" icon 2512b for a particular service date to "Favorite" that service date. Upon selection, the "Non-Favorite" icon 2512b may change to "Favorite" icon 2512a. The user may select a "Favorite" to unfavorite the selection. Upon selection, the "Favorite" icon 2512a may change "Non-Favorite" icon 2512b. The user may similarly notate favorite services displayed on the "Dispensed" tab 2508.

If the user has "Favorited" any services or service dates on either the "Created" tab 2506 or the "Dispensed" tab 2508, the user may select the "Favorites" tab 2504. Upon selection, the GUI presented on display 2300 may proceed to a "Favorites" screen 2560, such as the one shown in FIG. 25D. As shown, only the service dates that were "Favorited" on the client history screen 2500 in FIG. 25A appear on the "Favorites" screen 2560. In embodiments that enable the user to select specific services as "favorite," services that were not selected as "favorite" by the user would not be displayed. The user may upload pictures of the services that were selected as favorite, which may be reviewed in the future to help select a service. In yet other embodiments, if the user select specific service date as "favorite," the color preparation and management system and method may recognize such a selection as "favoriting" each service (e.g., formula) created or dispensed for that service date. In the embodiment shown, the "Favorites" screen may employ different icons 2562a and 2562b so the user can quickly ascertain whether the favorited service date and/or services were favorited under the "Created" tab 2506 and/or the "Dispensed" tab 2508.

Figure 25B:
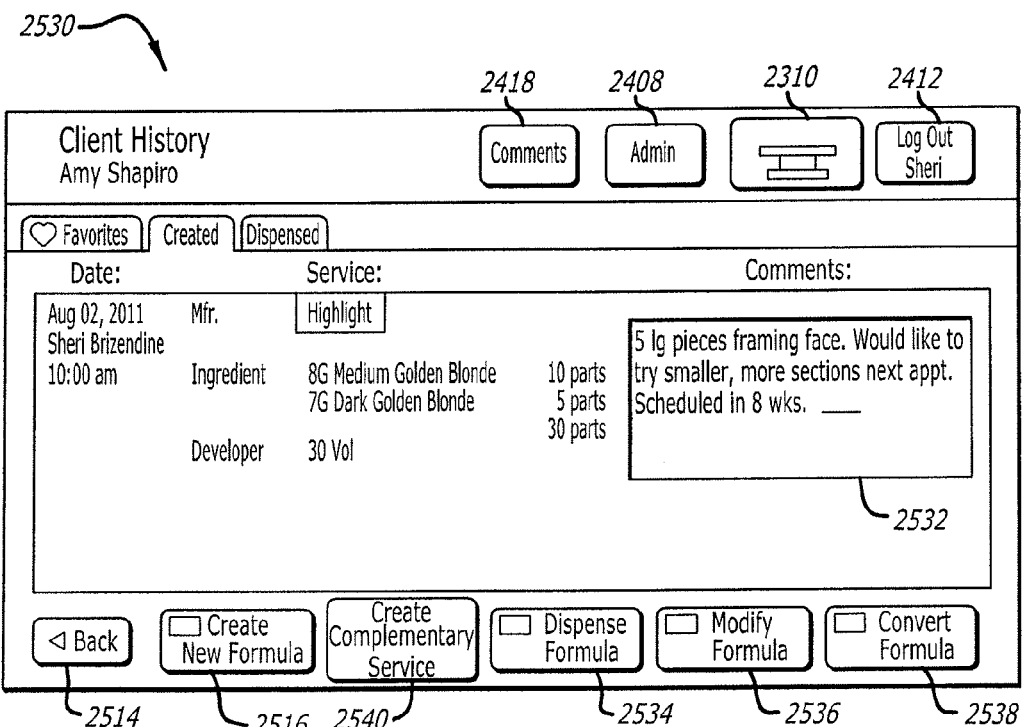
Figure 25C:
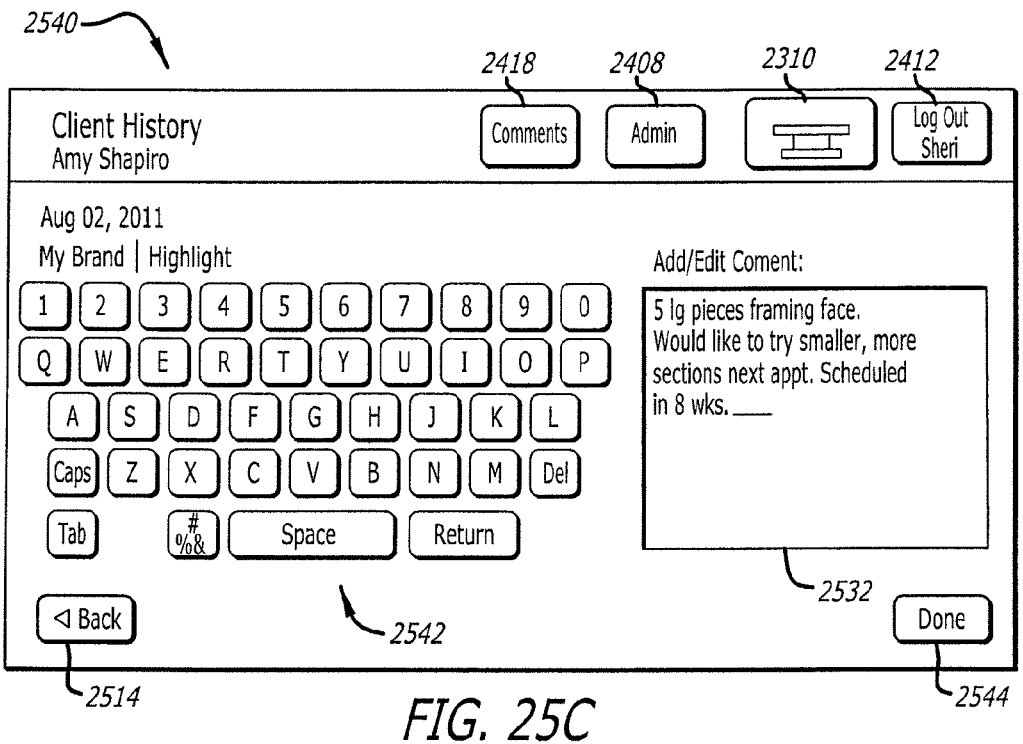
Figure 25D:
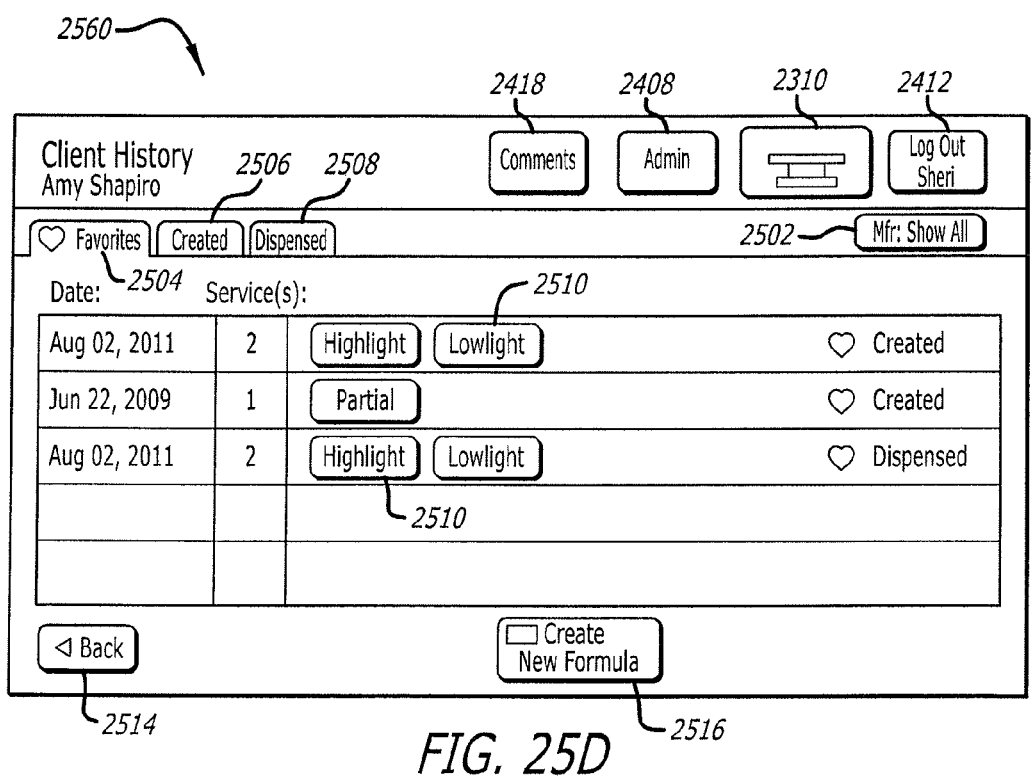

Referring to FIGS. 25A and 25D, the virtual "Manufacturer: Show All" key 2502 may be set by default, as shown, to "Show All." In such an embodiment, the color preparation and management system and method does not filter out any services listed on the client history screen 2500 or the "Favorites" screen 2560 based on the manufacturer of any formula ingredients. Upon selecting the "Manufacturer: Show All" key 2502, the color preparation and management system and method may process the input to then display a pop-up window in the GUI presented on display 2300. The pop-up window enables the user to select one or more manufacturers (e.g., JOHN FRIEDA®, JOICO®, and REDKEN®) from a list. The user may close the pop-up window by selecting a "Close" or "Done" virtual key. The color preparation and management system and method then removes the pop-up window and only displays the services listed containing ingredients from the selected manufacturer(s). For example, the "Favorites" screen 2560 may only display "Favorited" services that also contain one or more ingredients from the selected manufacturer(s).

When the user selects two or more manufacturers, the color preparation and management system and method may view the selected manufacturers as conjunctive or disjunctive operands. For example, the user may select JOICO® and REDKEN® from a list of manufacturers. If the user's selections are conjunctive, both JOICO® and REDKEN® would have to be an ingredient manufacturer for an ingredient used in a formula for the service to be displayed on the client history screen 2500 or the "Favorites" screen 2560. If the user's selections are disjunctive, only JOICO® or REDKEN® would have to be an ingredient manufacturer for an ingredient used in a formula for the service to be displayed on the client history screen 2500 or the "Favorites" screen 2560. The pop-up window may enable the user to choose between an "AND" and "OR" operators.

Upon selecting a service by touching one of the service name keys 2510 on the client history screen 2500 or the "Favorites" screen 2560, the GUI presented on display 2300 may proceed to a selected formula screen 2530, such as the one shown in FIG. 25B. The screenshot shown in FIG. 25B depicts that the highlight service name key 2510 corresponding to the Aug. 2, 2011 service date was selected.

The selected formula screen 2530 may include the following virtual keys that may or may not be displayed on the client history screen 2500: a "Dispense Formula" key 2534, a "Modify Formula" key 2536, and a "Convert Formula" key 2538. Information on the selected formula screen (or selected service screen) 2530 may include the client's name, the service name, the manufacturer(s) of the products used in the created formula (e.g., the selected highlight formula), a custom name for the formula (e.g., "Lady Gaga Blonde"), a list of ingredients such as the oxidizing agent(s), the volume of the oxidizing agent(s), the bleaching agent(s), the colorant(s), and any other information related to the selected service.

The comments window 2532 may, by default, be visible to the user upon accessing the selected formula screen 2530.

The user may "hide" the comments window 2532 by selecting the virtual "Comments" key 2418. In other embodiments, the comments window 2532 may not be displayed to the user by default. In such embodiments, the user may select the virtual "Comments" key 2418 to display the comments window 2532. The selected formula screen may be resized, reorganized, or the like when the comments window 2532 is displayed and not displayed. The user may touch anywhere in the comments window 2532 to add, remove, or edit comments. In other embodiments, the color preparation and management system and method may recognize one or more of the following inputs to enable the user to add, remove, or edit comments: the user may press and hold virtual "Comments" key 2418 for a period of time, the user may double-tap the virtual "Comments" key 2418, and the like.

Upon the user providing an input to the color preparation and management system and method, the system may proceed to display an edit comments screen 2540, such as the one shown in FIG. 25C. The edit comments screen 2540 includes a plurality of virtual keys 2542 that make up a virtual keyboard. The user may employ the virtual keys 2542, a physical keyboard, or other input device to add, remove, or edit comments in the comments window 2532. The user may control where, in the comments window 2532, the text is to be input by controlling a cursor by touching the screen of display 2300, manipulating a mouse, using arrow keys on a physical keyboard, or the like. A text insertion point may be a flashing vertical bar, a flashing horizontal bar, or the like. In some embodiments, the selected formula screen 2530 may display a pop-up window enabling the user to add, remove, or edit comments with a plurality of virtual keys, a physical keyboard, or the like. Upon selecting the virtual "Done" key 2544, the GUI presented on display 2300 may save any changes made by the user and go back to the selected formula screen (or selected service screen) 2530. Upon selecting the virtual "Back" key 2514, any changes made by the user may be disregarded (i.e., not saved), and the color preparation and management system and method may go back to displaying the selected formula screen (or selected service screen) 2530.

Referring now to FIGS. 25A, 25B, and 25D, the user may select the virtual "Create New Formula" key 2516. Upon selecting the virtual "Create New Formula" key 2516, the color preparation and management system and method may display a "Create New Formula" screen 2800 such as the one shown in FIG. 28A via the "Create New Formula" GUI on display 2300.

Referring to FIG. 25B, the user may select the virtual "Dispense Formula" key 2534, the virtual "Modify Formula" key 2536, or the virtual "Convert Formula" key 2538. Upon selecting the virtual "Dispense Formula" key 2534, the color preparation and management system and method may display a "Dispense Formula" screen 3000 such as the one shown in FIG. 30A via the GUI on display 2300. Navigating directly to the "Dispense Formula" screen 3000 from the selected formula screen 2530 enables the user to bypass the batch sizing GUI software module. In some embodiments, bypassing the batch sizing GUI occurs because the user accessed it when the formula was created and the user's selection at that time was saved in the database. In some embodiments, selecting the virtual "Dispense Formula" key 2534 may cause the color preparation and management system and method to display the batching sizing GUI (e.g., FIGS. 27A-B) instead of the dispense formula GUI (e.g., FIGS. 30A-30J).

Figure 25E:
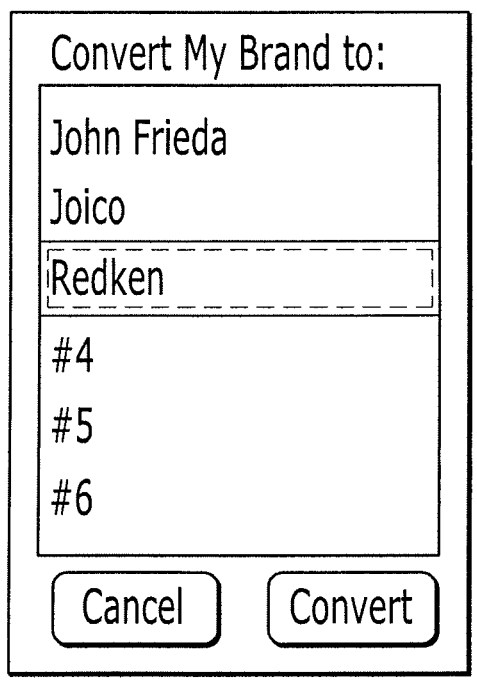

Upon selecting the virtual "Modify Formula" key 2536, the color preparation and management system and method may display a "Modify Formula" screen 2880 such as the one shown in FIG. 28J via the GUI on display 2300. Upon selecting the virtual "Convert Formula" key 2538, the color preparation and management system and method may display a pop-up as shown in FIG. 25E. In other embodiments, selection of the "Convert Formula" key 2538 may result in the GUI presented on display 2300 proceeding to a "Conversion" screen.

Referring to FIG. 25E, a conversion pop-up 2570 is shown that enables a user to select a desired conversion (e.g., convert a first color system to a second color system). In some embodiments, the first color system may be specific to a first manufacturer (e.g., JOHN FRIEDA®) and the second color system may be specific to a second manufacturer (e.g., REDKEN®). Thus, the color preparation and management system and method enables the user to convert color systems of one or more manufacturers into different color systems used by different manufacturers. In addition, the color preparation and management system and method also removes the need for the user to manually convert formulas from one color system to another.

In some embodiments, the color preparation and management system and method may enable the user to convert between color systems specific to the same manufacturer. For example, the same manufacturer may sell a first brand that uses a first color system and also sell a second brand that uses a second color system. Upon selecting the desired conversion, "Converting" text accompanied by an animation may be presented to the user via the GUI on display 2300. Once the color preparation and management system and method is done processing the selected conversion, the GUI presented on display 2300 may go back to the client history screen 2500 with the new converted formula added to the list previously presented to the user. In some embodiments, the new converted formula may be highlighted in a different color enabling quick user-selection.

In other embodiments, once the color preparation and management system and method is done processing the selected conversion, the GUI presented on display 2300 may go back to the selected formula screen 2530 with the details of the new converted formula being displayed. The details of the new converted formula may include information indicating to the user that the formula is a conversion. For example, a conversion banner may extend across the top of the GUI on display 2300 with text such as "Important! This formula was converted from Formula ID #14788." The user may select (e.g., touch) Formula ID #14788 to navigate to the formula that the newly converted formula was converted from. Alternatively or additionally, the details screen for the converted formula may include a table with a "Converted From Formula ID #14788" column that may list, among other things, the brand and/or manufacturer, ingredients, and amounts of each listed ingredient. The table also includes a "Converted To This Formula" column that may list, among other things, the brand and/or manufacturer, ingredients, and amounts of each listed ingredient. This example enables a user to readily compare the differences between the two formulas.

In other embodiments, the color preparation and management system and method may enable the user to resolve an inventory problem via the software conversion module disclosed herein. The user may specify that one or more ingredients are unavailable (e.g., out-of-stock) that are needed for a particular formula. The user may inform the color preparation and management system and method via one or more inputs on the GUI that the user desires a (1) replacement service or formula that may use the same color system as the formula calling for the out-of-stock ingredient, (2) replacement service or formula that may use a different color system as the formula calling for the out-of-stock ingredient, (3)

replacement ingredient for the out-of-stock ingredient. For example, the conversion process run by the color preparation and management system and method may instruct the user to use a different colorant if a colorant was unavailable. If a lighter colorant was out of stock, the color preparation and management system and method may recommend an in-stock darker colorant (but possibly recommend a lessor amount of the colorant). In some embodiments, the color preparation and management system and method may instruct the user to use the same developer but keep the color mix in the hair for a longer period of time than the original formula required to offset the fact that a darker colorant was used. The color preparation and management system and method may also instruct the user to change, for example, the developer (e.g., 30 volume to 40 volume) to help reduce any differences caused by the replacement colorant.

The color preparation and management system and method may access the conversion instructions (e.g., Brand 1 to Brand 2, Brand 2 to Brand 1, Manufacturer 1 to Manufacturer 2, color system 1 to color system 2, and the like) from a memory local to the system or from a server. For example, the user may select to convert a selected REDKEN® formula to an equivalent JOHN FRIEDA® formula. The color preparation and management system and method may access the server over the internet after checking whether the conversion has already been downloaded to a memory local to the system from a server.

In other embodiments of the color preparation and management system and method, the conversion may be specified by the user. For example, a highlight mixture for a first color system (e.g., brand or manufacturer) may include three ingredients: colorant A, colorant B, and developer C. According to the first color system, the highlight mixture may call for 10 parts of colorant A (e.g., 8G Medium Golden Blonde), 5 parts of colorant B (e.g., 7G Dark Golden Blonde), and 30 parts of developer C (e.g., 30 volume developer). A second color system (e.g., brand or manufacturer) may include colorants X and Y, and developer Z. Upon the user selecting to convert the highlight mixture under the first color system, the color preparation and management system and method may automatically display the equivalent highlight mixture under the second color system using ingredients X, Y, and Z. For example, the color preparation and management system and method may determine that the conversion from color system 1 to 2 results in 9 parts of colorant X, 6 parts of colorant Y, and 27 parts of developer Z. However, through experience, the user may prefer a different conversion. For example, instead of a 10% reduction in the amount for developer Z, the user may find a 10% increase works better. Therefore, in some embodiments, the user may modify the newly converted formula using the methods described herein (e.g., navigating to the "Modify Formula" screen 2880 using the GUI, such as the one shown in FIG. 28J). In other embodiments, the user may temporarily (e.g., stylist, supervisor, or administrator) or permanently (e.g., supervisor or administrator but not a stylist) modify a mathematical conversion. By modifying the mathematical conversion from 90% to 110% for developer C to developer Z using the GUI, the color preparation and management system and method would create a newly converted formula from color system 1 to 2 results in 9 parts of colorant X, 6 parts of colorant Y, and 33 parts of developer Z. By changing the mathematical conversion, the user is able to bypass having to navigate to the "Modify Formula" screen 2880 after the new conversion formula is created. In yet other embodiments, only a supervisor or with administrator access may change the mathematical conversion.

While generally described herein as converting formulas, the conversion software module that the color preparation and management system and method executes using one or more processors may also be used to convert services. In some embodiments, on the selected formula (selected service) screen 2530, the user may select a virtual "Create Complementary Service" key 2540. Upon selecting the virtual "Create Complementary Service" key 2540, the color preparation and management system and method may display a pop-up window. In other embodiments, selection of the "Create Complementary Service" key 2540 may result in the GUI presented on display 2300 proceeding to the "Conversion" screen previously identified. Using the GUI (whether a pop-up or new screen), the user may select a service for which the user wishes to create one or more complementary services. In other embodiments, the color preparation and management system and method may automatically create all complementary services available to the selected service. Thus, the color preparation and management system and method described herein enables users (e.g., novice stylists) to quickly learn complementary services.

For example, the user may select a "Highlights" service for a client that may have been previously created, dispensed, or favorited by the user. The user may then select from a list containing one or more available complementary services. A "Lowlights" service and/or a "Base Color" service may be included in the complementary list of services for a "Highlights" service. The conversion software module may use information related to the "Highlights" service to create a complementary "Lowlights" service and "Base Color" service. In some embodiments, the conversion software module creates the complementary "Lowlights" and "Base Color" services based on the ingredients required for the "Highlights" service. For example, a very Blonde "Highlights" service may result in the color preparation and management system and method creating a complementary less blonde "Lowlights" service, as opposed to a deep brown "Lowlights" service.

The user may be able to select whether the color preparation and management system and method is or is not confined to the color system (e.g., brand, manufacturer, and the like) that the selected "Highlights" service uses. The user may similarly select whether the color preparation and management system and method is or is not confined to a particular color system (e.g., brand, manufacturer, and the like) for a formula conversion.

Upon selecting the desired complementary service(s) or simply selecting the virtual "Create Complementary Services" key 2540, "Creating Complementary Service(s)" text accompanied by an animation may be presented to the user via the GUI on display 2300. Once the color preparation and management system and method is done creating the one or more complementary services, the GUI presented on display 2300 may go back to the client history screen 2500 with the newly created complementary services/formulas added to the list previously presented to the user. In some embodiments, the newly created complementary services/formulas may be highlighted in a different color enabling quick user-selection.

In other embodiments, once the color preparation and management system and method is done processing the creation of the one or more complementary services, the GUI presented on display 2300 may go back to the selected service screen (or selected formula screen) 2530 with the details of the one or more newly created complementary services/formulas being displayed (e.g., in table form).

Figure 28A:
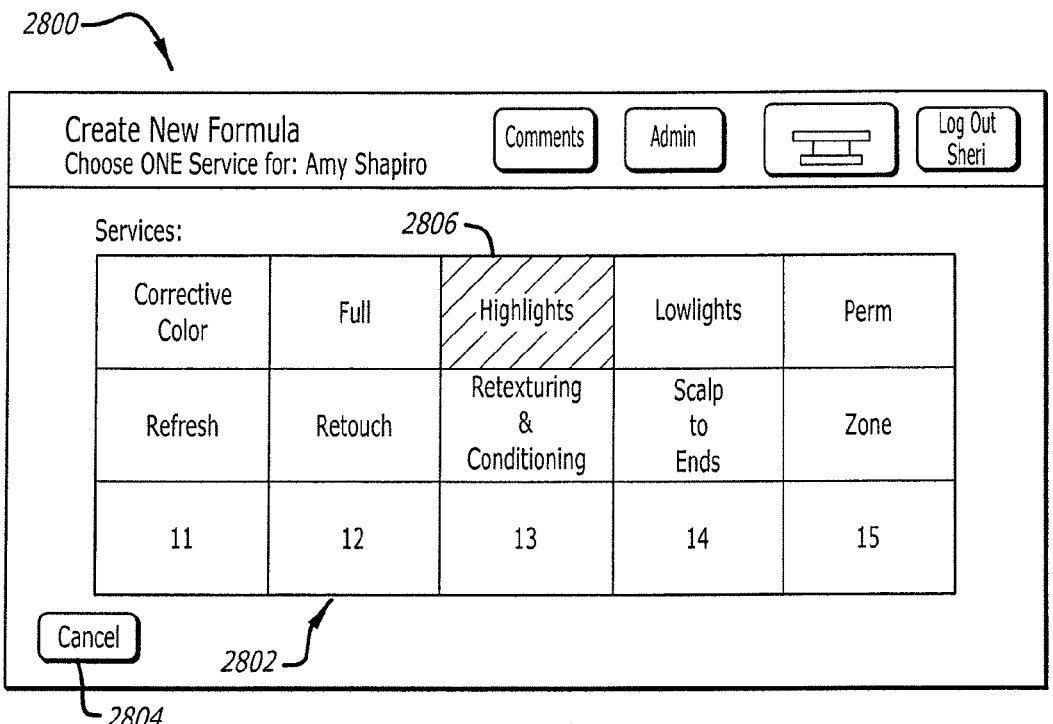

Referring now to FIG. 28A, one embodiment of the "Create New Formula" screen 2800 that is part of the "Create New Formula" or "Color Book" GUI (e.g. FIGS. 28A-28I) is shown. In some embodiments, the user may navigate to the "Create New Formula" screen 2800 by selecting "the virtual "Create New Formula" key 2516 presented on the GUI such as on the client history screen 2500, the selected formula screen (or selected service screen) 2530, and the "Favorites" screen 2560. The user may also access the "Create New Formula" screen 2800 by selecting the "Create New Formula" key 2536 on screens other than screens 2500, 2530, and 2560. For example, the "Create New Formula" key 2516 may be on other screens or the color preparation and management system and method may recognize a gesture that the user may input on display 2300 to navigate to the "Create New Formula" screen 2800. The user may input this gesture on any screen after logging in to the system. For example, the user may wish to first create a new formula, and then add the new client to the database for which the newly created formula is to be associated. In addition, the color preparation and management system and method may automatically send the user to the "Create New Formula" screen 2800 without user input (e.g., after a time period elapses without user input on the client history screen 2500 when there are no created or dispensed formulas stored in the database for an existing or new client).

Just like other GUI screens disclosed herein, the "Create New Formula" screen 2800 may include standard virtual navigation keys (e.g., "Back," "Cancel," "Done," "Log-out," "Scale," "Table of Contents," "Map," "Screen Map," "Exit," "Next," "Go," or the like) and other common virtual keys (e.g., "Comments," "Admin" or the like). "Back" may take the user back to the previous screen. "Back" may take the user back to the screen the user was viewing before the pop-up spawned if "Back" is on a pop-up. When a user has selected an action or made an entry, "Cancel" may withdraw that action or entry. These type of "destructive" actions may require a confirmation screen. "Done" may proceed to the next screen or send the user back to a home screen depending on which screen "Done" is activated on. "Next" may proceed to the next screen.

Among other virtual keys, the "Create New Formula" screen 2800 may include a virtual "Cancel" key 2804. Selection of the "Cancel" key 2804 may bring the user back to the screen from which the user navigated from. Upon selecting a service, the selected service 2806 may be highlighted by the color preparation and management system and method for the user. In some embodiments, when the user selects the service, the color preparation and management system and method may automatically proceed to a "Select Ingredients" screen 2810, such as the screen shown in FIG. 28B. In other embodiments, the color preparation and management system and method may require the user first select the desired service, and then select it a second time. The second selection serves to confirm the user's selection and avoids inadvertent navigation to the "Select Ingredients" screen 2810. In yet other embodiments, the color preparation and management system and method may display a virtual "Next" or "Done" key that the user must select to proceed to the "Select Ingredients" screen 2810 after selecting the desired service from the plurality of services 2802.

The "Create New Formula" screen 2800 enables a user to create one or more new formulas, which may or may not be associated with a particular client. Whether a newly created formula is associated with a client may depend on one or more factors, such as what GUI screen the user navigated from to access the "Create New Formula" GUI (e.g. FIGS. 28A-28I). For example, if the user navigates to the "Create New Formula" GUI without selecting a client from the "Client Selection" GUI (e.g., FIGS. 24A-C), the color preparation and management system and method may automatically not associate a newly created formula with a particular client. The "Create New Formula" GUI may query the user to determine whether a newly created formula (before, during, or after the process of creating a formula) would like to associate the newly created formula with a client. If so, the color preparation and management system and method may send the user to the "Client Selection" GUI or simply generate a pop-up window or the like in the "Create New Formula" GUI.

Additionally or alternatively, whether a newly created formula is associated with a client may depend on whether the user selects a virtual key (e.g., "Assign to Client") presented to the user in the "Create New Formula" GUI (e.g. FIGS. 28A-28I). Yet in other embodiments, the color preparation and management system and method may prevent users from accessing the "Create New Formula" GUI until they select a client. In such embodiments, once a user accesses the "Create New Formula" GUI and creates a formula, the color preparation and management system and method may automatically assign or associate the created formula to the current selected client.

In the embodiment shown, the user may select a service from a plurality of services 2802 presented to the user. The plurality of services 2802 may include hair services, nail services, and the like. In addition, the user may select from a plurality of products or services, such as nail polish, lip gloss, shampoo, conditioner, soap, lotion, wax, fragrance, cream, body wash, and the like. The "Create New Formula" GUI enables the user to create a formula for a service or a product. For example, selecting nail polish enables the user to create a customized nail polish by selecting one or more ingredients to mix together. Likewise, selecting a shampoo enables the user to create a customized shampoo with additives to enhance cleaning, shine, damage repair, fragrance, and the like.

In some embodiments, screen 2800 also enables the user to create a new conversion formula that the color preparation and management system and method may use when converting color systems and the like. Such an embodiment may include the user selecting the service, selecting two color systems, selecting ingredients specific to each color system, inputting the conversion (e.g., ratio(s), percentage(s), fraction(s), and the like) that the color preparation and management system and method uses to convert between the selected color systems and ingredients.

In some embodiments, the "Create New Formula" GUI also enables a user to access one or more formulas that were created not using display 2300. For example, the user may access a website or an application containing the same, a similar, or a different GUI (i.e., the "Create New Formula" GUI or each of the GUI modules disclosed herein) that is presented to the user on a personal computer, work computer, phone, PDA, a tablet computer, or the like. Once the user has created a formula outside of the color preparation and management system and method using the display 2300, the user may upload or import the created formula to the system using the display 2300 over a network connection (e.g., internet or intranet). Therefore, when the user accesses the "Create New Formula" GUI (e.g., screen 2800), the user may be able to select an "Imported" virtual key or tab to show a list of the created formulas the logged-in user and/or other users have created and uploaded to the system.

Upon selecting an imported formula, the user may be taken to the "Select Ingredients" screen 2810 to enable the user to the user to choose whether he or she wants to dispense, save or convert the formula. If a user selects to dispense the selected imported formula, the user may be navigated to the "Dispense Formula" GUI (e.g., FIGS. 30A-J). The selected imported formula may not be modifiable from the perspective that any changes made to the formula by the user cannot overwrite the selection. Rather, the user may only be able to save the "edited" imported formula as a new formula. In other embodiments, saving any edits affects (i.e., overwrites) the selected imported formula. If a user selects to convert the formula, the color preparation and management system and method may display a conversion pop-up window as shown in FIG. 25E with the corresponding functionality described herein. In yet other embodiments, upon selecting an imported formula, the color preparation and management system and method may automatically navigate the user directly to the "Dispense Formula" GUI (e.g., FIGS. 30A-J). In yet further embodiments of the color preparation and management system and method, upon selecting an imported formula, the system automatically navigates the user directly to the "Batch Sizing" GUI (e.g., FIGS. 27A-B).

The "Create New Formula" GUI may also enable the user to select from a list of pre-created, "salon-approved," or example formulas. Therefore, when the user accesses the "Create New Formula" GUI (e.g., screen 2800), the user may be able to select an "Examples" virtual key or tab to show a list of pre-created formulas. The pre-created formulas may serve as a template or guide for the user so that the user need not start from scratch when creating a formula. For example, upon selecting a pre-created formula, the color preparation and management system and method may display the "Select Ingredients" screen 2810 with the ingredient fields filled in. The pre-created or salon-approved formulas may not be modifiable from the perspective that any changes made to the formula by the user cannot overwrite the selected pre-created formula. Rather, the user may only be able to save the "edited" pre-created formula as a new formula. The pre-created formulas may be any previously created formula by the user and/or other users, or only formulas that an administrator (e.g., salon owner, supervisor, manager, and the like) selects. From a GUI navigational standpoint, the color preparation and management system and method may process a selected pre-created formula similar to a selected imported formula.

In other embodiments, the "Create New Formula" screen 2800 may only list services 2802. Upon selecting a service, the user may be presented with a pop-up window or new screen that requires the user to select "New," "Imported," or "Pre-created." Selecting "New" may cause the color preparation and management system and method to display the "Select Ingredients" screen 2810. Selecting "Imported" or "Pre-created" may cause the color preparation and management system and method to display a list of imported formulas, respectively. Selecting an imported or pre-created formula may take the user to the "Select Ingredients" screen 2810, "Dispense Formula" GUI, or "Batch Sizing" GUI, as disclosed herein.

Figure 28B:
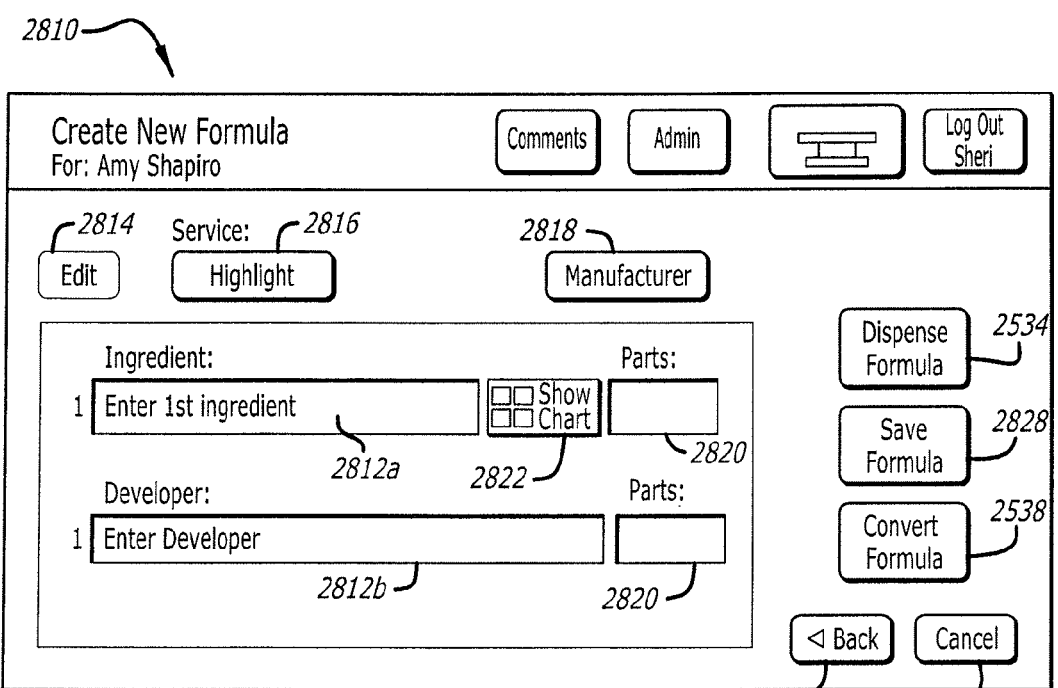
Figure 28C:
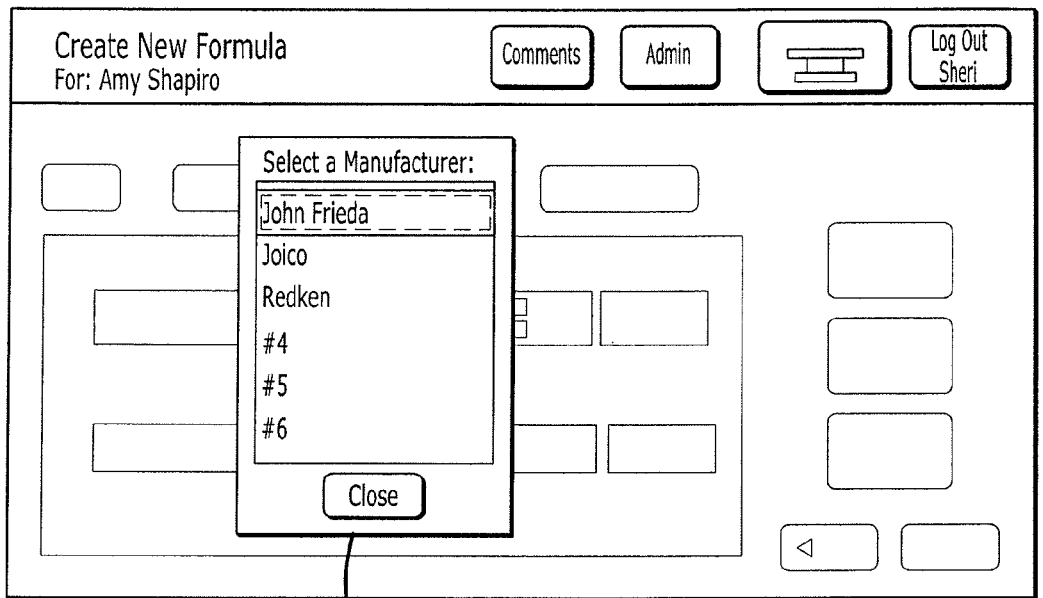
Figure 28D:
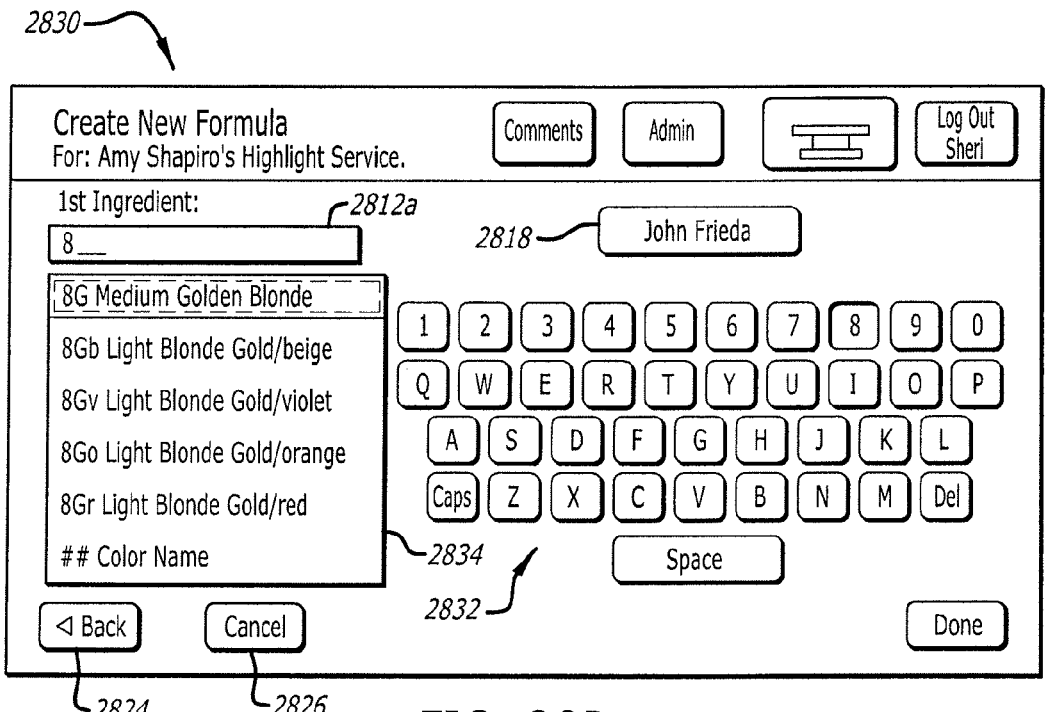
Figure 28E:
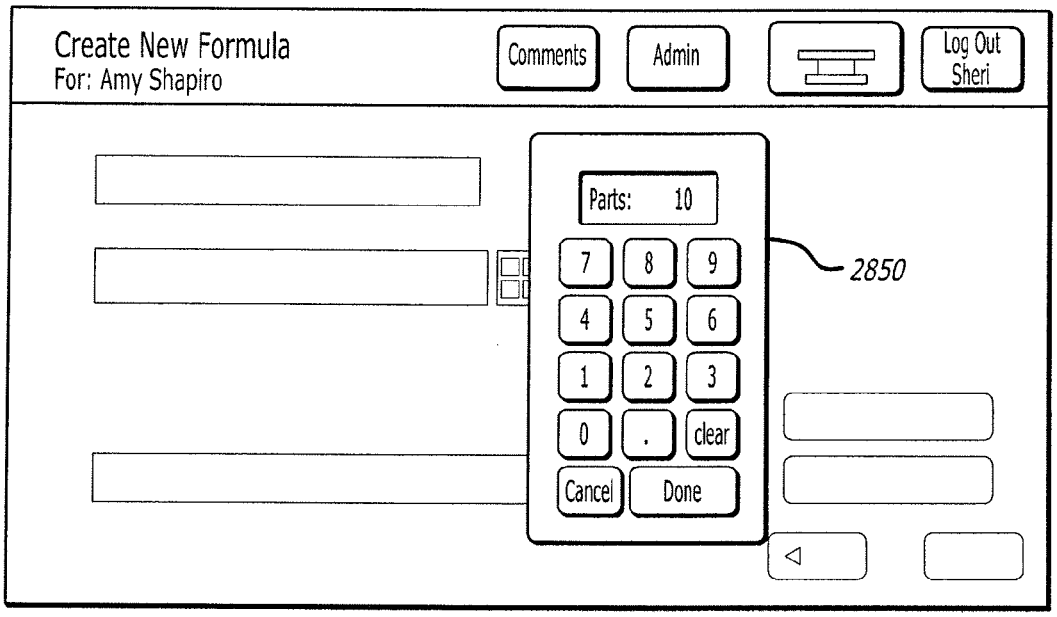
Figure 28F:
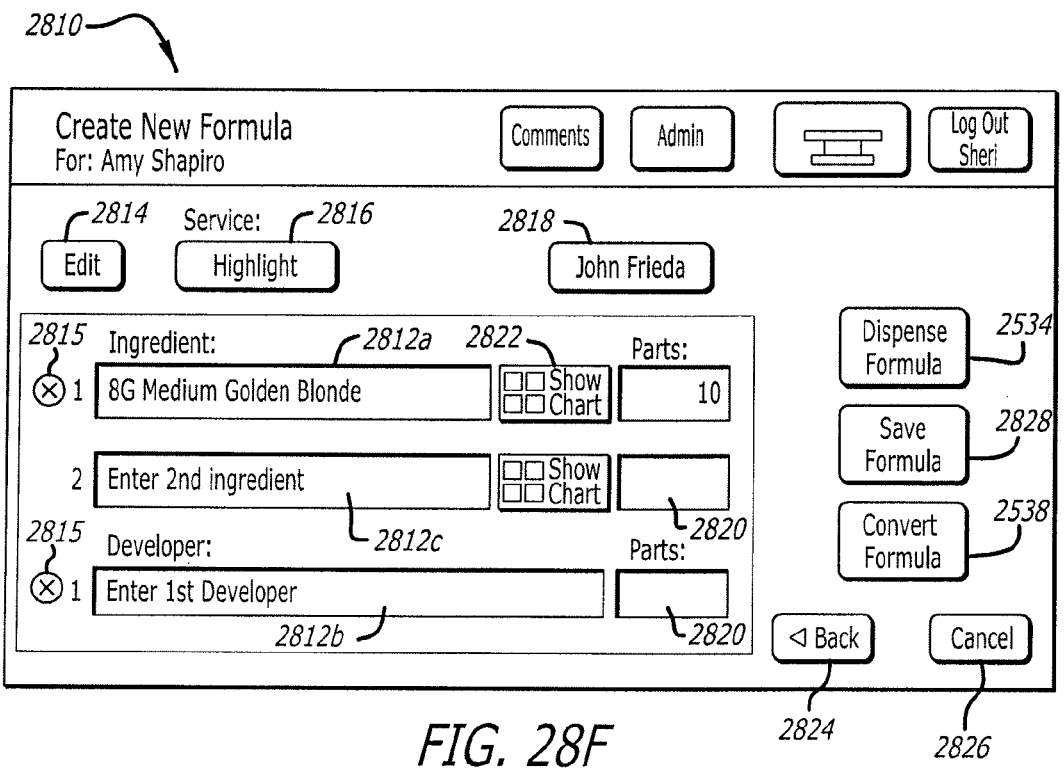

Referring now to FIGS. 28B, 28F, and 28I, one embodiment of the "Select Ingredients" screen 2810 is shown, which is part of the "Create New Formula" or "Color Book" GUI. The "Select Ingredients" screen 2810 enables the user to add one or more ingredients for the selected service in one or more ingredient fields 2812. The user is also able to edit already populated fields, for example, when the user accesses screen 2810 by selecting an imported or pre-created formula. In some embodiments, the one or more ingredient fields 2812 initially displayed to the user may depend on the service selected by the user on the "Create New Formula" screen 2800. For example, the screenshot of the "Select Ingredients" screen 2810 shown in FIG. 28B is based on the user's selection of the virtual "Highlights" key on the "Create New Formula" screen 2800. Therefore, the color preparation and management system and method may initially display a colorant ingredient field 2812a and a developer ingredient field 2812b on the GUI, as shown. In other embodiments, the "Select Ingredients" screen 2810 may only initially display one or more ingredient fields 2812 without a label (e.g., "developer"). However, the ingredient label of "developer" enables the color preparation and management system and method to remind the user that a "Highlights" formula may require a developer.

The "Select Ingredients" screen 2810 may include a virtual "Edit" key 2814, a virtual service key 2816, a virtual "Manufacturer" key 2818, one or more parts or amount fields 2820, one or more virtual "Show Chart" keys 2822, a virtual "Back" key 2824, a virtual "Cancel" key 2826, a virtual "Dispense Formula" key 2534, a virtual "Save Formula" key 2828, and a virtual "Convert Formula" key 2538. In some embodiments, the virtual "Edit" key 2814 may only be selectable to toggle ON or OFF once the user has entered at least one ingredient. When toggled ON, the "Select Ingredients" screen may display one or more virtual delete keys 2815. In other embodiments, the virtual "Edit" key may not be displayed because the user may simply touch the ingredient field 2812 sought to be edited. In the embodiment shown in FIGS. 28B, 28F, and 28G, the virtual "Edit" key may be dimmed, grayed out, or otherwise graphically displayed to visually inform the user that it is not selectable since the user has yet to add any ingredients.

The virtual service key 2816 may include text corresponding to the service selected on the "Create New Formula" screen shown in FIG. 28A. Upon selecting either the virtual service key 2816, "Back" key 2224, or "Cancel" key 2226, the GUI presented on display 2300 through use of one or more processors that are local or remote to the color preparation and management system and method the user is interacting with may go back to displaying the "Create New Formula" screen 2800. The "Cancel" key 2226 may alternatively be used to remove the most recent ingredient added by the user.

The virtual "Manufacturer" key 2818 may be selectable by the user. If the salon or company employing the color preparation and management system and method disclosed herein only uses one manufacturer, the "Manufacturer" key 2818 may reflect that. For example, the key may not be selectable and the graphical object may read "Manufacturer: REDKEN®," "Mfr: REDKEN®," or "REDKEN®" if the salon or company only uses or sells one or more REDKEN® color systems to clients, customers, user, and the like. If the salon or company uses more than one manufacturer, the "Manufacturer" key 2818 may be selectable. Upon the user selecting key 2818, pop-up 2570 may be displayed as shown in FIG. 28C. Additionally or alternatively, the "Manufacturer" pop-up 2570 may be displayed when the user selects the first ingredient field 2812 to enter an ingredient. The pop-up window enables the user to select one or more manufacturers (e.g., JOHN FRIEDA®, JOICO®, and REDKEN®) from a list, as described herein with reference to FIGS. 25A and 25D. The user may close the pop-up 2570 by selecting a "Close" or "Done" virtual key, or touching the display 2300 outside of the pop-up (e.g., touching a greyed out or dimmed virtual key). The color preparation and management system and method then removes the pop-up 2570 and (1) changes the "Manufacturer" key 2818 to reflect the user's selection and (2) bases information presented to the user (e.g., ingredients listed from which the user is able to select) on the selected manufacturer. For example, if the user selects JOHN FRIEDA®, the color preparation and management system and method will only list JOHN FRIEDA® ingredients. In some embodiments, the user is able to select a plurality of manufacturers.

Referring now to the one or more ingredient fields 2812, each field may be selectable by the user. Upon selecting an ingredient field 2812, the color preparation and management system and method may proceed to display the pop-up 2570 shown in FIG. 28C or the "Search and Select Ingredient" screen 2830 shown in FIG. 28D. If the salon or company uses or sells only one manufacturer, then the color preparation and management system and method may proceed to the "Search and Select Ingredient" screen 2830 (i.e., since the single manufacturer may be set as the default manufacturer or the only manufacturer in the database). In some embodiments of the color preparation and management system and method, if the salon or company uses or sells more than one manufacturer, then the system may proceed to display the manufacturer selection pop-up 2570. In other embodiments, the color preparation and management system and method may only display the pop-up 2570 if the user has not selected a manufacturer using the pop-up generated when the user selects the virtual "Manufacturer" key 2818.

If the color preparation and management system and method generates the pop-up 2570, the user may cancel the pop-up to remove the pop-up without leaving the "Select Ingredients" screen 2810. Alternatively, the user may select a manufacturer, which causes the color preparation and management system and method to display the "Search and Select Ingredient" screen 2830. In the embodiment shown in FIG. 28C, the user has selected JOHN FRIEDA® as the manufacturer. The "Search and Select Ingredient" screen 2830 includes the virtual "Manufacturer" key 2818, which reflects the user's choice of JOHN FRIEDA® as the manufacturer.

Figure 28G:
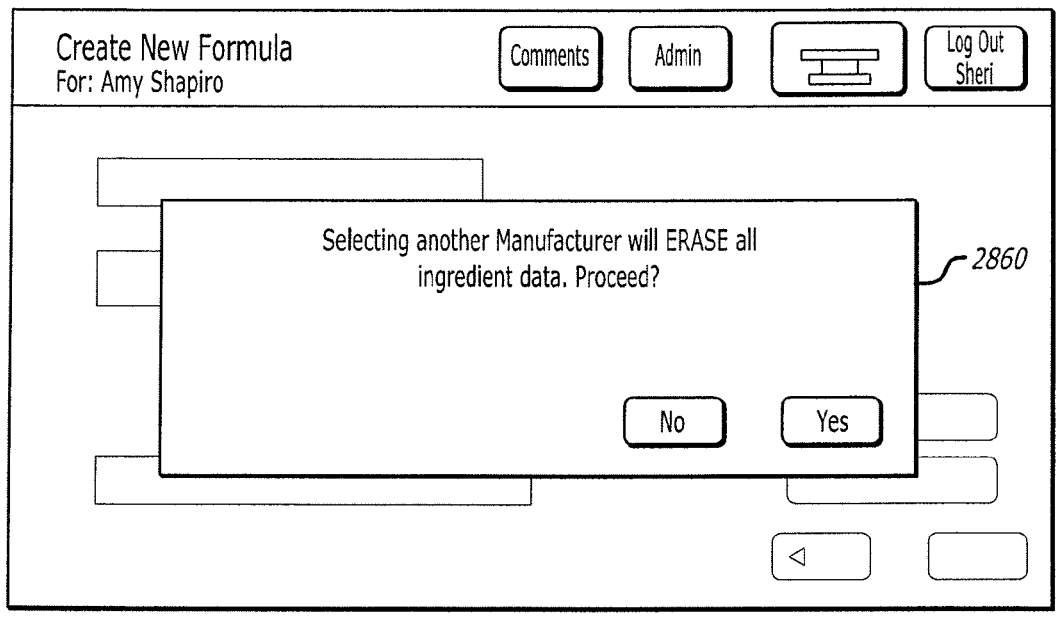

In some embodiments, the user may not be allowed to mix ingredients from different manufacturers. Therefore, if at any point while a user is creating or editing a formula on any screen and tries to do so (e.g., by selecting a different manufacturer on the "Search and Select Ingredient" screen 2830), a warning pop-up 2860 will be displayed as shown in FIG. 28G. For example, if a user chooses a different manufacturer after some ingredients have already been entered, the warning pop-up 2860 will display informing the user that they will lose all previous ingredients entered if they choose a new manufacturer.

The "Search and Select Ingredient" screen 2830 also includes a virtual keyboard 2832 and a list 2834 of the selected (or default) manufacturer's ingredients for inputting information into the ingredient field 2812*a*. The user is able to either select an ingredient from the list 2834 or type the desired ingredient using the virtual keyboard 2832. In some embodiments, as shown, the ingredient field may function as a search query for the list of ingredients. For example, since the user has input an "8" in the ingredient field, the list populates with ingredient names beginning with and/or containing an "8." The user may fully type the desired ingredient or select one of the ingredients from the list. Once a complete ingredient name displays in the ingredient field or the user selects an entry in the list, a virtual "Done" key may become available for the user to select.

In some embodiments, frequently used ingredients may be presented to the user to enable the stylist to create a formula using commonly used ingredients. Thus, the "Create New Formula" GUI saves time for the user by providing convenient "building blocks" of information.

Upon selecting "Done," the user is taken back to "Select Ingredients" screen 2810 with ingredient field 2812*a* populated with the chosen ingredient, as shown in FIG. 28F. After an ingredient is added, another ingredient field may be displayed. For example, the first ingredient has been entered in colorant ingredient field 2812*a*. Therefore, a second colorant ingredient field 2812*c* may be displayed.

Figure 28H:
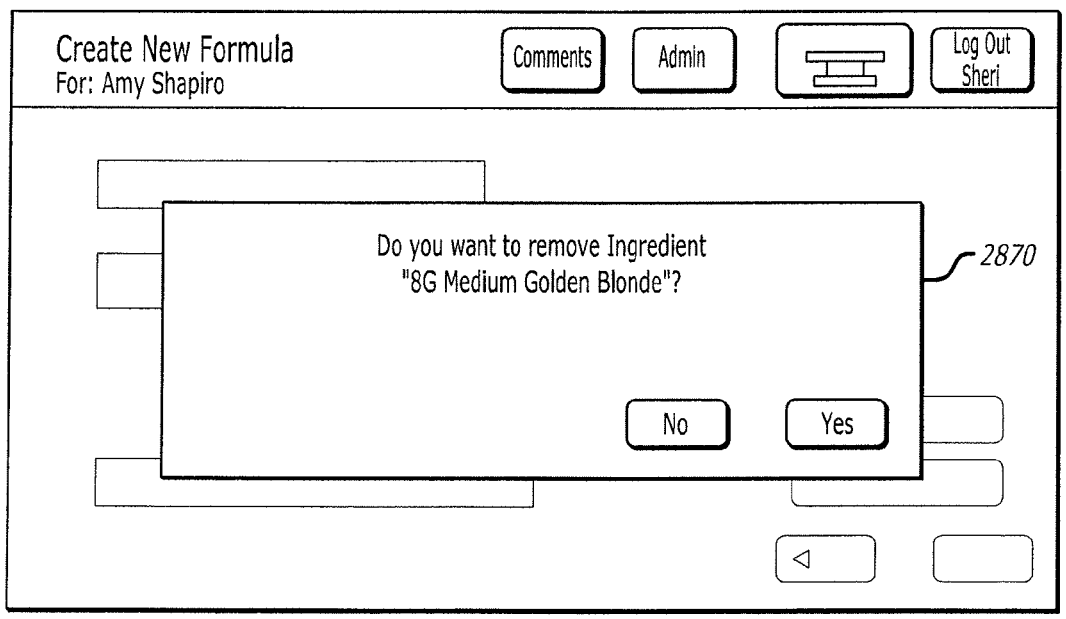

FIG. 28F depicts an embodiment of the "Select Ingredients" screen 2810 when the "Edit" key 2814 is toggled ON after an ingredient has been added, which displays a plurality of virtual delete keys 2815. Selecting a delete key 2815 may cause the color preparation and management system and method to display a "Confirm Delete" pop-up 2870. One embodiment of the pop-up 2870 is shown in FIG. 28H. Confirming delete will cause the color preparation and management system and method to remove the corresponding ingredient from the formula (i.e., the entire row). For example, the user may select the delete key 2815 corresponding to ingredient field 2812*a*. This selection would cause the color preparation and management system and method to display the "Select Ingredients" screen 2810, as shown in FIG. 28B. The "Edit" key 2814 may or may not remain toggled ON after the user deletes an ingredient.

FIG. 28I depicts an embodiment of the "Select Ingredients" screen 2810 after the user has added a total of three ingredients.

Referring now to the one or more virtual "Show Chart" keys 2822 shown in FIGS. 28B, 28F, and 28I, each ingredient field 2812 may or may not include a corresponding "Show Chart" key 2822. A "Show Chart" key enables the user to select ingredients based on visual representations thereof to enable the user to more readily perceive the difference between color systems/lines from a manufacturer. In some embodiments, visual representations (e.g., pictures or videos) may accompany the list of ingredients 2834 shown in FIG. 28D. The visual representations may include actual pictures of the ingredient or the container that holds the ingredient (e.g., the tube, bottle, or vessel). The visual representations may also include graphical objects such as icons that accurately provide information to the user (e.g., a color bar corresponding to the color of a colorant ingredient).

In some embodiments, the color preparation and management system and method may enable the user to browse a "From/To" or "Before/After" GUI with visual representations intended to give the user a "From/To" or "Before/After" impression for one or more color systems, formulas, services, ingredients, and the like. For example, the user may select an ingredient such as "6R Light Red Brown." Upon doing so, the color preparation and management system and method may display an array of before and after pictures of clients who have received a color treatment with the "6R Light Red Brown" ingredient. In other embodiments, the color preparation and management system and method may require the user to finish ingredient selection before displaying before and after pictures to the user. By doing so, the color preparation and management system and method enables the user to browse a more accurate array of before and after pictures because the array is formula specific rather than ingredient specific. The "Before/After" GUI may be integrated in the "Create New Formula" GUI (e.g., it may be part of the GUI that is presented to the user after the "Show Charts" virtual has been selected).

In other embodiments, client data may be assigned or associated with one or more color systems, formulas, services, ingredients, and the like. Client data may include any information related to the client, such as one or more hair characteristics, age, gender, pictures, location information, and the like. In such embodiments, the color preparation and management system and method may analyze the client data to suggest or automatically choose one or more color systems, formulas, services, ingredients, and the like, to the user that may be used on the client. The color preparation and management system and method may also analyze the client data to determine relevant before and after pictures to display to the user. Even further, analysis of client data enables the color preparation and management system and method to identify local, state, national, and global trends. This is especially the case when a plurality of computer systems in a plurality of different locations communicate local information to other computer systems within the network. Thus, a client may enter a salon in California and ask for the most common hair coloring service in Europe. The user may input such information during formula creation or selection. The color preparation and management system and method may then provide a list of the most common hair coloring services in Europe over a period of time (e.g., 3 months, 6 months, 1 year, or 5 years) accompanied by before and after pictures to ease user understanding and selection.

Figure 29A:
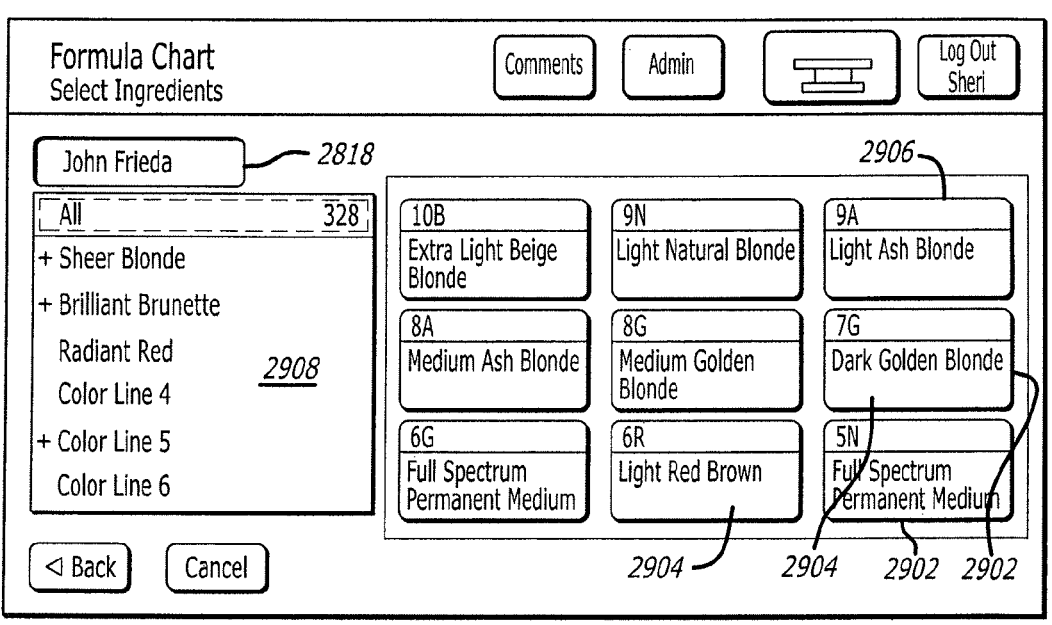

Upon selecting a "Show Chart" key 2822, the color preparation and management system and method may proceed to display the pop-up 2570 shown in FIG. 28C or the "Visual Ingredient Selection" screen 2900 shown in FIG. 29A. If the salon or company uses or sells only one manufacturer, then the color preparation and management system and method may proceed to the "Visual Ingredient Selection" screen 2900 (i.e., since the single manufacturer may set as the default manufacturer or the only manufacturer in the database). In some embodiments, if the salon or company uses or sells more than one manufacturer, then the color preparation and management system and method may proceed to display the manufacturer selection pop-up 2570. In other embodiments, the color preparation and management system and method may only display the pop-up 2570 if the user has not selected a manufacturer using the pop-up generated when the user selects the virtual "Manufacturer" key 2818.

Figures 29B, 30A:
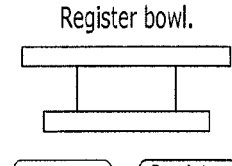

If the color preparation and management system and method generates the pop-up 2570, the user may cancel the pop-up to remove the pop-up without leaving the "Select Ingredients" screen 2810. Alternatively, the user may select a manufacturer, which causes the color preparation and management system and method to display the "Visual Ingredient Selection" screen 2900. In the embodiment shown in FIG. 28C, the user has selected JOHN FRIEDA® as the manufacturer. The "Visual Ingredient Selection" screen 2900 includes the virtual "Manufacturer" key 2818, which reflects the user's choice of JOHN FRIEDA® as the manufacturer. A plurality of visual representations 2902 (e.g., icons, thumbnails of picture files, and the like) are shown in FIGS. 29A and 29B. Each visual representation may include textual information 2904 as well as graphical information such as a color bar 2906. The color bars 2906 correspond to the color of the ingredient. If the color of an ingredient (e.g., a developer) is unnecessary, then the color bar 2906 may not be included for that ingredient. However, the color bars 2906 shown correspond to colors. Therefore, the color bar 2906 for the "10B Extra Light Beige Blonde" will be a light beige color whereas the color bar 2906 for the "6R Light Red Brown" will be a light red brown color.

In some embodiments, the user is not allowed to mix ingredients from different manufacturers. Therefore, if at any point while a user is creating or editing a formula on any screen and tries to do so (e.g., by selecting a different manufacturer on the "Visual Ingredient Selection" screen 2900), a warning pop-up 2860 will be displayed as shown in FIG. 28G. For example, if a user chooses a different manufacturer after some ingredients have already been entered; the warning pop-up 2860 will display informing the user that they will lose all previous ingredients entered if they choose a new manufacturer.

FIG. 29B depicts an example screenshot of the "Visual Ingredient Selection" screen 2900 after the user has selected "Medium Blondes" sub-color line under the "Sheer Blonde" color line from the color list 2908 instead of "All," which is depicted in FIG. 29A. The user may select an ingredient displayed on the "Visual Ingredient Selection" screen by simply touching one of the visual representations 2902. After the user selects one or more ingredients on screen 2900, the user may navigate back to the "Select Ingredients" screen 2810, which displays the selected ingredients to the user in the ingredient fields 2812 as disclosed herein.

Referring now to the one or more "Parts" or "Amount" field 2820 shown in FIGS. 28B, 28F, and 28I, each ingredient field 2812 may include a corresponding "Parts" or "Amount" field 2820. The "Parts" or "Amount" fields 2820 may or may not refer to the exact amount of each ingredient. For example, the user may use relative or standardized packing units of measurements (e.g., "parts," "tube portion," and "squeezes") instead of using exact or more precise units of measurements (e.g., grams, milliliters, ounces). In some embodiments, the color preparation and management system and method enables the user to use exact units of measurement. Both types of units of measurement enable the color preparation and management system and method to establish a relationship (e.g., proportion or ratio) between ingredients. Embodiments that employ relative units of measurement enable easier formula creation because the user is generally understood to use standardized packaging when using a particular color system. For example, the user may use the standardized packing without knowledge of the grams, milliliters, or ounces that are contained therein. Instead, the standardized packing units of measurement translate easier for the user, such as the number of tubes, squeezes, parts, and the like.

In some embodiments, each "Parts" or "Amount" fields 2820 may only become selectable once its corresponding ingredient field 2812 has been filled in (e.g., an ingredient has been selected by the user). In other embodiments, each "Parts" or "Amount" fields 2820 may become selectable before its corresponding ingredient field 2812 has been filled in (e.g., an ingredient has not been selected by the user). When the user selects one of the "Parts" or "Amount" fields 2820, the selection is processed by one or more processors of the color preparation and management system and method resulting in a "Parts" or "Amount" pop-up 2850 being presented on the display 2300. FIG. 28E depicts one embodiment of the "Parts" or "Amount" pop-up 2850 that is part of the "Create New Formula" GUI.

The user or color preparation and management system and method may add additional ingredient fields 2812. For example, as shown in FIG. 28F, the color preparation and management system and method may add an ingredient field and other fields/virtual keys related thereto after the user adds an ingredient. In other embodiments, the user may be able to add additional ingredient fields and other fields/virtual keys related thereto without first selecting an ingredient.

While the user can rely on the "Edit" key 2814 to delete selected ingredients one-by-one, the "Cancel" key 2826 may delete all field entries. In other embodiments, "the Cancel" key 2826 may undo the user's last entry.

Figure 27A:
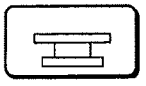
FIGS. 27A-B show various screenshots of screens associated with a "Batch Sizing" GUI module according to one embodiment.
Figure 27B:

The virtual "Dispense Formula" key 2534 may only be available after at least one ingredient and one developer are entered. In some embodiments, if the user activates the "Dispense Formula" key 2534 without these requirements, the color preparation and management system and method could notify the user with a pop-up message (e.g., "You need to enter ingredient parts before you can dispense"). Upon selecting the "Dispense Formula" key 2534, the color preparation and management system and method may take the user to the "Batch Sizing" GUI (e.g., FIG. 27A or 27B). FIG. 27A depicts a first "Batch Sizing Guide" screen 2700 that is part of the "Batch Sizing" GUI module. FIG. 27B depicts a second "Batch Sizing Guide" screen 2720 that is part of the "Batch Sizing" GUI module.

In other embodiments, the color preparation and management system and method may navigate the user directly (i.e, bypass the "Batch Sizing" GUI) to the "Dispense Formula" screen 3000 of the "Dispense Formula" GUI module (e.g., FIGS. 30A-J). When bypassing the "Batch Sizing" GUI, the color preparation and management system and method may apply a default batch size based on a system, user, or client default. The default batch size may include a default hair texture (fine, normal, course, or extra course) and a default hair length (3 inches, 3-6 inches, 6-9 inches, and the like). The default batch size may be edited by the user and may be user-specific or salon-specific. This enables the user to set up the color preparation and management system and method to follow trends. For example, the majority of clients coming to a particular stylist or salon may have a hair length ranging between 9-12 inches during year one. During year two, the user may notice the average length of hair has decreased to 6-9 inches. The user can change the default hair length parameter to reflect such a change.

The virtual "Save Formula" key 2828 enables the user to save his or her progress while creating a new formula. In addition, the virtual key 2828 enables the user to save the formula after it is complete. Upon selecting the "Save Formula" key 2828, the color preparation and management system and method may automatically save the progress or completed formula to the database (e.g., memory local or remote to the color preparation and management system and method) and assign a unique formula identifier. Additionally or alternatively, the color preparation and management system and method may require the user to name the formula.

When the user selects to save a created formula, the color preparation and management system and method may analyze whether the ingredients mixed according to the ratio specified by the user according to their parts entry would yield an unsafe, dangerous, or useless formula mixture when dispensed. Referring to the example shown in FIG. 28I, assume the user had input 200 parts for the "8G Medium Golden Blonde" ingredient. The color preparation and management system and method may determine that mixing 200 parts of this ingredient with 5 parts of the second colorant and 30 parts of the developer would yield a useless dispensed formula and result in waste. Now assume the user had instead input 300 parts for the developer. Not only would the color preparation and management system and method determine this be a useless dispensed formula, but also that it would be unsafe if dispensed due to the amount of the developer being used. Thus, the color preparation and management system and method may flag or warn the user that the created formula seems to or actually does contain an error. The color preparation and management system and method may highlight any possible issues on the GUI. The color preparation and management system and method may determine useless and unsafe dispensed ingredients based on information stored on the database. For example, thresholds may be set to warn the user if any parts or amount is set to an amount greater than the threshold. The threshold may be ingredient specific and may or may not take into account the other parts or amounts entered for other ingredients in the created formula. In other embodiments, the color preparation and management system and method may prevent the user from saving and/or dispensing the created formula if the created formula is determined to be unsafe or useless. This prevents needlessly tying up memory with an unusable formula and helps shield a salon from accidental or malicious actions taken by its employees that may harm customers and increase waste for the salon.

The virtual "Convert Formula" key 2538 may cause the color preparation and management system and method to display the "Conversion" pop-up 2570, as shown in FIG. 25E that may be part of the "Client Selection" GUI module, "Create New Formula" GUI, or different GUI module. The color preparation and management system and method may process the different functionalities described herein with reference to FIG. 25E and the corresponding conversion software module. After the color preparation and management system and method processes the user's selected conversion, the GUI presented on display 2300 may go back to the "Select Ingredients" screen 2810 or the screen from which the user caused the system to generate the pop-up 2570. Information may be presented to the user indicating that a conversion was processed. The "Select Ingredients" screen 2810 may only display the "converted to" ingredients or the ingredients of both color systems. For example, the originally entered ingredients, parts, and manufacturer may be a first color and the "converted to" ingredients, parts, and manufacturer may be a second color positioned next to the original ingredients. This enables the user to review the conversion. In some embodiments, the user may only be able to select the "converted to" ingredients. In other embodiments, the user may be able to select either the originally selected ingredients or the "converted to" ingredients.

Upon changing one of the ingredients, the color preparation and management system and method processes the conversion (backwards or forward depending on which ingredient was edited) and updates the information displayed to the user. Therefore, the user need not call upon the "Conversion" pop-up 2570 to process edits to one or more ingredients for a previously selected and processed conversion. By default, the "active" ingredients that may be dispensed, saved, or converted (to a different color system not currently displayed) may be the "converted to" ingredients. The GUI may enable the user to choose the originally entered ingredients to be "active" removing the need for the user to re-run the conversion. As disclosed herein with reference to FIG. 25E, more information related to the conversion may be presented to the user.

Referring now to FIG. 28J, one embodiment of the "Modify Formula" screen 2880 is shown. In some embodiments, the user may navigate to the "Modify Formula" screen 2880 by selecting the virtual "Modify Formula" key 2536 on the selected formula screen (or selected service screen) 2530 part of the "Client Selection" GUI. The user may also access the "Modify Formula" screen 2880 by selecting the "Modify Formula" key 2536 on screens other than the selected formula screen (or selected service screen) 2530. In addition, the color preparation and management system and method may automatically send the user to the "Modify Formula" screen 2880 (e.g., after the color preparation and management system and method creates a new conversion formula).

The "Modify Formula" screen 2880, which may be associated with the "Create New Formula" GUI, enables a user to edit existing formulas in the database (e.g., in a memory that is either local or remote to the color preparation and management system and method). The existing (i.e., saved or stored) formulas may have been created by a user or the color preparation and management system and method. In some embodiments, the "Modify Formula" screen 2880 enables a user to edit formulas not yet saved or stored in the database. For example, after the color preparation and management system and method creates a complementary formula or a conversion formula, the system may present screen 2880 on display 2300 prior to saving the new formula in the database. Such embodiments ensure that the user is able to verify and edit the created formula one more times before using valuable system resources such as memory.

The "Modify Formula" screen 2880 may include the same features and provide the same functionality as the "Select Ingredients" screen 2810 described herein. In some embodiments, the value of the "Parts" or "Amount" field 2820 are based on whether the formula being modified has only been created or has already been dispensed.

Referring now to FIGS. 27A and 27B, FIG. 27A depicts a first "Batch Sizing Guide" screen 2700 that is part of the "Batch Sizing" GUI module. FIG. 27B depicts a second "Batch Sizing Guide" screen 2720 that is part of the "Batch Sizing" GUI module. In some embodiments, the information and virtual keys on screens 2700 and 2720 may be combined into one screen. In other embodiments, the color preparation and management system and method displays screen 2700 or 2720 based on the selected service. For example, the "Batch Sizing Guide" GUI may require the user to select whether the selected formula is for a complete (e.g., full highlights) or partial service (e.g., retouch regrowth with highlights). The color preparation and management system and method will take the user to screen 2700 or 2720 if the user indicates the selected formula is for a complete or partial service, respectively.

As disclosed herein, a formula may include a set of ingredients in a specific ratio (e.g., based on the parts or amount for each ingredient in a formula). Batch sizing may create a base dispense (i.e., batch) size or amount based on one or more of the following: the service selected, client data, and data input by the user (e.g., free-form editing of the batch size). For example, the base dispense/batch amount for the same highlight service for two different clients may yield two different default batch sizes in view of different client data and/or input received from the user).

The "Batch Sizing" GUI may be passive (i.e., free-form) or active. For example, a passive GUI may include one or more selections with more or more screens within which the user may freely navigate. Whereas an active GUI has more structure, such as a "wizard user-assistance program" that forces a user through a path of actions in the GUI. In some embodiments, whether the color preparation and management system and method displays a passive or active "Batch Sizing" GUI may depend on user preference, experience of the user, administrator approval (e.g., may be required each time or permanently allowed), a certification process, and the like. The certification process may, for example, require one or more of the following: the user to create a predetermined number of formulas using the passive "Batch Sizing" GUI, the user to access one or more GUIs within the color preparation and management system and method a predetermined number of times, the user to dispense a predetermined number of formulas, and the like.

The "Batch Sizing" GUI enables the user to modify the base dispense amount based on, for example, one or more user or computer-selected hair characteristics. As shown in FIGS. 27A and 27B, hair characteristics may include texture, length, amount of regrowth, and the like. Under each hair characteristic, the user is provided with one or more selections. For example, under the hair texture characteristic, the GUI depicted in FIGS. 27A and 27B shows four possible selections: fine, normal, coarse, and extra coarse. Other hair characteristics may be included, such as whether the hair is chemically and/or physically damaged, the natural hair color, the current hair color, the amount of gray hair (e.g., the percentage of gray hair).

The user generally makes the most applicable selection for each hair characteristic. In some embodiments, the color preparation and management system and method may take or receive a picture of the client. The computer may analyze the picture to automatically select (or suggest to the user) the most applicable selections for one or more hair characteristics. In some embodiments, the picture contains a frame of reference to enable more precise analysis. For example, a female client's hair may be 14 inches in length. To accurately measure the client's hair, she may be required to stand in a particular spot or next to a frame of reference to get her picture taken. The color preparation and management system and method analyzes the picture to determine, among other things, which hair length hair characterization to automatically select or suggest that the user select (e.g., the 12-15 inch range shown in FIG. 27A). In some embodiments, when a picture is provided to the color preparation and management system and method for analysis, the selections displayed to the user may be disregarded. For example, since the computer may determine that the hair length in the above example is 14 inches based on the picture, selecting the 12-15 inch range introduces unnecessary uncertainty. Instead the color preparation and management system and method may simply use the 14 inch picture analysis measurement to determine the appropriate batch size.

In some embodiments, the color preparation and management system and method may apply a default batch size based on a system, user, or client default. The default batch size may include a default hair texture (fine, normal, course, or extra course) and a default hair length (3 inches, 3-6 inches, 6-9 inches, and the like). The default batch size may be edited by the user and may be user-specific or salon-specific. This enables the user to set up the color preparation and management system and method to follow trends. For example, the majority of clients coming to a particular stylist or salon may have a hair length ranging between 9-12 inches during year one. During year two, the user may notice the average length of hair has decreased to 6-9 inches. The user can change the default hair length parameter to reflect such a change.

The "Batch Sizing" GUI may allow further adjustment of the dispense amount based on additional operator input. For example, the user may simply input that he or she desires a certain percentage of the base dispense (i.e., batch) amount. The user may also input environmental data (e.g., temperature and humidity) corresponding to where the selected service is to be performed on the client. In some embodiments, the color preparation and management system and method includes transducers to read environmental data. Since environmental data may affect how well ingredients are mixed, the base dispense amount may be adjusted accordingly.

In addition, batch sizing may be an adaptive system that enables automatic adjustments to be made to the dispense amount by the color preparation and management system and method. Computer analysis of user adjustments to dispense (i.e., batch) sizes may cause or suggest changes to the dispense amount and/or hair characteristics selected. This may also be facilitated through weigh-out and/or re-batching. A weigh-out is formed after service is complete. The user logs-in to the color preparation and management system and method to access the "Weigh-Out" GUI module. One embodiment of the "Weigh-Out" GUI module is shown in FIGS. 31A-E. In one embodiment, the user selects the virtual "Scale" key 2310 to access the "Weigh-Out" GUI and the weigh-out process. The virtual "Scale" key 2310 is shown, for example, in the "Client Selection" GUI. The weigh-out process enables the color preparation and management system and method to determine the excess amount dispensed, if any. The color preparation and management system and method may use weigh-out data to adjust the base dispense amount for the dispensed formula for the same or different client with similar hair. Additionally or alternatively, the color preparation and management system and method may collect the weigh-out data for future analysis.

Re-batching enables a user to dispense an additional amount of formula to complete a service if the initial dispensed amount was not enough. The user logs-in to the color preparation and management system and method to access a "Re-Batching" GUI module. In some embodiments, the "Re-Batching" GUI module may be part of the "Dispense Formula" GUI module since re-batching entails dispensing additional ingredients. In one embodiment, the user selects the virtual "Scale" key 2310 to access the "Re-Batching" GUI and the re-batching process. The color preparation and management system and method may use the extra amount to adjust the base dispense amount for future dispenses of this same formula for the same client or different client with similar hair. After the service is complete, the user accesses the "Weigh-Out" GUI. The color preparation and management system and method may use weigh-out data (the amount left over) in conjunction with the re-batching data (e.g., the amount of extra formula dispensed) to adjust the base dispense amount for the dispensed formula for the same or different client with similar hair. Additionally or alternatively, the color preparation and management system and method may collect the weigh-out data and re-batching data for future analysis.

Referring now to FIGS. 30A-J, one embodiment of the "Dispense Formula" GUI module is shown. "Dispense Formula" screen 3000 may include a virtual "Edit" key 3002, a "Selected Service" key 3004, virtual "Selected Hair Characteristic" keys 3006 and 3008, virtual dispense ingredient keys 3010, 3012, and 3014, a virtual "Zero Scale" key 3016, a virtual "Back" key 3018, a virtual "Cancel" key 3020, and a virtual "Register Bowl" key 3022, the virtual "Comments" key 2418, the virtual "Administrator" key 2408, and the virtual "Log-Out" key 2412.

Among other things, from the "Dispense Formula" screen 3000, the user is able to modify the batch size, edit the formula, change the selected service, and change the selected hair characteristics. The user may edit the selected hair characteristics by selecting one of the "Selected Hair Characteristic" keys 3006 and 3008. For example, selection of one of keys 3006 or 3008 may take the user back to the "Batch Sizing" GUI module. The user may edit the selected service by selecting the "Selected Service" key 3004. For example, selection of the "Selected Service" key 2004 may take the user back to the "Create New Formula" GUI module. The user may edit the formula and/or batch size by selecting the virtual "Edit" key 3002. For example, selection of the "Edit" key 3002 may take the user to an "Edit Formula" screen 3090 (shown in FIG. 30I) that is part of the "Dispense Formula" GUI module. As shown in FIG. 30I, the "Edit Formula" screen 3090 is similar to the "Select Ingredients" screen 2810 shown in FIG. 28F when edit mode is toggled ON.

Figure 30B:
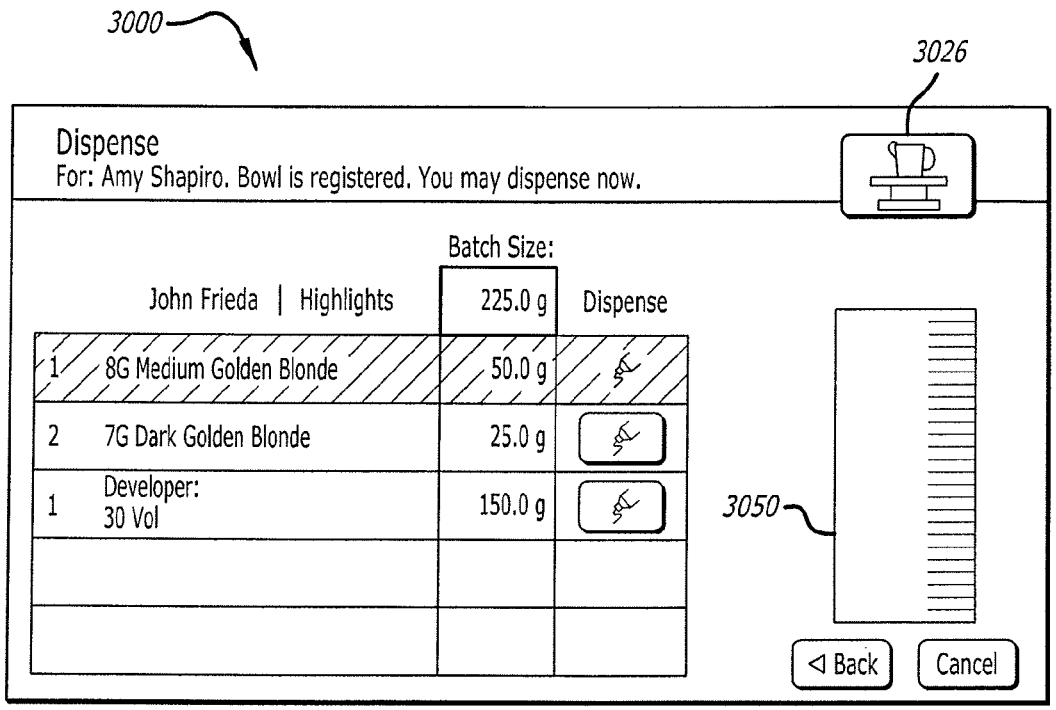
Figure 30C:
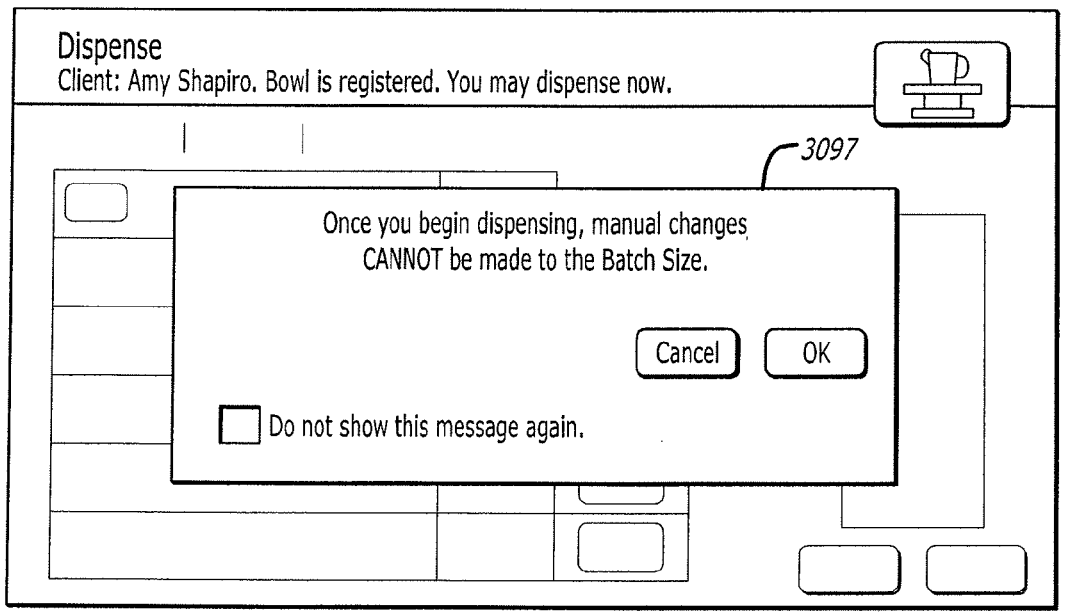
Figure 30D:
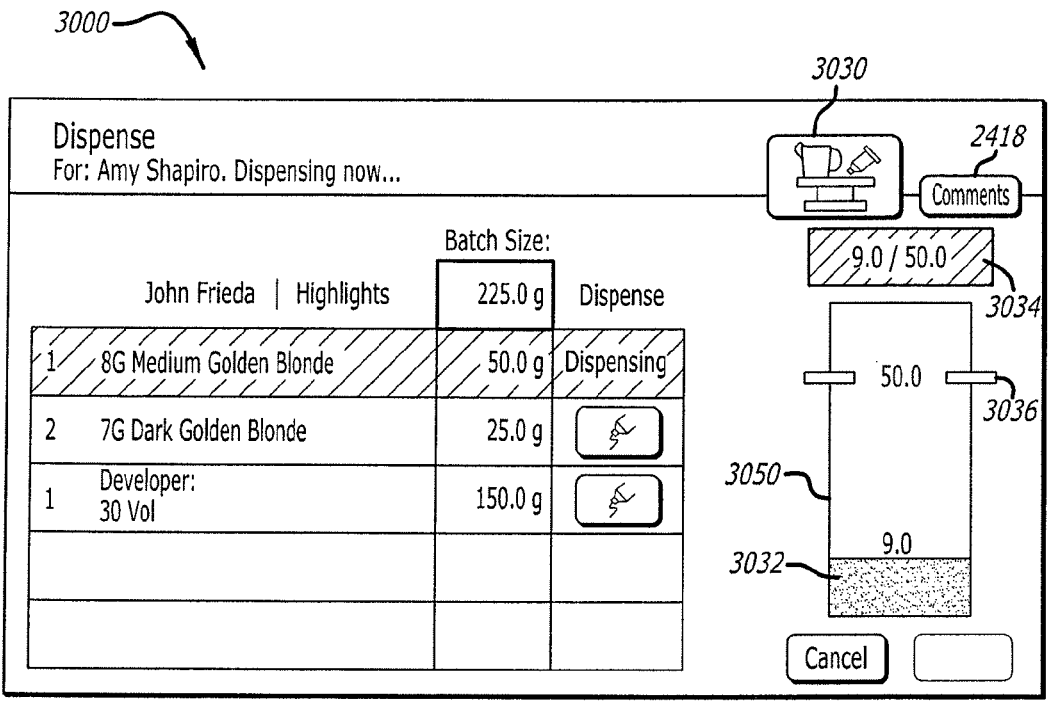
Figure 30E:
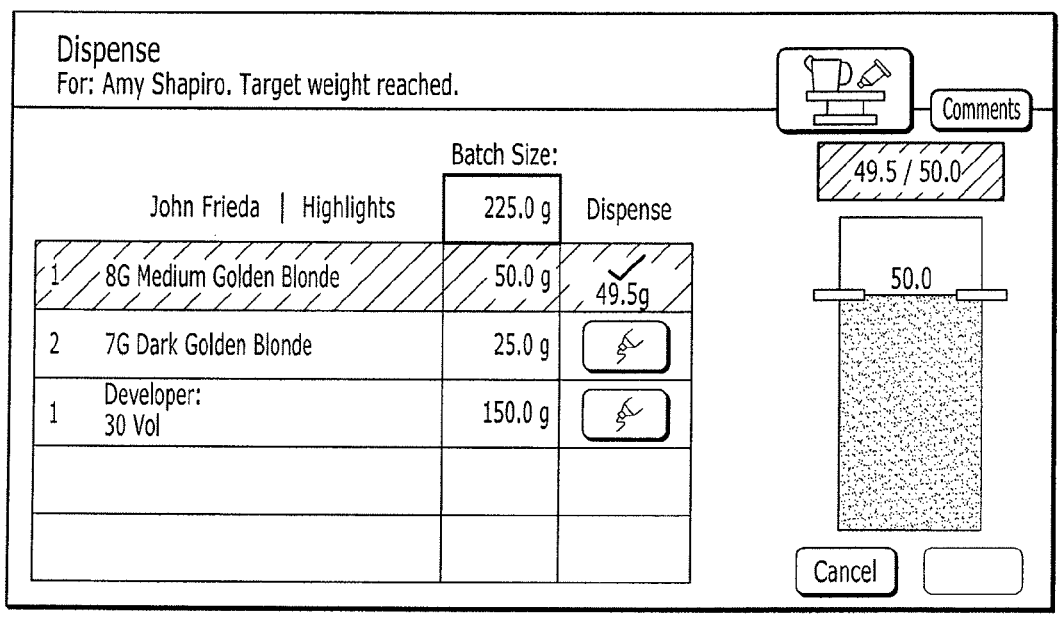
Figure 30F:
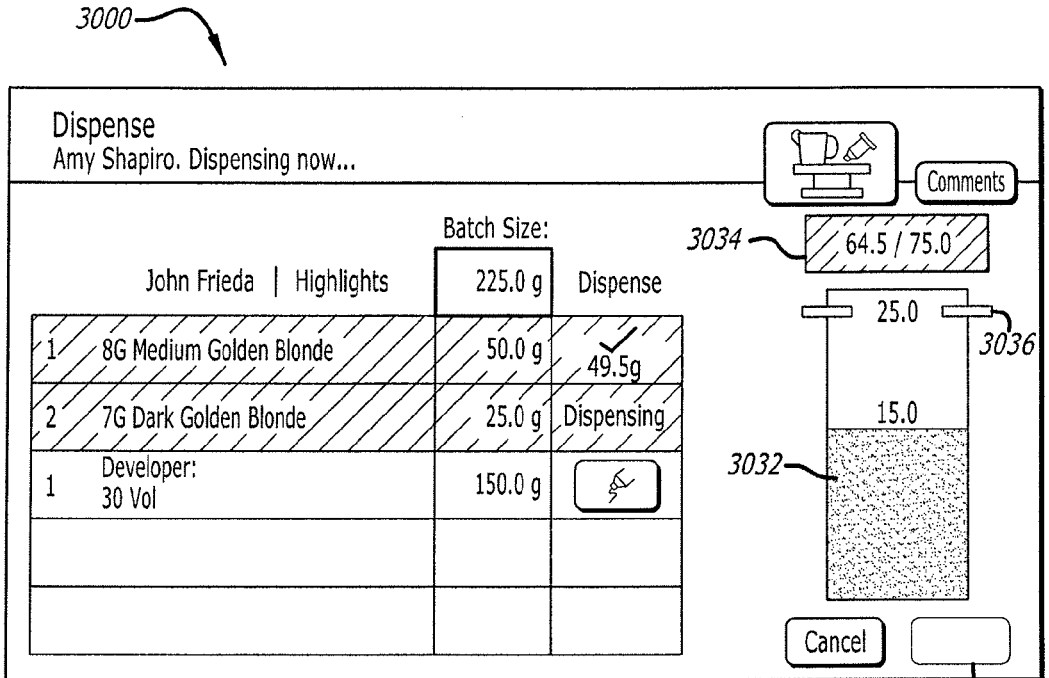
Figure 30G:
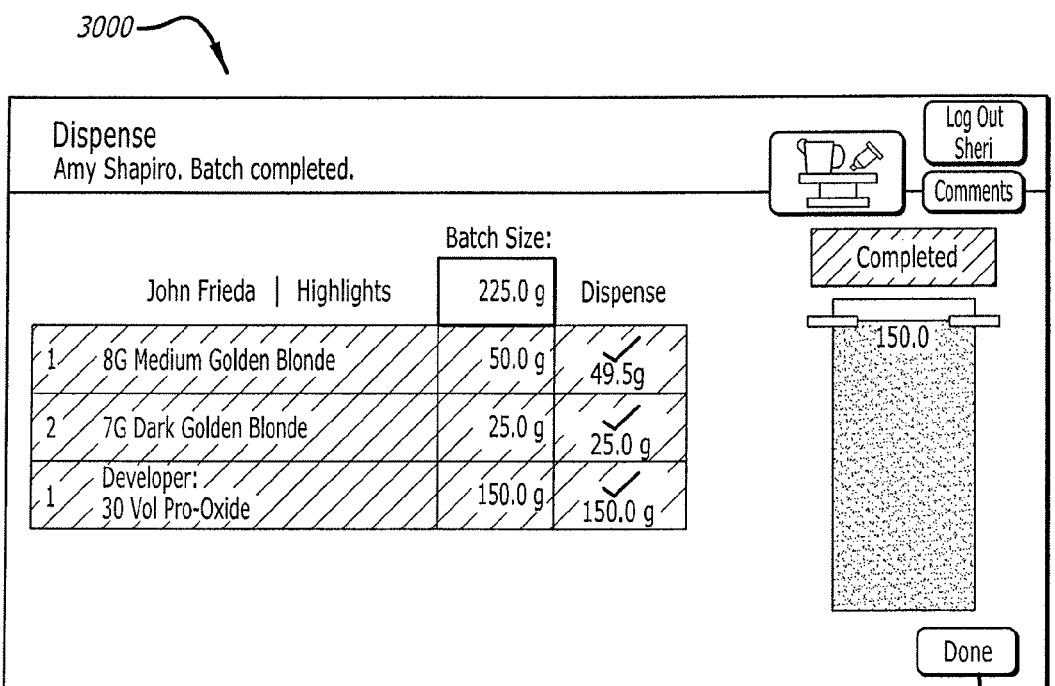
Figure 30J:
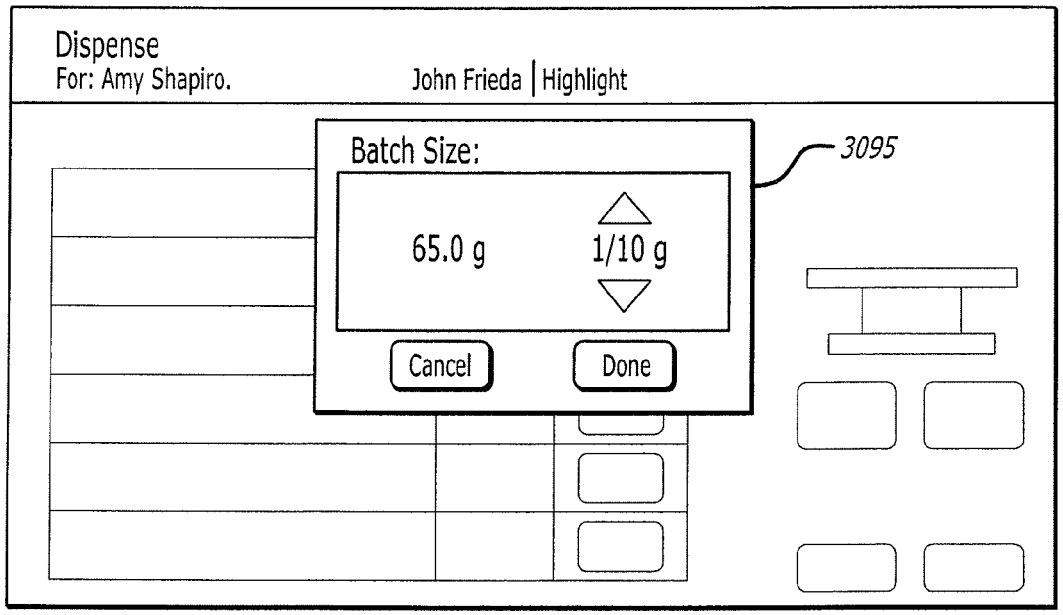
Figure 31A:
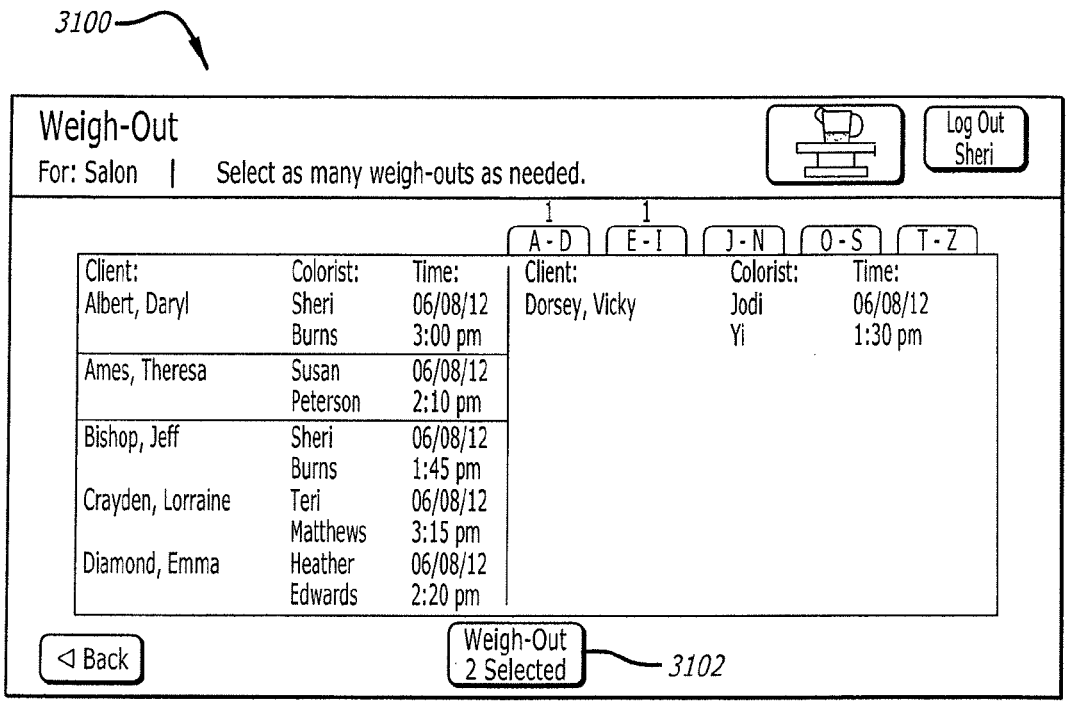

The user may also adjust the batch size by selecting one of the batch size fields 3024, which causes the color preparation and management system and method to display the "Batch Size Adjustment" pop-up 3095 shown in FIG. 30J. The user may increment the batch size up or down by predefined increments by selecting the up or down arrows shown. In some embodiments, the increment is one-tenth of a gram. In other embodiments, the user may adjust the batch size using smaller or larger increments than one-tenth of a gram. The size of the increments used may be based on the overall batch size. For example, a total batch size of less than 100 grams may default to a one-tenth of a gram increment, while a total batch size of more than 100 grams may default to a one gram increment. Other default increments may be used in different embodiments. In some embodiments, the "Batch Size Adjustment" pop-up 3095 may enable the user to select the size of the increment. The user may select the virtual "Done" key to return to the "Dispense Formula" screen 3000 (i.e., remove the pop-up) to register the mixing vessel, if required to do so before dispensing any ingredients.

In some embodiments of the color preparation and management system and method, selecting the "Cancel" or "Done" virtual keys on the "Batch Sizing Adjustment" pop-up causes the system to display the "Batch Size Warning" pop-up 3097 shown in FIG. 30C. The pop-up 3097 serves to remind the user that the batch size may not be manually changed once dispensing begins. In other embodiments, the batch size may be manually changed once dispensing begins to a certain extent. For example, if the user dispenses 50 grams of an ingredient and seeks to reduce the batch size so that only 20 grams is required for the dispensed ingredient, the color preparation and management system and method may inform the user to remove 30 grams of the dispensed ingredient from the mixing vessel. The system keeps track of the removal for waste tracking, inventory tracking, and other tracking purposes. Enabling the user to change the batch size in the middle of dispensing a formula allows the user to help salvage a total loss into something less than a total loss. If more than one ingredient was dispensed and the user wishes to re-batch, the color preparation and management system and method keeps track of the ratio of the ingredients dispensed to ensure the right ratio is ultimately achieved after the batch size is altered mid-stream (i.e., in the middle of dispensing).

In some embodiments, the user must register a mixing vessel before dispensing. In such embodiments, the "Zero Scale" key 3016 and the dispense ingredients keys 3010, 3012, and 3014 may not be selectable by the user, and therefore grayed out, until the user registers a mixing vessel.

Registration involves associating the mixing vessel with the selected formula for the duration of the service (i.e., until the weigh-out process is complete). Registration may or may not require input from the user. For example, each mixing vessel at a salon may include a unique identifier (e.g., "Mixing Vessel #17") that the user must provide input into the system to register that particular mixing vessel with the selected formula about to be dispensed for the duration of the service. For Mixing Vessel #17, the user may simply need to enter "17" using a virtual keyboard that may pop-up on the GUI when the user selects the virtual "Register Bowl" key 3022. In other embodiments, the color preparation and management system and method automatically registers a mixing vessel when the mixing vessel is placed on the scale. The mixing vessel may contain an RFID tag and when placed on the scale, the RFID tag may be in close proximity to an RFID reader. The RFID reader may transmit the RFID information to the color preparation and management system and method such that the mixing bowl on the scale is registered with the selected service about to be dispensed by virtue of the RFID being associated with the service. In yet other embodiments, the mixing vessel may include a barcode (e.g., UPC or QR). The user may scan the barcode using an integrated barcode reader, which registers the barcode with the service, thereby effectively registering the mixing vessel as well. Registering a mixing vessel enables the system to automate re-selection of a service to perform re-batching or a weigh-out.

Thus, registering a mixing vessel saves the user time by removing the need for the user to navigate through GUI modules. For example, in some embodiments, upon placing the mixing vessel on the scale for re-batching or a weigh-out, the system may analyze the previous activity associated with the mixing vessel since the mixing vessel's registration. If the previous activity indicates that the full amount has been dispensed, then the color preparation and management system and method may automatically query whether the user desires to conduct a re-batch or weigh-out.

Alternatively or additionally, a created or selected formula may be registered with a barcode, mixing vessel identifier, an RFID, or the like. Such embodiments enable users to create and select formulas using a different color preparation and management system and method not directly connected to the scale. For example, a user may use his or her personal computer to access a website that provides the user the same, similar, or different GUI disclosed herein that enables the user to select clients, select formulas, create formulas, and the like. A selected or created formula may be registered with a particular RFID for a particular client. Therefore, when the user takes a mixing vessel containing that RFID, the color preparation and management system and method automatically queries the user to determine whether the user wishes to dispense the selected service registered with the mixing vessel or not. If so, the color preparation and management system and method may proceed to the "Batch Sizing" GUI or the "Dispense" GUI. Thus, the scale may be more efficiently used since users are not spending time at the scale station creating or selecting formulas.

In addition, a single RFID, barcode, or unique identifier may be registered with more than one formula at a given time. Thus, when the user places the mixing vessel on the scale, the system may list the registered formulas that the user may select to dispense. The color preparation and management system and method may analyze the information to determine whether one of the formulas should be selected by default based on the time of day and correlate that information with appointment data. If the user has a client appointment around the time at which the user is at the scale with the mixing vessel, the color preparation and management system and method may, by default, select the formula corresponding to the current appointment.

After the mixing vessel is registered, the user may select the "Zero Scale" key 3016 to zero the scale. In some embodiments, the system automatically zeros the scale once the mixing vessel is registered since some embodiments may require the mixing vessel to be on the scale during registration.

Upon zeroing the scale, the color preparation and management system and method updates the "Dispense Formula" screen 3000 to reflect that the mixing vessel has been registered by displaying "Registration" icon 3026, as shown in FIG. 30B, according to one embodiment. The system may also reflect that the scale has been zeroed by displaying the graphic indicator 3050 (e.g., progress bar), which may be a beaker, graduated cylinder, bowl, or other mixing vessel. The indicator informs the user how much of an ingredient he or she has dispensed into the mixing vessel and when to stop dispensing the ingredient into the mixing vessel. As shown in FIG. 30C, the system may automatically select the first ingredient (e.g., "8G Medium Golden Blonde") listed in the formula to reduce the risk of the user forgetting to dispense the first ingredient.

The ingredients may be color-coded. For example, "8G Medium Golden Blonde" may be highlighted in green when selected for dispensing, "7G Dark Golden Blonde" may be highlighted in blue when selected for dispensing, and the developer may be highlighted in purple when selected for dispensing. These colors may be used to graphically "fill" the graphic indicator 3050. For example, if the user dispenses the "8G Medium Golden Blonde" ingredient, the graphic indicator 3050 is graphically "filled" with a green progress graphic. If the user dispenses the developer next, the graphic indicator 3050 is graphically "filled" with a purple progress graphic over the green progress graphic. If the user dispensed the developer first and the "8G Medium Golden Blonde" ingredient second, the green progress graphic would be over the purple progress graphic. In some embodiments, the color may also inform the user that the ingredient is selected, being dispensed, or done being dispensed. For example, there may be three different shades of green for the first ingredient, three different shades of blue for the second ingredient, and the like. In other embodiments, the color may not be specific to the ingredient.

In some embodiments, the graphic indicator 3050 is always the same size (e.g., same width and height) regardless of the batch size but may have different virtual volumes for different ingredients. Measurement lines or hash marks may inform the user of the graphic indicator's virtual volume. In some embodiments, measurement lines or hash marks associated with the graphic indicator 3050 may be based on the batch size and be labeled accordingly. The graphic indicator 3050 may include one or more measurement lines or hash marks that may or may not increment linearly. The number of measurement lines may be dynamic or static. Thus, while the size of the graphic indicator 3050 may not graphically change, the measurement lines may enable the user to associate different "graduated cylinder" sizes due to the values assigned to one or more of the measurement lines (e.g., FIGS. 30D-G). In some embodiments, the graphic indicator 3050 is always displayed with the same number of measurement lines. In other embodiments, the number of lines displayed on the graphic indicator 3050 may be based on the total batch size, number of ingredients scheduled to be dispensed, and the like.

For example, in an embodiment where the number of measurement lines on the graphic indicator 3050 is static and linear, and the total batch size is 40 grams, each measurement line may represent an increment of 2 grams. One or more measure lines may be labeled accordingly. In one embodiment, the first, fourth, eighth, twelfth, sixteenth, and twentieth measurement lines may be respectively labeled 2.0, 8.0, 16.0, 24.0, 32.0, and 40.0. If the batch size were increased to 100 grams, each measurement line may represent an increment of 5 grams.

In embodiments where the number of measurement lines is dynamic, the example reciting the total batch size of 100 grams may cause 40 measurement lines or hash marks to be displayed instead of 20. Under this example, each measurement line may represent an increment of 2.5 grams, whereas the 40 gram batch size example may still use 20 measurement lines. The number of measurement lines in a dynamic embodiment may be based on the total batch size, the number of ingredients, the batch sizes specific to each ingredient, and the like.

Non-linear measurement lines on the graphic indicator 3050 enables the system to vary the visual precision based on an ingredient, batch size of an ingredient, and the like. In some embodiments, this may involve having one or more zones of measurement lines that increment at different values on the graphic indicator 3050. In some embodiments, each ingredient has an associated zone. For example, in one embodiment with three ingredients scheduled for dispensing, the graphic indicator may include a first, second, and third zone. The first, second, and third zones may respectively correspond to the first, second, and third ingredients. The zones may or may not have different heights.

Thus, the measurement lines or hash marks in the first, second, and third zones may respectively represent increments of 1 gram, 0.1 grams, and 10 grams. In this regard, the graphical "fill" rate animated with a progress graphic that may or may not be color-code changes for each zone. When the graphic indicator 3050 has different zones, this enables the user to view the progress of dispensing ingredients that may otherwise be difficult in a linearly scaled system. For example, a batch size of 500 grams that calls for a batch size of 10 grams for one ingredient would be difficult for the user to graphically perceive. Instead, a non-linear system may be used to "zoom-in" for the user by having different zones that may have a different number of measurement lines, different increment values, progressive increment values and the like. In some embodiments, the non-linear system may use consistently-spaced measurement lines or hash marks but the increment between each measurement line may not be consistent. For example, the graphic indicator 3050 may include 10 evenly spaced hash marks that represent the following weight units (e.g., grams) in a single zone: 15, 30, 45, 60, 75, 90, 97, 98, 99, and 100. Such an embodiment enables the user to "zoom-in" near the end and pay more attention to ensure that the user does not dispense too quickly and dispense more than the batch size. For example, in this example, if the user dispenses a single ingredient at the same rate from 0 units to 100 units, the progress graphic will substantially increase in speed once the user reaches the hash mark with a value of 97. The user may perceive this noticeable change in speed as abrupt and slow down the dispense rate. As disclosed herein, a sound may also be output by the system to warn the user that the target weight is being reached for each ingredient or the formula as a whole.

Whether linear or non-linear, the system may also use a different, but same sized graphic indicator for each ingredient. For example, FIGS. 30D, 30F, and 30G, respectively, show a linear graphic indicator 3050 corresponding to each ingredient. For the first ingredient, the graphic indicator has measurements up to 50 grams since that is the batch size for the first ingredient in this example. For the second and third ingredients, the graphic indicator has measurements up to 25 grams and 150 grams, respectively. In this embodiment, the user "fills" the graphic indicator 3050 up to the target weight, and then proceeds to the next ingredient. Proceeding to the next ingredient presents the same graphic indicator 3050 but with different measurement line values.

Upon dispensing the selected ingredient, the color preparation and management system and method updates the "Dispense Formula" screen 3000 to reflect that the dispensing has begun and provide the user with real-time information related to the dispensing process, as shown in FIG. 30D. The "Registration" icon 3026 may change to a "Dispensing" icon 3030. The "Dispense Formula" screen 3000 may also include a "Batch Status" information bar 3034 that may display the current, dispensed ingredient weight over the current batch weight. A target weight indicator 3036 (e.g., one of the measurement lines or hash marks) for the current ingredient being dispensed may also be displayed.

In the embodiment shown, the user has begun dispensing the first listed ingredient, which is graphically represented (e.g., highlighted). As the user dispenses the first listed ingredient, the progress "fill" graphic 3032 rises and corresponds to the amount the user is dispensing (i.e., current ingredient weight that has been dispensed). Likewise, as the ingredient is dispensed, the "Batch Status" information bar is updated to reflect the current weight dispensed. The indicator informs the user how much of an ingredient he or she has dispensed into the mixing vessel and when to stop dispensing the ingredient into the mixing vessel. The user should stop dispensing the ingredient when the progress graphic 3032 reaches the target weight indicator 3036.

In some embodiments, one or more audible tones or beeps may be used to alert the user that he or she is approaching the target batch size weight. Additionally or alternatively, the graphic indicator 3050, the progress graphic 3032, the "Batch Status" information bar 3034, and/or the target weight indicator 3036 may temporarily (e.g., flash) or permanently display a first color when the user is approaching the target weight. For example, the progress graphic 3032 and the "Batch Status" information bar 3024 may become yellow when the user is a certain percentage away from reaching the target weight (e.g., 10%). Once the user reaches the target weight or an amount within a tolerance range, the graphic indicator 3050, the progress graphic 3032, the "Batch Status" information bar 3034, and/or the target weight indicator 3036 may become green.

FIG. 30E shows one embodiment of the "Dispense Formula" screen 3000 after the user has stopped dispensing the first ingredient since the target weight of 50 grams was reached within a tolerance range (e.g., +/−1 gram, 2 grams, 3 grams, 5 grams, and the like). The actual value of 49.5 grams may be displayed where dispense ingredient key 3010 was previously displayed and the "Batch Status" information bar 3034. Once a target weight is reached within a tolerance range, the system may produce an audible sound such as a "Ding, Ding, Ding."

If the user continues dispensing the ingredient and stops at a value beyond the target weight and is out of the tolerance range, the color preparation and management system and method updates the "Dispense Formula" screen 3000 to reflect that the target weight has been exceeded (e.g., the screenshot shown in FIG. 30H). In one embodiment, one or more of the following may be the color red: the progress graphic 3032 that is above the target weight indicator 3036, the "Batch Status" information bar 3034, and the dispensed ingredient (e.g., highlighted in red).

The user may select a virtual "Cancel Batch" key 3052 to update the inventory for expended ingredient(s). Selecting the "Cancel Batch" key 3052 requires the user to start over and may need to re-register the mixing vessel.

The user may also self-correct by removing the excess ingredient. The user may extract the excess ingredient by conventional means, e.g., using a spoon. In some embodiments, the mixing vessel may include compartments to dispense each ingredient into. This ensures that the ingredients do not mix prematurely therefore enabling easier removal of ingredients. The compartments may be formed by a removal object such as a rod with four planar arms extending outwardly to create four quadrants in the mixing vessel when placed therein. When the user is done dispensing ingredients, the user may twist the removable compartment-creating object to stir the ingredients, or remove the object while being careful to minimize the amount of ingredients carried with it as it is removed. The user may wipe the removal object off and put the removed ingredients back in the mixing vessel to ensure the formula is as accurate as possible.

The user may also select a virtual "Reformulate Batch" key 3054, which reformulates the total batch size and the ingredient specific batch sizes that have yet to be dispensed and/or that have been dispensed (i.e., the amounts of the ingredients changes, but the ratios between ingredients remain the same). This may also be done automatically by the color preparation and management system and method. Thus, as shown in FIG. 30H, the new batch sizes that have been recalculated are the batch size fields 3024, which are updated to reflect to the new target weights. In some embodiments, the batch size fields 3024 may include the new batch over the old batch size. In other embodiments, such as the one shown, the batch size fields 3024 may only display the new batch sizes to avoid confusing the user. Upon the new batch sizes being calculated, the first ingredient may be highlighted green to indicate the user and/or system has corrected the mistake and may continue dispensing additional ingredients.

If a first and second ingredient are dispensed without error, but the third ingredient is dispensed with error (e.g., exceeding the target amount by 7 grams), the embodiments described herein still apply. For example, the batch sizes may be recalculated (i.e., the total batch size, the first ingredient batch size, and the second ingredient batch size). Thus, the user would be required to select a previously dispensed ingredient he or she dispensed without error to dispense that ingredient to reach the newly calculated target amount caused by the mistake of dispensing too much of ingredient 3.

In some embodiments, the user's error may be so egregious that color preparation and management system and method may automatically cancel the batch. This may occur, for example, when the computer analyzes the ingredient costs associated with increasing the batch size to correct the mistake versus forcing the user to start the originally calculated batch size over. The color preparation and management system and method may automatically choose the less expensive option. In such an event, the user may be taken back to the "Dispense Formula" screen 3000 as it is shown in FIG. 30A. Returning the user to the screen as shown in FIG. 30A ensures the user zeros out the scale and, if necessary, re-registers the mixing vessel.

Referring now to FIG. 30F, the "Dispense Formula" screen 3000 is shown after the user dispensed 49.5 grams of the first ingredient and has dispensed 15 grams of the second ingredient. In other embodiments, the user may have selected the third ingredient to dispense before the second ingredient. In yet other embodiments, the color preparation and management system and method may only enable a certain order of ingredients to be dispensed. The order may be based on the batch size of each ingredient, the cost of the batch size of each ingredient, and the like. In addition, the "Batch Status" information bar 3034 is shown with the overall dispensed weight over the target weights of the dispensed and currently dispensed ingredients. In other embodiments, the "Batch Status" information bar 3034 may display the current, dispensed ingredient weight over the current batch weight for each ingredient when it is being dispensed.

The color preparation and management system and method disclosed herein increases the consistency for dispensed formulas, which enables a user to more accurately reproduce previous services for a client.

Referring now to FIG. 30G, the "Dispense Formula" screen 3000 is shown after dispensing all three ingredients in the example shown is complete. The virtual "Done" key becomes available and the "Batch Status" information bar 3034 states "Completed." Upon selecting the virtual "Done" key 3038, the user may be taken back to the "Client History" GUI module, which may display the dispensed formula at the top of the list shown in FIG. 25A. In other embodiments, the user may be taken to the "Map" or "Table of Contents" GUI module to enable the user to choose which GUI module he or she needs to access next. For example, in some embodiments, the user may simply log-out after dispensing a formula because the formula needs to be applied to the client. However, some users may choose to mix more than one formula in a row. Thus, the color preparation and management system and method may enable the user to access which ever GUI module he or she desires by navigating the user to the "Map" or "Table of Contents" GUI module.

In some embodiments, the color preparation and management system and method may calculate the cost of a batch size amount (i.e., a scaled formula) and display the cost of dispensed ingredients in real-time as they are being dispensed. Alternatively or additionally, the dispensed cost may be saved offline for analysis at a later time (e.g., report generation on cost or inventory). Therefore, the user is able to directly associated ingredients with cost thereby creating a cost-conscious user. In other embodiments, a user may set a margin limit for a service and/or a formula. If the margin limit is reached, management approval may be necessary to allow the user to proceed. The manager may approve of the service, but require that a surcharge be paid due to the extra use of ingredients. The system provides the owner/manager with the information needed to make these types of decisions. This type of information was not previously obtainable by owner/managers.

Referring now to FIGS. 31A-E, one embodiment of the "Weigh-Out" GUI module is shown. In the embodiment shown, the "Weigh-Out" GUI module may include a "Dispensed Formula Selection" screen 3100, a "Place Vessel on Scale" screen 3120, and a "Weigh-Out" screen 3140. In some embodiments, the color preparation and management system and method may automatically log the user in once the user places a mixing vessel registered to a formula that has been dispensed on the scale. In addition, the color preparation and management system and method may automatically take the user to one or more of the screens of the "Weigh-Out" GUI. For example, since the mixing vessel is registered to a dispensed formula, the user may be taken to the "Weigh-Out" screen 3140 upon the system automatically logging him or her in so that the user can immediately proceed to weigh-out.

The user may also access the "Weigh-Out" GUI by selecting the virtual "Scale" key 2310. Upon accessing the "Weight-Out" GUI module, the user may be taken to the "Dispensed Formula Selection" screen 3100 to choose one or more dispensed formulas. As shown, the client formula may be selected based on the client, the colorist, the time, or other information. Once the user has selected one or more dispensed formulas, the user selects the virtual "Weigh-Out # Selected" key 3102. In some embodiments, the color preparation and management system and method may inform the user of the number of dispensed formulas selected by updating the virtual "Weigh-Out # Selected" key 3102. For example, in the embodiment shown, the user has selected two dispensed formulas. Therefore, key 3102 reads "Weigh-Out 2 Selected."

Any and all information that the color preparation and management system and method processes, analyzes, transmits, or receives may be stored in memory (e.g., a database connected to the internet) for later processing (e.g., report generation). For example, each weigh-out amount may be stored in the database. The computer may analyze the data to determine the most wasteful versus the most cost-conscious users.

In some embodiments, if the logged-in user only has one pending weigh-out (e.g., would only have one dispensed formula to select from on the "Dispensed Formula Selection" screen 3100, the user may be taken directly to either the "Place Vessel on Scale" screen 3120 or "Weigh-Out Selection" screen 3140. If the user has already placed the mixing vessel on the scale, then the user may be taken to the "Weigh-Out Selection" screen 3140. Otherwise, the user is taken to the "Place Vessel on Scale" screen 3120. Upon placing the mixing vessel on the scale on screen 3120, the user is taken to the "Weigh-Out Selection" screen 3140.

Referring now to the embodiment shown in FIG. 31C, the user is presented with the two dispensed formulas he or she selected from the "Dispensed Formula Selection" screen 3100. The user may then choose which dispensed formula to weigh-out by selecting the appropriate weigh-out key 3142 based on which dispensed formula is on the scale.

Figures 31D, 31E:
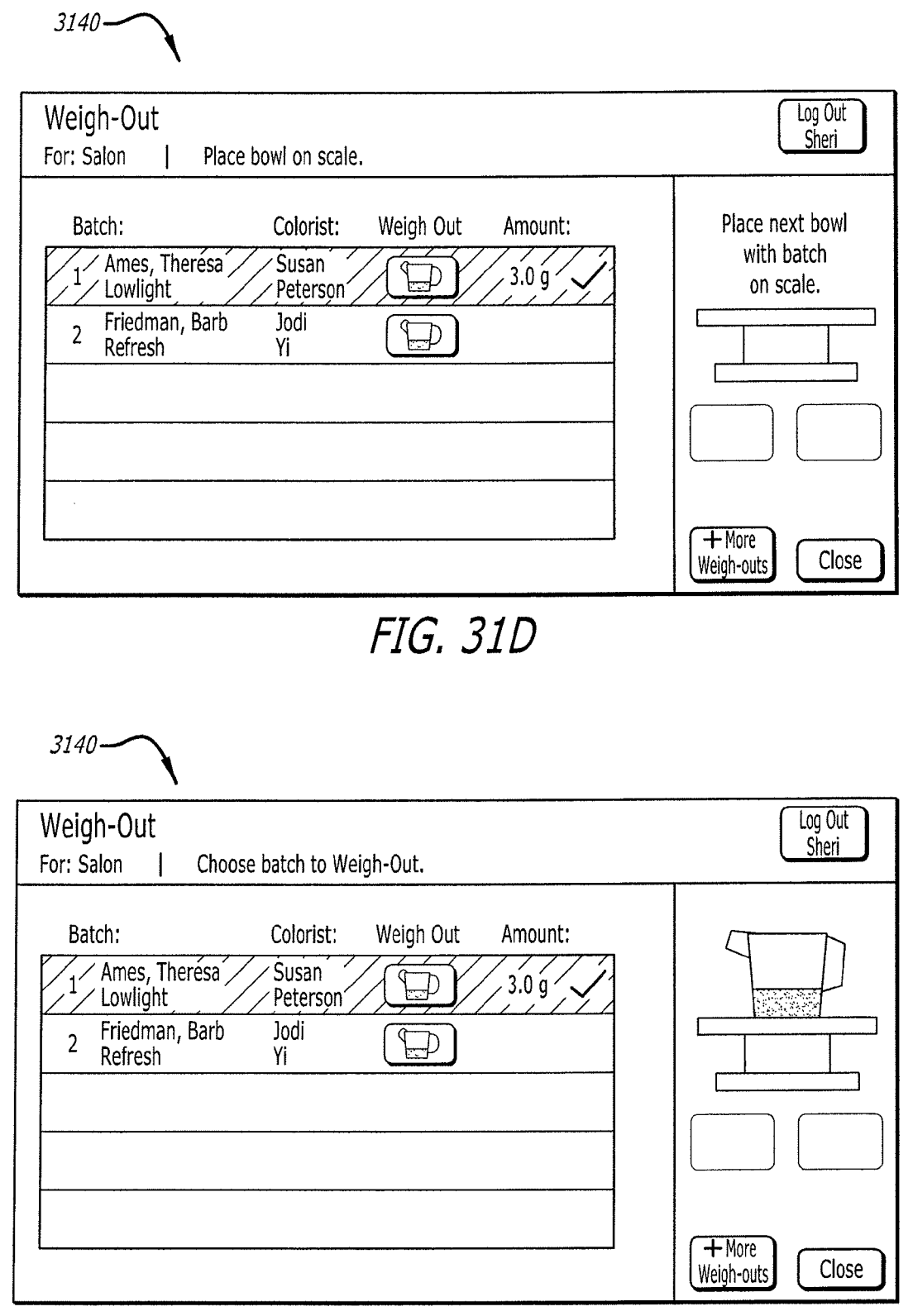

Upon selecting the first batch row (i.e., first dispensed formula listed), the mixing vessel on the scale is weighed. FIG. 31D shows the "Weigh-Out Selection" screen 3140 after the first listed batch has been weighed. When the weigh-out is complete, a check mark may be shown next to the waste amount (i.e., the weight of the excess formula). Since the user selected more than one batch to weigh-out, the system reminder the user to place the next mixing vessel on the scale. FIG. 31E shows when the user has placed the mixing vessel registered with the second batch on the scale. Once done, the user may log-out, navigate back to the client selection screen, or the like.

Figure 32:
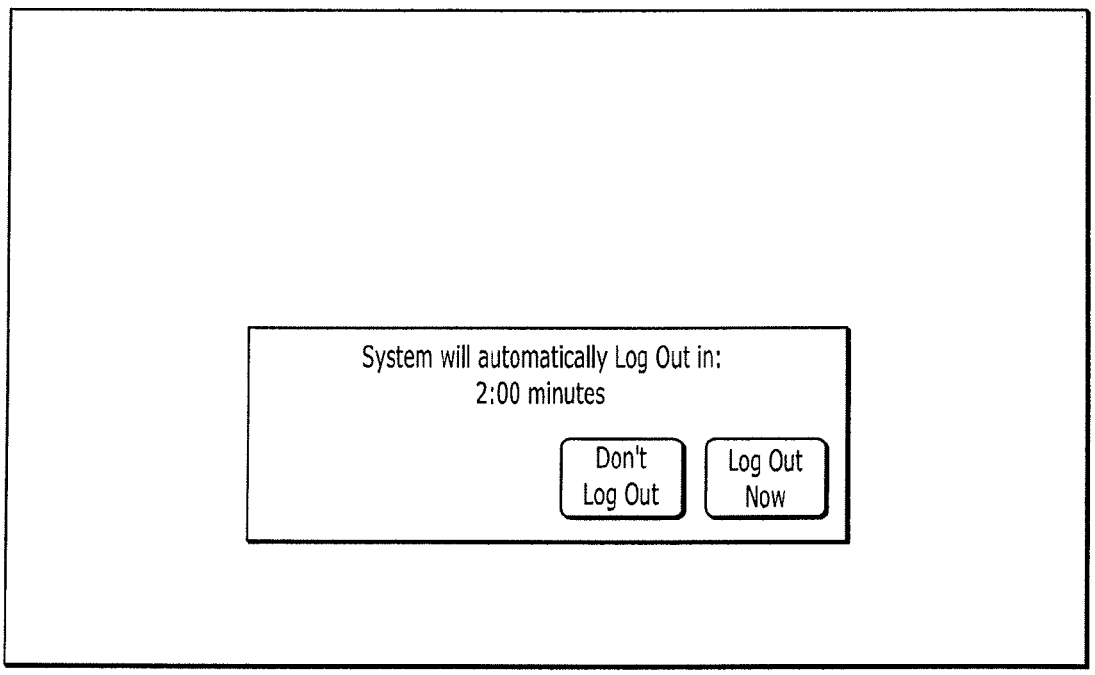
FIG. 32 shows a pop-up associated with a "User Session Time-Out" GUI module according to one embodiment.

When users walk away from the color preparation and management system and method and do not remember to log-out when done, an "Inactivity" pop-up 3200 may be displayed, such as the one shown in FIG. 32. The time interval may be determined by an authorized user or the provider of the color preparation and management system and method. In some embodiments, the time interval may be based on the GUI module left unattended or that has not received user input. For example, the "Inactivity" pop-up 3200 may pop-up after 10 seconds of inactivity in the "Client Selection" GUI module, after 30 seconds of inactivity in the "Create New Formula" GUI module, and 120 seconds of inactivity in the "Dispense Formula" GUI module. Different time intervals take into account the complexity of the GUI modules and/or any costs related thereto.

One or more embodiments disclosed herein may be combined. For example when the phrase "in some embodiments" is followed by "in other embodiments," those embodiments may or may not be combined.

From the foregoing and as mentioned above, it will be observed that numerous variations and modifications may be effected without departing from the spirit and scope of the novel concept of the present disclosure. It is to be understood that no limitation with respect to the specific methods and apparatus illustrated herein is intended or should be inferred. It is, of course, intended to cover all such modifications.

We claim:

1. A method for preparing a hair dye mixture using a scale in communication with a control system, the control system including a memory and a display, the memory containing a formula for blending a hair dye mixture using one or more hair dye blending materials and dispensing amounts recommended for producing a pre-defined batch size of the hair dye mixture, the method comprising:

displaying ingredient dispensing instructions on the display for producing the hair dye mixture;

monitoring a weight on the scale as hair dye blending materials are added in accordance with the formula;

calculating dispense amounts for ingredients of the hair dye mixture for an adjusted batch size when hair characteristic input received by the control system indicates an individual batched sized amount that is different than an amount recommended in the formula for the pre-defined batch size; and displaying the individual batched sized amount on the display.

2. The method of claim 1, wherein the hair dye blending materials are dispensed from current product packaging that does not have specialized packaging requirements.

3. The method of claim 1, wherein the base dispense amount for each ingredient in the formula is calculated when the monitored weight of a first ingredient exceeds a predetermined weight.

4. The method of claim 1, further comprising dispensing a second ingredient of the formula over the scale.

5. The method of claim 4, wherein the base dispense amount for each ingredient in the formula is calculated when the monitored weight of the second ingredient exceeds a predetermined weight.

6. The method of claim 1, further comprising dispensing a third ingredient of the formula over the scale.

7. The method of claim 6, wherein the base dispense amount for each ingredient in the formula is calculated when the monitored weight of the third ingredient exceeds a predetermined weight.

8. The method of claim 1, further comprising: displaying a message to a user regarding the dispensing of ingredients.

9. The method of claim 7, further comprising: enabling the user to provide an input to the control system that disregards the calculated dispense amounts and proceeds with the dispensing amounts recommended for producing a pre-defined batch size of the hair dye mixture.

10. The method of claim 1, wherein the control system saves a ratio of ingredients that were actually dispensed to ensure a matching ratio of ingredients is re-dispensed if an additional amount of the hair dye mixture is needed for a same hair dying procedure.

11. A method for preparing a hair dye mixture, the method using a scale in communication with a control system, the control system including a processor and a display, the method comprising:

providing a server that is configured to communication with the control system over the internet, wherein the server includes a memory that contains software configured to receive a formula that defines instructions for blending a hair dye mixture using one or more hair dye blending materials and amounts recommended for producing a pre-defined batch size of the hair dye mixture;

displaying ingredient dispensing instructions on the display for producing the hair dye mixture;

monitoring a weight on the scale as hair dye blending materials are added to a receptacle on the scale in accordance with said instructions;

calculating information associated with the hair dye mixture when hair characteristic input received by the control system indicates an individual batched sized amount that is different than an amount recommended in the formula for the pre-defined batch size; and displaying the calculated information associated with the hair dye mixture on the display.

\* \* \* \* \*